(12) United States Patent
Ikai et al.

(10) Patent No.: US 9,571,850 B2
(45) Date of Patent: *Feb. 14, 2017

(54) IMAGE DECODING DEVICE AND IMAGE ENCODING DEVICE

(71) Applicant: Sharp Kabushiki Kaisha, Osaka-shi, Osaka (JP)

(72) Inventors: Tomohiro Ikai, Osaka (JP); Tadashi Uchiumi, Osaka (JP); Yoshiya Yamamoto, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/075,305

(22) Filed: Mar. 21, 2016

(65) Prior Publication Data

US 2016/0205411 A1    Jul. 14, 2016

Related U.S. Application Data

(63) Continuation of application No. 14/431,346, filed as application No. PCT/JP2013/076016 on Sep. 26, 2013, now Pat. No. 9,369,728.

(30) Foreign Application Priority Data

Sep. 28, 2012   (JP) .................................. 2012-217904

(51) Int. Cl.
*G06K 9/46* (2006.01)
*H04N 19/503* (2014.01)
(Continued)

(52) U.S. Cl.
CPC ............ *H04N 19/503* (2014.11); *H04N 19/30* (2014.11); *H04N 19/36* (2014.11); *H04N 19/44* (2014.11);
(Continued)

(58) Field of Classification Search
CPC .... H04N 19/44; H04N 19/503; H04N 19/597; H04N 19/30; H04N 19/52; H04N 19/176; H04N 19/55; H04N 19/105; H04N 19/112; H04N 19/139; H04N 19/16; H04N 19/172; H04N 19/174; H04N 19/188; H04N 19/521; H04N 19/91; H04N 19/82
USPC .......................................................... 382/233
See application file for complete search history.

(56) References Cited

U.S. PATENT DOCUMENTS

2010/0260260 A1* 10/2010 Wiegand ................ H04N 19/30
                                                                                      375/240.12
2014/0044178 A1*  2/2014 Li ...................... H04N 19/00569
                                                                                      375/240.16
(Continued)

OTHER PUBLICATIONS

Ikai et al., "Image Decoding Device and Image Encoding Device", U.S. Appl. No. 14/431,346, filed Mar. 26, 2015.
(Continued)

*Primary Examiner* — Ali Bayat
(74) *Attorney, Agent, or Firm* — Keating & Bennett, LLP

(57) ABSTRACT

A disparity vector generation section generates disparity vectors indicating a part of a disparity between a first layer image and a second layer image different from the first layer image and different part of the disparity based on a code indicating the part of the disparity. A predicted image generation section reads a reference image of a region indicated by the disparity vector generated by the disparity vector generation section from a reference image storage section that stores the reference image and generates a predicted image based on the read reference image.

3 Claims, 39 Drawing Sheets

(51) Int. Cl.
H04N 19/36 (2014.01)
H04N 19/597 (2014.01)
H04N 19/70 (2014.01)
H04N 19/55 (2014.01)
H04N 19/52 (2014.01)
H04N 19/30 (2014.01)
H04N 19/44 (2014.01)

(52) U.S. Cl.
CPC .............. *H04N 19/52* (2014.11); *H04N 19/55* (2014.11); *H04N 19/597* (2014.11); *H04N 19/70* (2014.11)

(56) References Cited

U.S. PATENT DOCUMENTS

2014/0218473 A1* 8/2014 Hannuksela ......... H04N 19/597
                                                                    348/43
2014/0314147 A1* 10/2014 Rusanovskyy ...... H04N 19/517
                                                                    375/240.12
2015/0195566 A1* 7/2015 Hinz .................... H04N 19/105
                                                                    375/240.13
2015/0229967 A1* 8/2015 Lee ........................ H04N 19/30
                                                                    375/240.02

OTHER PUBLICATIONS

"How HEVC/H.265 Works, Technical Details and Diagrams", Doom9's Forum, Jan. 31, 2013, 9 pages.

Gerhard Tech et al., "3D-HEVC Test Model 1", Joint Collaborative Team on 3D Video Coding Extension Development of ITU-T SG 16 WP 3 and ISO/IEC JTC 1/SC 29/WG 11, JCT3V-A1005_d0, Sep. 20, 2012, 82 pages.

* cited by examiner

| video_parameter_set_rbsp() { | Descriptor |
|---|---|
|   video_parameter_set_id | u(4) |
|   vps_temporal_id_nesting_flag | u(1) |
|   vps_reserved_zero_2bits | u(2) |
|   vps_max_layer_minus1 | u(6) |
|   vps_max_sub_layers_minus1 | u(3) |
|   profile_and_level (1, vps_max_sub_layers_minus1) | |
|   vps_reserved_zero_12bits | u(12) |
|   ... | |
|   for (k=0; k< vps_max_layers_minus1 ; k++) { | |
|     if (!extension_type) | |
|       view_id[k] | u(10) |
|     if (view_id != 0) | |
|       camera_arrangement_1D_flag[k] | u(1) |
|   ... | |

⎫ 603

(b)

| pic_parameter_set_rbsp() { | Descriptor |
|---|---|
|   pic_parameter_set_id | ue(v) |
|   seq_parameter_set_id | ue(v) |
|   sign_data_hiding_flag | u(1) |
|   cabac_init_present_flag | u(1) |
|   ... | |
|   pps_extension_flag | u(1) |
|   if (pps_extension_flag) { | |
|     if (view_id != 0) | |
|       camera_arrangement_1D_flag | u(1) |
|   ... | |

⎫ 603

(c)

| slice_header() { | Descriptor |
|---|---|
|   first_slice_in_pic_flag | u(1) |
|   ... | |
|   pps_extension_flag | u(1) |
|   if( slice_header_extension_present_flag) { | |
|     slice_header_extension_length | ue(v) |
|     if (view_id != 0) | |
|       camera_arrangement_1D_flag | u(1) |
|   ... | |

| prediction_unit(x0,y0,nPbW,nPbH) { | Descriptor |
|---|---|
| if( skip_flag[x0][y0] ) { | |
| if( MaxNumMergeCand> 1 ) | |
| merge_idx[x0][y0] | ae(v) |
| } else { /* MODE_INTER */ | |
| merge_flag[x0][y0] | ae(v) |
| if( merge_flag[x0][y0] ) { | |
| if( MaxNumMergeCand> 1 ) | |
| merge_idx[x0][y0] | ae(v) |
| } else { | |
| if( slice_type == B ) | |
| inter_pred_idc[x0][y0] | ae(v) |
| if( inter_pred_idc[x0][y0] != Pred_L1 ) { | |
| ref_idx_l0[x0][y0] | ae(v) |
| if (camera_arrangement_1D_flag==1 && reference_layer_info(ref_idx_l0[x0][y0])==INTER_VIEW) | |
| mvd_coding_1D(x0,y0,0) | |
| else | |
| mvd_coding(x0,y0,0) | |
| mvp_l0_flag[x0][y0] | ae(v) |
| } | |
| if( inter_pred_idc[x0][y0] != Pred_L0 ) { | |
| ref_idx_l1[x0][y0] | ae(v) |
| if (camera_arrangement_1D_flag==1 && reference_layer_info(ref_idx_l1[x0][y0])==INTER_VIEW) | |
| mvd_coding_1D(x0,y0,1) | |
| else | |
| mvd_coding(x0,y0,1) | |
| mvp_l1_flag[x0][y0] | ae(v) |
| } | |
| } | |
| } | |

604

| mvd_coding_1D (x0,y0,refList) { | Descriptor |
|---|---|
| abs_mvd_greater0_flag[0] | ae(v) |
| if(abs_mvd_greater0_flag[0] ) | |
| abs_mvd_greater1_flag[0] | ae(v) |
| if(abs_mvd_greater1_flag[0] ) { | |
| abs_mvd_minus2[0] | ae(v) |
| mvd_sign_flag[0] | ae(v) |
| } | |
| } | |

605

| mvd_coding(x0,y0,refList) { | Descriptor |
|---|---|
| abs_mvd_greater0_flag[0] | ae(v) |
| abs_mvd_greater0_flag[1] | ae(v) |
| if(abs_mvd_greater0_flag[0] ) | |
| abs_mvd_greater1_flag[0] | ae(v) |
| if(abs_mvd_greater0_flag[1] ) | |
| abs_mvd_greater1_flag[1] | ae(v) |
| if(abs_mvd_greater1_flag[0] ) { | |
| abs_mvd_minus2[0] | ae(v) |
| mvd_sign_flag[0] | ae(v) |
| } | |
| if(abs_mvd_greater1_flag[1] ) { | |
| abs_mvd_minus2[1] | ae(v) |
| mvd_sign_flag[1] | ae(v) |
| } | |
| } | |

606

(a) When yP−1 is less than (( yC >> Log2CtbSizeY ) << Log2CtbSizeY),
xP' = (xP>>3)<<3) + ((xP>>3)&1)*7

(b) xP' = ( xP >> 4 ) << 4
yP' = ( yP >> 4 ) << 4

(a)
$xP' = ( xP >> 3 ) << 3$
$yP' = ( yP >> 3 ) << 3$ (b)
$xP' = (xP>>3)<<3) + ((xP>>3)\&1)*7$
$yP' = (yP>>3)<<3) + ((yP>>3)\&1)*7$

IMAGE DECODING DEVICE AND IMAGE ENCODING DEVICE

TECHNICAL FIELD

The present invention relates to an image decoding device and an image encoding device.

This application claims the benefit of Japanese Priority Patent Application JP 2012-217904 filed Sep. 28, 2012, the entire contents of which are incorporated herein by reference.

BACKGROUND ART

In image encoding technologies for a plurality of viewpoints, parallax prediction encoding methods of reducing an information amount by predicting a parallax between images when images of a plurality of viewpoints are encoded and decoding methods corresponding to the encoding methods have been proposed (for example, see NPL 1). A vector indicating a parallax between viewpoint images is referred to as a parallax vector. The parallax vector is a 2-dimensional vector having a component value (x component) in the horizontal direction and a component value (y component) in the vertical direction and is calculated for each of the blocks which are regions divided from one image. When multi-viewpoint images are acquired, a camera disposed at each viewpoint is generally used. In the multi-viewpoint encoding methods, each viewpoint image is encoded using such that a plurality of layers as different layers. An encoding method in which each layer further includes a plurality of layers is generally referred to as scalable coding or hierarchy coding. In the scalable coding, high coding efficiency is realized by executing prediction between layers. A layer serving as a criterion without executing the prediction between the layers is referred to as a base layer and the other layers are referred to as enhancement layers. The scalable coding when layers are configured from a viewpoint image is referred to as view scalable coding. At this time, the base layer is referred to as a base view and the enhancement layer is also referred to a non-base view.

As the scalable coding, there are spatial scalable coding (a method of processing a picture with a low resolution as a base layer and processing a picture with a high resolution as an enhancement layer) and SNR scalable coding (a method of processing a picture with low quality as a base layer and processing a picture with high resolution as an enhancement layer) in addition to the view scalable coding. In the scalable coding, for example, a picture of a base layer is used as a reference picture in encoding of a picture of an enhancement layer in some cases.

CITATION LIST

Non-Patent Document

NPL 1: "high efficiency video coding draft 8" JCTV-J10003, Stockholm, SE, July, 2012

DISCLOSURE OF THE INVENTION

Problems to be Solved by the Invention

However, when arrangement of cameras is 1-dimensional, a parallax in a direction perpendicular to the arrangement may not occur. For example, when two cameras are arranged in the horizontal direction, a parallax (an X component of a disparity vector) in the horizontal direction mainly occurs. In this case, a code (a Y component of a disparity vector) generated by encoding the parallax in the direction perpendicular to the arrangement of the cameras is redundant. In the case of the spatial scalable coding or the SNR scalable coding, a code generated by encoding such a parallax (disparity vector) is redundant since a parallax does not occur between a base layer and an enhancement layer.

The present invention has been devised in light of the foregoing circumstances and provides an image decoding device and an image encoding device improving coding efficiency.

Means for Solving the Problems (1) The present invention is devised to resolve the foregoing problems. According to an aspect of the present invention, there is provided an image decoding device preferably including: a prediction parameter derivation section that derives a prediction parameter of a target prediction block; and a predicted image generation section that reads a reference image of a region indicated by a vector derived by the prediction parameter derivation section and generates a predicted image based on the read reference image. The prediction parameter derivation section may include an inter-layer reference address transformation section that transforms coordinates at which a prediction parameter of a reference block is referred to in a case in which a target image belonging to the target prediction block and a reference image belonging to the reference block which is a part of the reference image belong to different layers.

(2) In the image decoding device according to the aspect of the present invention, calculation of transforming the coordinates by the inter-layer reference address transformation section may include calculation of discretizing the coordinates in a larger unit.

(3) In the image decoding device according to the aspect of the present invention, the calculation of transforming the coordinates by the inter-layer reference address transformation section may be calculation of shifting X and Y coordinates to right by 3 bits and further shifting the X and Y coordinates to a left by 3 bits.

(4) The present invention is devised to resolve the foregoing problems. According to another aspect of the present invention, there is provided an image encoding device preferably including: a prediction parameter derivation section that derives a prediction parameter or a prediction vector of a target prediction block; and a predicted image generation section that reads a reference image of a region indicated by a vector derived by the prediction parameter derivation section and generates a predicted image based on the read reference image. The prediction parameter derivation section may include a prediction parameter reference section that refers to a stored prediction parameter and an inter-layer reference address transformation section that transforms coordinates at which a prediction parameter of a reference block is referred to in a case in which a target image belonging to the target prediction block and a reference image belonging to the reference block which is a part of the reference image belong to different layers.

(5) According to still another aspect of the present invention, there is provided an image decoding device preferably including: a vector difference decoding section that derives contexts of arithmetic encodes and decodes a vector difference from encoded data; a vector derivation section that derives a vector of a target block from a sum of a vector of a processed block and the vector difference; and a predicted image generation section that reads a reference image of a region indicated by a vector of a target block generated by the vector derivation section and generates a predicted image based on the read reference image. The vector difference decoding section may assign the contexts based on whether the vector of the target block or the vector difference is for prediction between different layers.

(6) In the image decoding device according to the aspect of the present invention, in a case in which the vector of the target block or the vector difference is prediction between the different layers, the vector difference decoding section may assign the different contexts to a syntax element configuring a vertical component of the vector difference and a syntax element configuring a horizontal component of the vector difference.

(7) In the image decoding device according to the aspect of the present invention, in the determination of whether the vector of the target block or the vector difference is for the prediction between the different layers, between a case in which the vector of the target block or the vector difference is determined to be the prediction between the different layers and a case in which the vector of the target block or the vector difference is determined not to be the prediction between the different layers, the vector difference decoding section may assign the different context to a syntax element configuring at least one component of the vector difference.

(8) In the image decoding device according to the aspect of the present invention, the syntax element may be information indicating whether an absolute value of the vector difference exceeds 0.

(9) According to still another aspect of the present invention, there is provided an image encoding device preferably including: a vector difference encoding section that derives a context of an arithmetic code and encodes a vector difference; a vector difference derivation section that derives the vector difference from a vector of a processed block and a vector of a target block; and a predicted image generation section that reads a reference image of a region indicated by the vector of the target block generated by the vector difference derivation section and generates a predicted image based on the read reference image. The vector difference derivation section may assign the context based on whether the vector of the target block or the vector difference is for prediction between different layers.

(10) According to still another aspect of the present invention, there is provided an image decoding device preferably including: a disparity vector generation section that generates a disparity vector indicating a disparity between a first layer image and a second layer image different from the first layer image based on a code indicating the disparity; a disparity vector restriction section that restricts the disparity vector to a value within a pre-decided range; and a predicted image generation section that reads a reference image of a region indicated by the disparity vector generated by the disparity vector generation section and generates a predicted image based on the read reference image.

(11) In the image decoding device according to still another aspect of the present invention, in a range in which the disparity vector restriction section restricts the value of the disparity vector, a range of a vertical component may be less than a range of a horizontal component.

(12) The image decoding device according to still another aspect of the present invention may further include a prediction parameter derivation section that derives a motion vector or a prediction vector which is a predicted value of the disparity vector as at least a part of the prediction parameter with reference to a prediction parameter related to a region indicated by the disparity vector restricted by the disparity vector restriction section.

(13) According to still another aspect of the present invention, there is provided an image encoding device preferably including: a disparity vector generation section that generates disparity vectors indicating a part of a disparity between a first layer image and a second layer image different from the first layer image and different part of the disparity based on the part of the disparity; and a predicted image generation section that reads a reference image of a region indicated by the disparity vector generated by the disparity vector generation section and generates a predicted image based on the read reference image.

(14) According to still another aspect of the present invention, there is provided an image encoding device including: a disparity vector generation section that generates a disparity vector indicating a disparity between a first layer image and a second layer image different from the first layer image based on a code indicating the disparity; a disparity vector restriction section that restricts the disparity vector to a value within a pre-decided range; and a predicted image generation section that reads a reference image of a region indicated by the disparity vector generated by the disparity vector generation section and generates a predicted image based on the read reference image.

(15) According to still another aspect of the present invention, there is provided an image decoding device preferably including: a disparity vector generation section that generates disparity vectors indicating a part of a disparity between a first layer image and a second layer image different from the first layer image and different part of the disparity based on a code indicating the part of the disparity; and a predicted image generation section that reads a reference image of a region indicated by the disparity vector generated by the disparity vector generation section and generates a predicted image based on the read reference image.

(16) In the image decoding device according to still another aspect of the present invention, the part of the disparity may be a horizontal component of the disparity and the other part of the disparity is a vertical component of the disparity. The disparity vector generation section may decide predicted values of the vertical component and the vertical component or a predicted residual of the vertical component as pre-decided values.

(17) In the image decoding device according to still another aspect of the present invention, the part of the disparity may be the horizontal component of the disparity and the other part of the disparity may be the vertical component of the disparity. The disparity vector generation section may calculate the vertical component of the disparity based on a code indicating a relation between the vertical component and the horizontal component.

Effects of the Invention

According to the present invention, it is possible to reduce a memory at the time of generation of a predicted image and at the time of generation of a predicted image and improve coding efficiency.

BRIEF DESCRIPTION OF THE DRAWINGS

FIG. 21 is a conceptual diagram illustrating an example of an encoded data structure.

FIG. 22 is a conceptual diagram illustrating an example of an encoded stream structure.

MODE FOR CARRYING OUT THE INVENTION (First Embodiment)

Hereinafter, an embodiment of the invention will be described with reference to the drawings.

Figure 1:
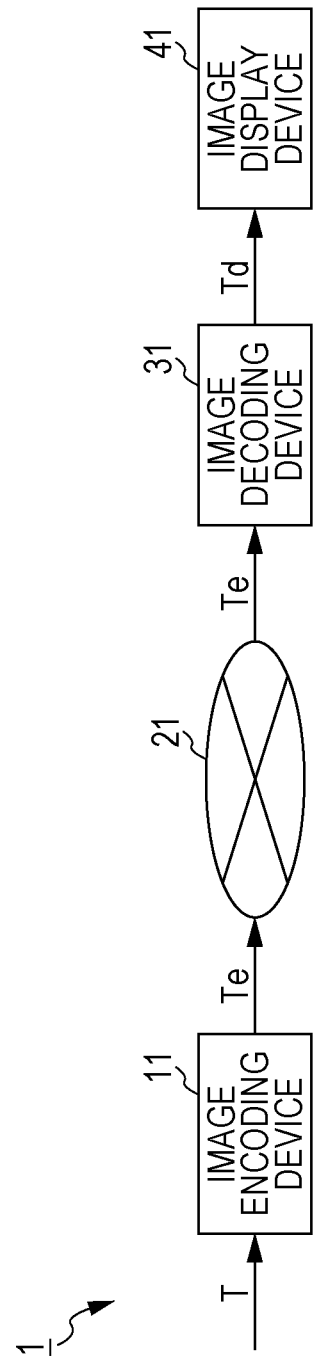
FIG. 1 is a schematic diagram illustrating the configuration of an image transmission system according to an embodiment of the present invention.

FIG. 1 is a schematic diagram illustrating the configuration of an image transmission system 1 according to the embodiment.

The image transmission system 1 is a system in which codes obtained by encoding a plurality of layer images are transmitted and images obtained by decoding the transmitted codes are displayed. The image transmission system 1 includes an image encoding device 11, a network 21, an image decoding device 31, and an image display device 41.

Signals T indicating a plurality of layer images (texture images) are input to the image encoding device 11. The layer image is an image that is recognized and photographed at a certain resolution and a certain viewpoint. When view scalable coding of encoding 3-dimensional images using a plurality of layer images is executed, each of the plurality of layer images is referred to as a viewpoint image. Here, the viewpoint corresponds to the position or an observation point of a photographing device. For example, the plurality of viewpoint images are images obtained when right and left photographing devices photograph a subject. The image encoding device 11 encodes each of the signals to generate an encoded stream Te. The details of the encoded stream Te will be described below. The viewpoint image refers to a 2-dimensional image (planar image) observed at a certain viewpoint.

The viewpoint image is expressed, for example, with a luminance value or a color signal value of each of the pixels arranged in a 2-dimensional plane. Hereinafter, one viewpoint image or a signal indicating the viewpoint image is referred to as a picture. When spatial scalable coding is executed using a plurality of layer images, the plurality of layer images include a base layer image with a low resolution and an enhancement layer image with a high resolution. When SNR scalable coding is executed using the plurality of layer images, the plurality of layer images include a base layer image with low image quality and an enhancement layer image with high image quality. The view scalable coding, the spatial scalable coding, and the SNR scalable coding may be arbitrarily combined.

The network 21 the encoded stream Te generated by the image encoding device 11 transmits the image decoding device 31. The network 21 is the Internet, a wide area network (WAN), a local area network (LAN), or a combination thereof. The network 21 is not necessarily restricted to a bi-directional communication network, but may be a uni-directional or bi-directional communication network that transmits broadcast waves of terrestrial wave digital broadcast, satellite broadcast, or the like. The network 21 may be substituted with a storage medium that records the encoded stream Te, such as a Digital Versatile Disc (DVD) or a Blu-ray Disc (BD).

The image decoding device 31 decodes each of the encoded streams Te transmitted by the network 21 and generates each of a plurality of decoded layer images Td (decoded viewpoint images Td) obtained through the decoding.

The image display device 41 displays some or all of the plurality of decoded layer images Td generated by the image decoding device 31. For example, in the view scalable coding, 3-dimensional images (stereoscopic images) or free viewpoint images are displayed in the case of all of the images and 2-dimensional images are displayed in the case of some of the images. The image display device 41 includes, for example, a display device such as a liquid crystal display or an organic electro-luminescence (EL) display. In the spatial scalable coding or the SNR scalable coding, when the image decoding device 31 and the image display device 41 have high processing capabilities, enhancement layer images with high image quality are displayed. When the image decoding device 31 and the image display device 41 have lower processing capabilities, base layer images for which the high processing capability and display capability for the enhancement layer images are not necessary are displayed.

(Configuration of Image Decoding Device)

Next, the image decoding device 31 according to the embodiment will be described.

Figure 2:
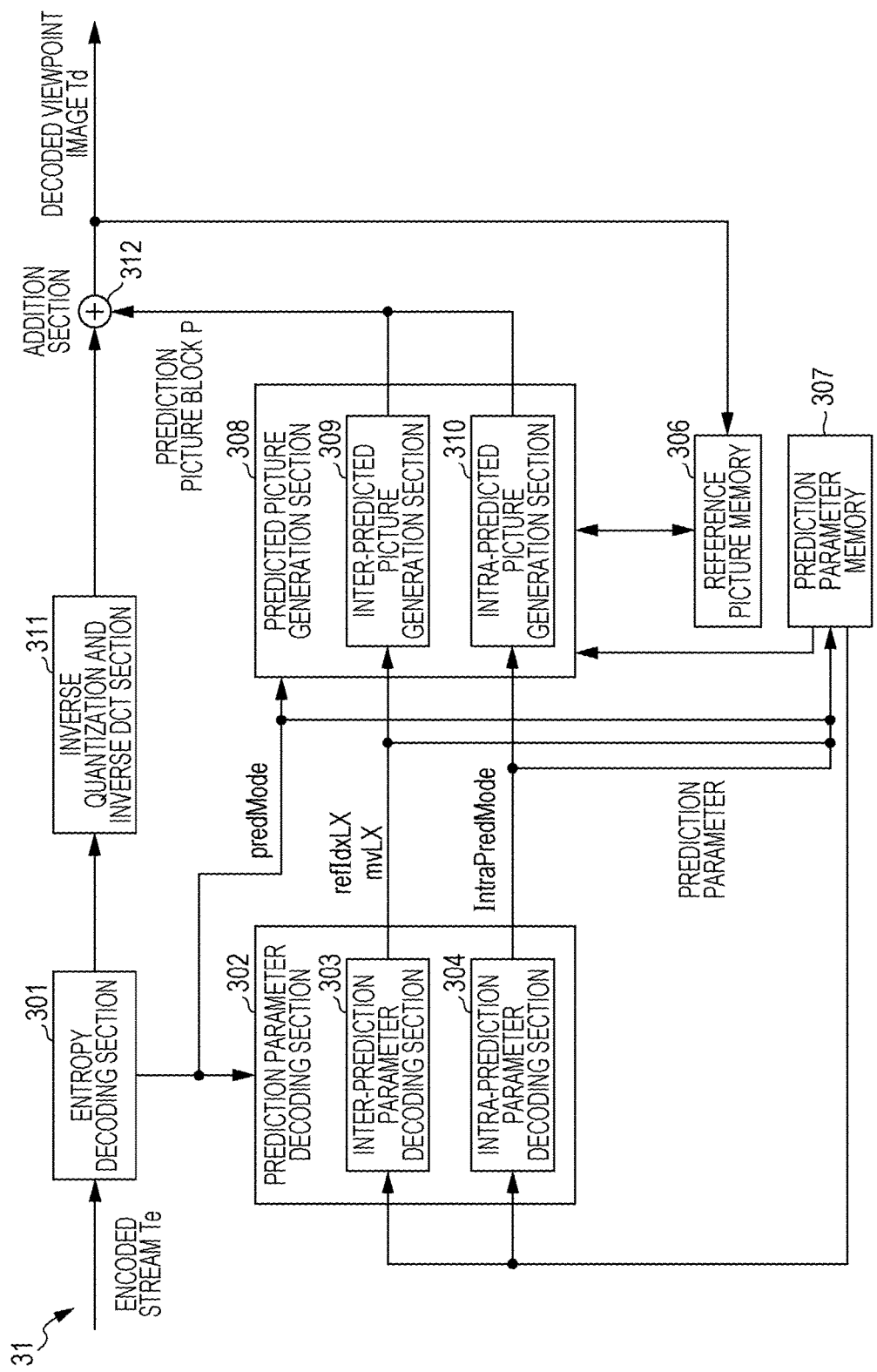
FIG. 2 is a schematic diagram illustrating the configuration of an image decoding device according to the embodiment.

FIG. 2 is a schematic diagram illustrating the configuration of the image decoding device 31 according to the embodiment.

The image decoding device 31 is configured to include an entropy decoding section 301, a prediction parameter decoding section 302, a reference picture memory (reference image storage section) 306, a prediction parameter memory (prediction parameter storage section) 307, a predicted picture generation section (predicted image generation section or predicted image generator) 308, an inverse quantization and inverse DCT section 311, and an addition section 312.

The prediction parameter decoding section 302 is configured to include an inter-prediction parameter decoding section (disparity vector generation section or predicted image generator) 303 and an intra-prediction parameter decoding section 304. The predicted picture generation section 308 is configured to include an inter-picture generation section 309 and an intra-predicted picture generation section 310.

The entropy decoding section 301 executes entropy decoding on the encoded stream Te input from the outside to generate a code string and separates individual codes from the generated code string. The separated codes are, for example, prediction information used to generate a predicted image and residual information used to generate a difference image. The prediction information is, for example, a merge flag (merge_flag), an inter-prediction flag, a reference picture index refIdx (refIdxLX), a prediction vector index idx (mvp_LX_idx), a difference vector mvd (mvdLX), a prediction mode predMode, and a merge index merge_idx. The residual information is, for example, a quantization parameter and a quantization coefficient.

The code can be obtained for each picture block. The picture block is one portion among a plurality of portions separated from one picture or a signal indicating the portion. One block includes a plurality of pixels, for example, 8 pixels in the horizontal direction and 8 pixels in the vertical direction (a total of 64 pixels). In the following description, the picture block is simply referred to as a block in some cases. A block which is a target of a decoding process is referred to as a decoding target block and a block related to a reference picture is referred to as a reference block. A block which is a target of a coding process is referred to as a coding target block.

As will be described below, a picture block which is a unit in which a predicted image is generated and a picture block which is a unit in which a quantization coefficient is derived may have different sizes. A picture block which is the unit in which a predicted image is generated is referred to as a prediction unit (PU). A picture block which is the unit in which a quantization coefficient is derived is referred to as a transform unit (TU).

The inter-prediction flag is data that indicates the kind and number of reference pictures used for inter-prediction to be described below and has one value between Pred_L0, Pred_L1, and Pred_Bi. Both of Pred_L0 and Pred_L1 indicate that one reference picture is used (uni-prediction). Pred_L and Pred_L1 indicate that reference pictures stored in a reference picture list referred to as an L0 list and an L1 list are used, respectively. Pred_Bi indicates that two reference pictures are used (bi-prediction) and indicates that the reference picture stored in the L0 list and the reference picture stored in the L1 list are all used. In the un-prediction, prediction in which a previous reference picture is used using the reference picture stored in the L0 list, that is, the decoding (or coding) target picture, as a criterion is referred to as L0 prediction. Prediction in which future reference picture is used using the reference picture stored in the L1 list, that is, the decoding (or coding) target picture, as a criterion is referred to as L1 prediction. A prediction vector index mvp_LX_idx is an index that indicates a prediction vector and a reference picture index refIdx is an index that indicates a reference picture stored in a reference picture list. The reference picture index used for the L0 prediction is denoted by refIdxL0 and the reference picture index used for the L1 prediction is denoted by refIdxL1. That is, refIdx (refIdxLX) is notation used when refIdxL0 and refIdxL1 are not distinguished from each other.

The same applies to the difference vector mvd (mvdLX) so that L0 or L1 is denoted instead of LX to distinguish the use in the L0 prediction from the use in the L1 prediction.

The merge index merge_idx is an index indicating that one motion compensation parameter among motion compensation parameter candidates (merge candidates) derived from the block subjected to the decoding process is used as a motion compensation parameter of the decoding target block. As will be described, the merge index merge_idx is an index indicating the reference block when the prediction parameter in the prediction parameter memory 307 is referred to. The merge index merge_idx is a code which can be obtained through merge encoding. The motion compensation parameters, that is, prediction parameters to be referred to, are, for example, a reference picture index refIdxLX and a vector mvLX. The vector mvLX will be described.

The entropy decoding section 301 outputs some of the separated codes to the prediction parameter decoding section 302. Some of the separated codes are, for example, the reference picture index refIdx, the vector index idx, the difference vector mvd, the prediction mode predMode, and the merge index merge_idx. The entropy decoding section 301 outputs the prediction mode predMode to the predicted picture generation section 308 and stores the prediction mode predMode in the prediction parameter memory 307. The entropy decoding section 301 outputs a quantization coefficient to the inverse quantization and inverse DCT section 311. The quantization coefficient is a coefficient obtained by executing Discrete Cosine Transform (DCT) and quantizing a residual signal in the coding process.

The inter-prediction parameter decoding section 303 decodes an inter-prediction parameter with reference to the prediction parameters stored in the prediction parameter memory 307 based on the codes input from the entropy decoding section 301. The inter-prediction refers to a prediction process executed between mutually different pictures (for example, between times or between layer images). The inter-prediction parameters refer to parameters used for inter-prediction on a picture block and are, for example, a vector mvLX and a reference picture index refIdxLX.

As the vector mvLX, there are a motion vector and a disparity vector (parallax vector). The motion vector is a vector that indicates a position deviation between the position of a block in a picture of a certain layer at a certain time and the position of a corresponding block in the picture of the same layer at a different time (for example, an adjacent discrete time). The disparity vector is a vector that indicates a position deviation between the position of a block in a picture of a certain layer at a certain time and the position of a corresponding block in a picture of a different layer at the same time. The picture of the different layer is a picture with a different viewpoint in some cases or is a picture with a different resolution in some cases. In particular, the disparity vector corresponding to the picture with the different viewpoint is referred to as a parallax vector. In the following description, when the motion vector and the disparity vector are not distinguished from each other, the motion vector and the disparity vector are simply referred to as vectors mvLX. A prediction vector and a difference vector in regard to the vector mvLX are referred to as a prediction vector mvpLX and a difference vector mvdLX. The prediction vector mvpLX is a vector obtained by executing a prediction process on the vector mvLX.

In the following description, a case will be exemplified in which the vector mvLX is a 2-dimensional vector including a component value (X component) in the horizontal direction (X direction) and a component value (Y component) in the vertical direction (Y direction) unless otherwise stated. That is, when the vector mvLX is the disparity vector (parallax vector), the X component is a part of information indicating disparity (parallax) and the Y component is different part of information indicating the disparity (parallax). Even in regard to the difference vector mvdLX, a motion vector and a disparity vector are also distinguished from each other. Classification of the vector mvLX and the difference vector mvdLX are determined using the reference picture index refIdxLX subordinated to a vector, as will be described below.

When it is clarified that the vector mvLX is a disparity vector, this vector is referred to as a disparity vector dvLX below. A prediction vector and a difference vector in regard to the disparity vector dvLX are referred to as a prediction vector dvpLX and a difference vector dvdLX, respectively. When the vector mvLX is a motion vector, this vector is also referred to as a motion vector mvLX in some cases. A prediction vector and a difference vector in regard to the motion vector mvLX are simply referred to as a prediction vector mvpLX and a difference vector mvdLX, respectively, in some cases.

The inter-prediction parameter decoding section 303 outputs the decoded inter-prediction parameters to the predicted picture generation section 308 and stores the decoded inter-prediction parameters in the prediction parameter memory 307. The details of the inter-prediction parameter decoding section 303 will be described below.

The intra-prediction parameter decoding section 304 decodes the intra-prediction parameter with reference to the prediction parameter stored in the prediction parameter memory 307 based on the codes input from the entropy decoding section 301, for example, the prediction mode PredMode. The intra-prediction parameter refers to a parameter used for a process of predicting a picture block in one picture and is, for example, an intra-prediction mode intraPredMode. The intra-prediction parameter decoding section 304 outputs the decoded intra-prediction parameter to the predicted picture generation section 308 and stores the decoded intra-prediction parameter in the prediction parameter memory 307.

The reference picture memory 306 stores a block (reference picture block) of the reference picture generated by the addition section 312 at a position decided in advance for each decoding target picture and block.

The prediction parameter memory 307 stores the prediction parameter in a position decided in advance for each decoding target picture and block. Specifically, the prediction parameter memory 307 stores the inter-prediction parameter decoded by the inter-prediction parameter decoding section 303, the intra-prediction parameter decoded by the intra-prediction parameter decoding section 304, and the prediction mode predMode separated by the entropy decoding section 301. As the stored inter-prediction parameter, for example, there are the inter-prediction flag, the reference picture index refLdxLX, and the vector mvLX.

The prediction mode predMode input from the entropy decoding section 301 and the prediction parameter from the prediction parameter decoding section 302 are input to the predicted picture generation section 308. The predicted picture generation section 308 reads the reference picture from the reference picture memory 306. The predicted picture generation section 308 generates a predicted picture block P using the input prediction parameter and the read reference picture in a prediction mode indicated by the prediction mode predMode.

Here, when the prediction mode predMode indicates an inter-prediction mode, the inter-predicted picture generation section 309 executes inter-prediction using the inter-prediction parameter input from the inter-prediction parameter decoding section 303 and the read reference picture. The inter-prediction is executed in each PU. The PU corresponds to a part of a picture formed by a plurality of pixels which is a unit in which the prediction process is executed, as described above, that is, a decoding target block subjected to a prediction process once. In the inter-prediction, there are a merge motion mode and an adaptive motion vector prediction (AMVP) mode. In either the merge prediction mode or the AMPV mode, the prediction parameter is derived using the prediction parameter of the already processed block. The merge prediction mode is a mode in which the difference vector is not decoded from the encoded data and the vector of the prediction parameter is used as a vector of a decoding target block without change. The AMVP mode is a mode in which the difference vector is decoded from the encoded data and a sum of the difference vector and the vector of the prediction parameter is used as a vector of a decoding target block. Whether the prediction mode is the merge prediction mode or the AMVP mode is identified with a value of the merge flag. The prediction modes will be described below.

The inter-predicted picture generation section 309 reads, from the reference picture memory 306, the reference picture block located at the position indicated by the vector mvLX using the decoding target block as a criterion from the reference picture indicated by the reference picture index refIdxLX. The inter-predicted picture generation section 309 executes prediction on the read reference picture block to generate the predicted picture block P. The inter-predicted picture generation section 309 outputs the generated predicted picture block P to the addition section 312.

When the prediction mode predMode indicates the intra-prediction mode, the intra-predicted picture generation section 310 executes the intra-prediction using the intra-prediction parameter input from the intra-prediction parameter decoding section 304 and the read reference picture. Specifically, the intra-predicted picture generation section 310 reads, from the reference picture memory 306, the reference picture block which is the decoding target picture and is within a pre-decided range from a decoding target block among the already decoded blocks. The pre-decided range is, for example, one of the left, upper left, upper, and upper right adjacent blocks when the decoding target blocks are sequentially moved in order of so-called raster scan and is different according to the intra-prediction mode. The order of the raster scan is an order in which the decoding target block is moved sequentially from the left end to the right end in respective rows from the upper end to the lower end of each picture.

The intra-predicted picture generation section 310 executes the prediction on the read reference picture block in the prediction mode indicated by the intra-prediction mode IntraPredMode to generate the predicted picture block. The intra-predicted picture generation section 310 outputs the generated predicted picture block P to the addition section 312.

The inverse quantization and inverse DCT section 311 executes inverse quantization on the quantization coefficient input from the entropy decoding section 301 to obtain a DCT coefficient. The inverse quantization and inverse DCT section 311 executes inverse discrete cosine transform (DCT) on the obtained DCT coefficient to calculate a decoded residual signal. The inverse quantization and inverse DCT section 311 outputs the calculated decoded residual signal to the addition section 312.

The addition section 312 adds the predicted picture block P input from the inter-predicted picture generation section 309 and the intra-predicted picture generation section 310 and the signal value of the decoded residual signal input from the inverse quantization and inverse DCT section 311 for each pixel to generate a reference picture block. The addition section 312 stores the generated reference picture block in the reference picture memory 306 and outputs a decoded layer image Td in which the generated reference picture blocks are integrated for each picture to the outside.

(Configuration of Inter-Prediction Decoding Section)

Next, the configuration of the inter-prediction parameter decoding section 303 will be described.

Figure 3:
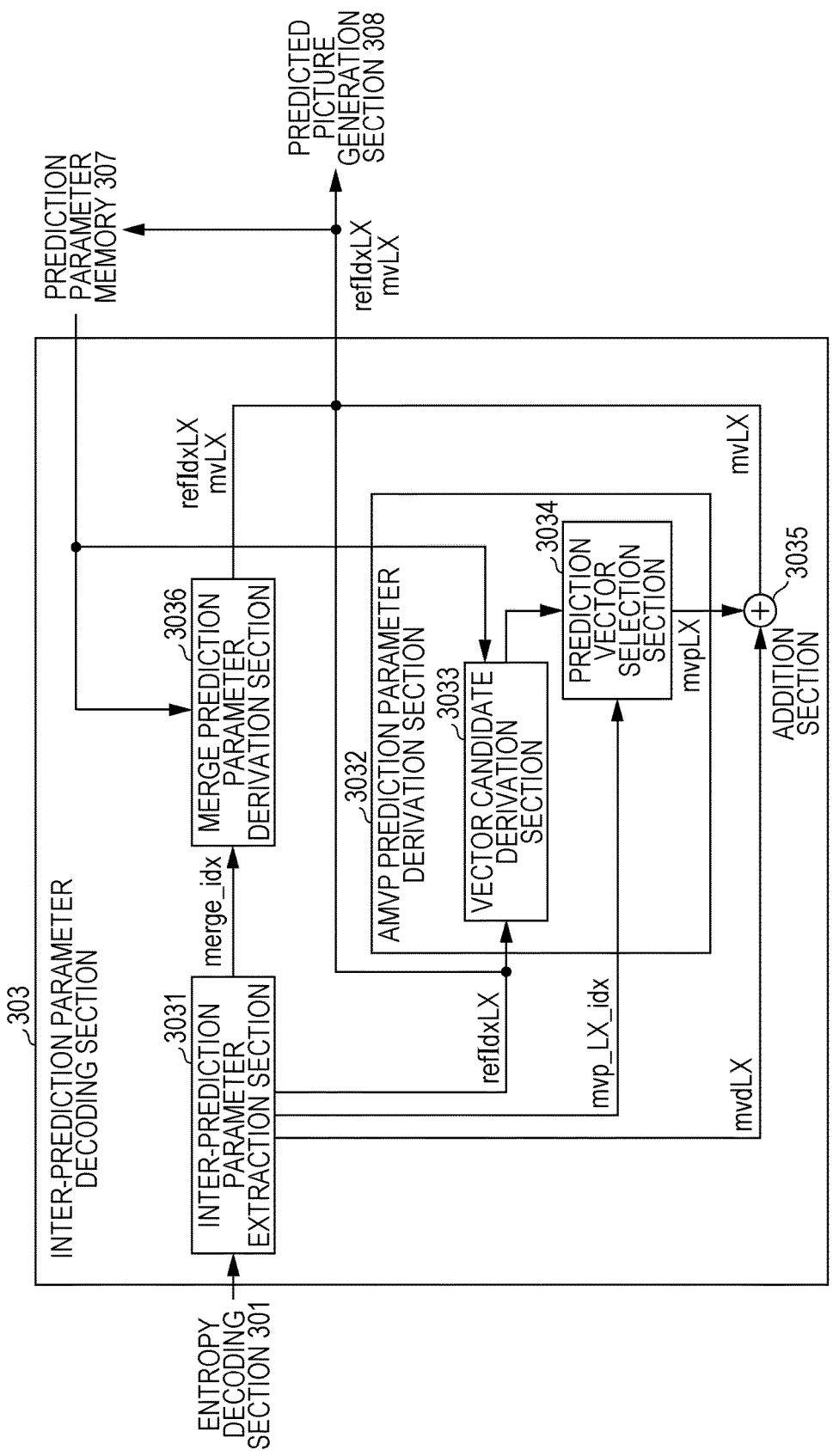
FIG. 3 is a schematic diagram illustrating the configuration of an inter-prediction parameter decoding section according to the embodiment.

FIG. 3 is a schematic diagram illustrating the configuration of the inter-prediction parameter decoding section 303 according to the embodiment.

The inter-prediction parameter decoding section 303 is configured to include an inter-prediction parameter extraction section 3031, an AMVP prediction parameter derivation section 3032, an addition section 3035, and a merge prediction parameter derivation section 3036.

The inter-prediction parameter extraction section 3031 extracts the prediction parameter related to each prediction mode among the input inter-prediction parameters based on the merge flag input from the entropy decoding section 301.

Here, when a value indicated by the merge flag is 1, that is, indicates the merge prediction mode, the inter-prediction parameter extraction section 3031 extracts, for example, a merge index merge_idx as the prediction parameter related to the merge prediction. The inter-prediction parameter extraction section 3031 outputs the extracted merge index merge_idx to the merge prediction parameter derivation section 3036.

When a value indicated by the merge flag is 0, that is, indicates the AMVP prediction mode, the inter-prediction parameter extraction section 3031 extracts the AMVP prediction parameter.

As the AMPV prediction parameters, for example, there are the inter-prediction flag, the reference picture index refIdxLX, the vector index mvp_LX_idx, and the difference vector mvdLX. The inter-prediction parameter extraction section 3031 outputs the extracted reference picture index refIdxLX to the AMVP prediction parameter derivation section 3032 and the predicted picture generation section 308 (see FIG. 2) and stores the extracted reference picture index refIdxLX in the prediction parameter memory 307 (see FIG. 2). The inter-prediction parameter extraction section 3031 outputs the extracted vector index mvp_LX_idx to the AMVP prediction parameter derivation section 3032. The inter-prediction parameter extraction section 3031 outputs the extracted difference vector mvdLX to the addition section 3035. The configuration of the inter-prediction parameter extraction section 3031 will be described below.

The AMVP prediction parameter derivation section 3032 includes a vector candidate derivation section 3033 and a prediction vector selection section 3034.

The vector candidate derivation section 3033 reads the vector (the motion vector or the disparity vector) stored in the prediction parameter memory 307 (see FIG. 2) as a vector candidate based on the reference picture index refIdx.

The read vector is a vector related to each of the blocks (for example, some or all of the blocks adjacent to the lower left end, the upper left end, and the upper right end of the decoding target block) within the pre-decided range from the decoded target block.

The prediction vector selection section 3034 selects, as the prediction vector mvpLX, the vector candidate indicated by the vector index mvp_LXX_idx input from the inter-prediction parameter extraction section 3031 among the vector candidates read by the vector candidate derivation section 3033. The prediction vector selection section 3034 outputs the selected prediction vector mvpLX to the addition section 3035.

The addition section 3035 adds the prediction vector mvpLX input from the prediction vector selection section 3034 and the difference vector mvdLX input from the inter-prediction parameter extraction section to calculate the vector mvLX. The addition section 3035 outputs the calculated vector mvLX to the predicted picture generation section 308 (see FIG. 2).

The merge prediction parameter derivation section 3036 includes a merge candidate derivation section and a merge candidate selection section (neither of which are illustrated). The merge candidate derivation section reads the prediction parameters (the vector mvLX and the reference picture index refIdxLX) stored by the prediction parameter memory 307 and derivates the read prediction parameters as merge candidates according to a predetermined rule. The merge candidate selection unit included in the merge prediction parameter derivation section 3036 selects the merge candidates (the vector mvLX and the reference picture index refIdxLX) indicated by the merge index merge_idx input from the inter-prediction parameter extraction section 3031 among the derived merge candidates. The merge prediction parameter derivation section 3036 stores the selected merge candidates in the prediction parameter memory 307 (see FIG. 2) and outputs the selected merge candidates to the predicted picture generation section 308 (see FIG. 2).

(Configuration of Inter-Prediction Parameter Extraction Section)

Next, the configuration of the inter-prediction parameter extraction section 3031 will be described.

Figure 4:
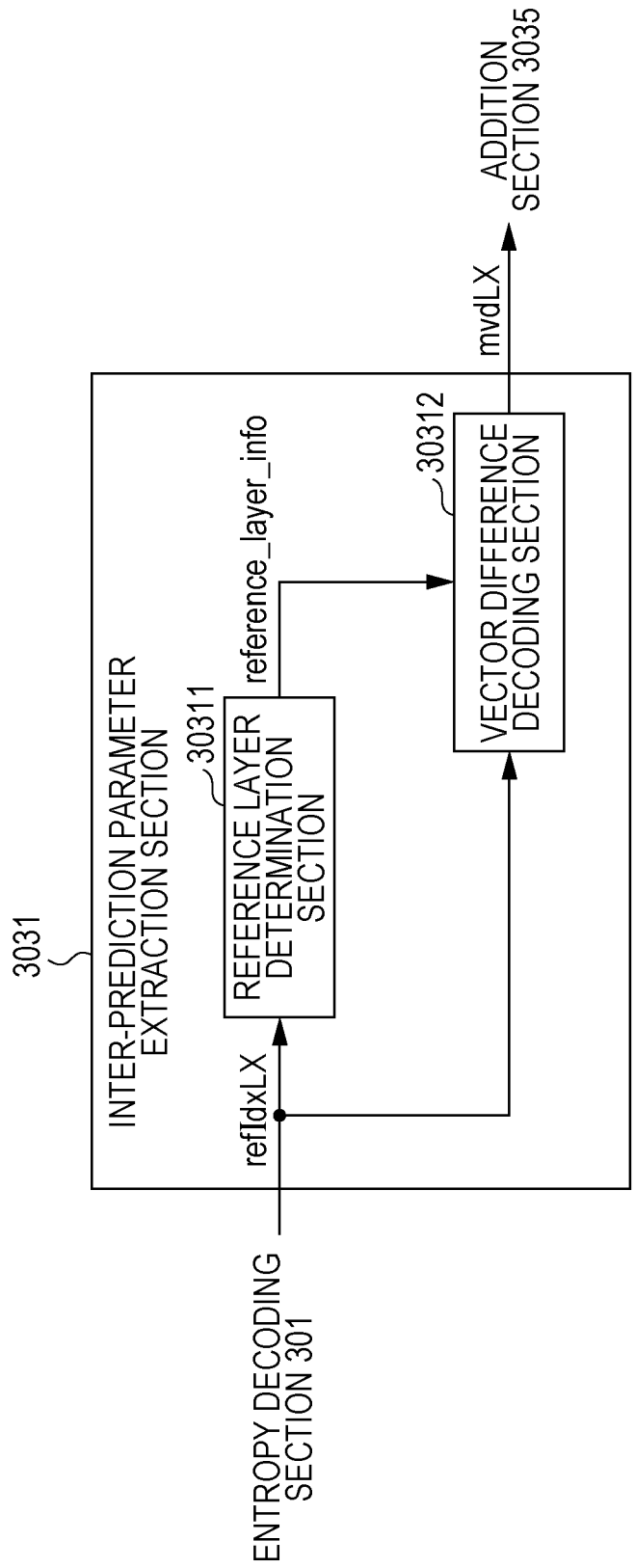
FIG. 4 is a schematic diagram illustrating the configuration of an inter-prediction parameter extraction section according to the embodiment.

FIG. 4 is a schematic diagram illustrating the configuration of the inter-prediction parameter extraction section 3031, in particular, the configuration related to the decoding of the difference vector mvdLX, according to the embodiment.

The inter-prediction parameter extraction section 3031 is configured to include a reference layer determination section 30311 and a vector difference decoding section 30312. The reference layer determination section 30311 is referred to as an inter-layer prediction determination section, an inter-view prediction determination section, and a disparity vector determination section.

The reference layer determination section 30311 decides reference layer information reference_layer_info indicating a relation the reference picture indicated by the reference picture index refIdxLX and a target picture based on the reference picture index refIdxLX input from the entropy decoding section 301. When the reference picture index refIdxLX is subordinate to the vector mvLX and the reference layer information of the vector mvLX and the reference picture index refIdxLX are subordinate to the difference vector mvdLX, the reference layer information of the difference vector is derived. The reference layer information reference_layer_info is information indicating whether the prediction is the prediction when the layer of the target picture and the layer of the reference picture are different layers. When a viewpoint image in which the layer of the target picture is present and a viewpoint image in which the layer of the reference picture is present are different viewpoint images, the inter-layer prediction corresponds to the parallax vector. Accordingly, the reference layer information reference_layer_info is also information indicating whether the vector mvLX to the reference picture is the disparity vector or the motion vector.

Prediction when the layer of the target picture and the layer of the reference picture are the same layer is referred to as same-layer prediction, and a vector obtained in this case is the motion vector. Prediction when the layer of the target picture and the layer of the reference picture are different layers is referred to as inter-layer prediction, a vector obtained in this case is the disparity vector. When the reference layer information reference_layer_info indicates that the vector mvLX is, for example, a vector (the disparity vector or the parallax vector) of the inter-layer prediction, the value of the reference layer information reference_layer_info is 1. When the vector mvLX is a vector (the motion vector) of the same-layer prediction, the reference layer information reference_layer_info is expressed as a variable in which its value is 0. The reference layer determination section 30311 outputs the generated reference layer information reference_layer_info to the vector difference decoding section 30312. The reference layer determination section 30311 may use a flag indicating whether the parameter is a POC, a view identifier (view_id), or a long-term reference picture to be described below instead of the reference picture index refIdxLX.

Examples of a determination process of the reference layer determination section 30311 will be described as first to fourth determination methods. The reference layer determination section 30311 may use one of the first to fourth determination methods or any combination of these methods.

<First Determination Method>

The reference layer determination section 30311 determines that the vector mvLX is the disparity vector when a time (Picture Order Count (POC)) related to the reference picture indicated by the reference picture index refIdxLX is the same as a time (POC) related to the decoding target picture. The POC is a number indicating a picture display order and is an integer (discrete time) indicating a time at which the picture is acquired. When the reference layer determination section 30311 determines that the vector mvLX is not the disparity vector, the reference layer determination section 30311 determines that the vector mvLX is the motion vector.

Specifically, when the picture order number POC of the reference picture indicated by the reference picture index refIdxLX is the same as the POC of the decoding target picture, the reference layer determination section 30311 determines that the vector mvLX is the disparity vector according to, for example, the following expression:

POC==ReflayerPOC (refIdxLX, ListX).

In this expression, the POC is a POC of the decoding target picture and RefPOX (X, Y) is a POC of the reference picture designated by the reference picture index X and the reference picture list Y.

The fact that the reference picture of the same POC as the POC of the decoding target picture can be referred to means that the layer of the reference picture is different from the layer of the decoding target picture. Accordingly, when the POC of the decoding target picture is the same as the POC of the reference picture, the inter-layer prediction is determined to be executed (disparity vector). Otherwise, the same-layer prediction is determined to be executed (motion vector).

<Second Determination Method>

The reference layer determination section 30311 may determine that the vector mvLX is the disparity vector (the parallax vector: the inter-layer prediction is performed) when the time related to the reference picture indicated by the reference picture index refIdxLX is different from the time related to the decoding target picture. Specifically, when the view identifier view_id of the reference picture indicated by the reference picture index refIdxLX is different from the view identifier view_id of the decoding target picture, the reference layer determination section 30311 determines that the vector mvLX is the disparity vector according to, for example, the following expression:

ViewID==ReflayerViewID (refIdxLX, ListX).

In this expression, ViewID is a view ID of the decoding target picture and RefViewID (X, Y) is a view ID of the reference picture designated by the reference picture index X and the reference picture list Y.

The view identifier view_id is information that identifies each viewpoint image. The difference vector dvdLX related to the disparity vector is based on that the fact that the difference vector dvdLX is obtained between pictures with different viewpoints and is not obtained between the pictures with the same viewpoint. When the reference layer determination section 30311 determines that the vector mvLX is not the disparity vector, the reference layer determination section 30311 determines that the vector mvLX is the motion vector.

The individual viewpoint image is a kind of layer. Therefore, when the reference layer determination section 30311 determines that the view identifiers view_id are different, the reference layer determination section 30311 determines that the vector mvLX is the disparity vector (the inter-layer prediction is performed). Otherwise, the reference layer determination section 30311 determines that the vector mvLX is the motion vector (subjected to the same-layer prediction).

<Third Determination Method>

When a layer identifier layer_id related to the reference picture indicated by the reference picture index refIdxLX is different from a layer identifier layer_id related to the decoding target picture, the reference layer determination section 30311 may determine that the vector mvLX is the disparity vector according to, for example, the following expression:

LayerID !=ReflayerID (refIdxLX, ListX).

In this expression, layerID is a layer ID of the decoding target picture and ReflayerID (X, Y) is a layer ID of the reference picture designated by the reference picture index X and the reference picture list Y.

A layer identifier layer_id is data that identifies each layer when one picture is configured to include data of a plurality of hierarchies (layers). In the encoded data in which the pictures with different viewpoints are encoded, the layer identifier is based on the fact that layer identifier has a different value according to a viewpoint. That is, a disparity vector dvdLX related to the disparity vector is a vector obtained between a target picture and a picture related to different layer. When reference layer determination section 30311 determines that the vector mvLX is not the disparity vector, the reference layer determination section 30311 determines that the vector mvLX is the motion vector.

When the layer identifiers layer_id are different, the reference layer determination section 30311 determines that the vector mvLX is the disparity vector (the inter-layer prediction is performed). Otherwise, the reference layer determination section 30311 determines that the vector mvLX is the motion vector (subjected to the same-layer prediction).

<Fourth Determination Method>

When the reference picture indicated by the reference picture index refIdxLX is the long-term reference picture, the reference layer determination section 30311 may determine that the vector mvLX is the disparity vector according to, for example, the following expression:

LongTermPic (RefIdxLX, ListX).

In this expression, LongTermPic (X, Y) is a function that is true when the reference picture designated by the reference picture index X and the reference picture list Y is the long-term reference picture.

When the reference layer determination section 30311 determines that the vector mvLX is not the disparity vector, the reference layer determination section 30311 determines that the vector mvLX is the motion vector. The long-term reference picture refers to a picture that is managed as a reference picture list apart from a short-term picture. The long-term reference picture is mainly a reference picture retained in the reference picture memory 306 for a longer time than the short-term picture and a base view picture to be described below is used as the long-term reference picture. In this case, this is because the target picture is a non-base view (to be described below) of the same time as the reference picture. The reference picture related to the disparity vector is treated as the long-term reference picture. That is, the difference vector dvdLX related to the disparity vector is a vector obtained between the target picture and the long-term reference picture.

When the reference picture is the long-term reference picture, the reference picture is the same layer as the decoding target picture. Therefore, when the reference picture is the long-term reference picture, the reference layer determination section 30311 determines that the vector mvLX is the disparity vector (the inter-layer prediction is performed). Otherwise, the reference layer determination section 30311 determines that the vector mvLX is the motion vector (subjected to the same-layer prediction). This is because whether the prediction is the inter-layer prediction or the same-layer prediction may not be precisely determined in this method, but the precision of the determination is not important for the purpose of tool control for improving coding efficiency.

The reference layer information reference_layer_info is input from the reference layer determination section 30311, and then the vector difference decoding section 30312 decodes syntax elements for deriving the difference vector mvdLX using the entropy decoding section 301 and outputs the difference vector mvdLX. The syntax elements are constituent elements of the coding parameters. Here, the syntax elements for deriving the difference vector mvdLX are abs_mvd_greater0_flag [XY], abs_mvd_greater1_flag [XY], abs_mvd_minus2_flag [XY]. Here, XY is a variable having 0 or 1 as its value. When XY=0, XY is information indicating an X component (horizontal direction component). When XY=1, XY is information indicating a Y component (vertical direction component).

When the reference layer information reference_layer_info is 1, that is, the vector mvLX is the disparity vector (the inter-layer prediction is performed), the vector difference decoding section 30312 decodes a component value (X component) dvd_x in the horizontal direction (X direction) from the encoded stream Te and decides a component value (Y component) dvd_y in the vertical direction (Y direction) as a pre-decided value, for example, zero. The vector difference decoding section 30312 decodes the difference vector dvdLX by integrating the X component dvd_x and the Y component dvd_y to configure the difference vector dvdLX.

On the other hand, when the vector mvLX is the motion vector, the vector difference decoding section 30312 decodes the X component mvd_x and the Y component mvd_y from the encoded stream Te and outputs the decoded components as the difference vector mvdLX.

The vector difference decoding section 30312 outputs the decoded difference vector mvdLX (or dvdLX) to the addition section 3035.

Thus, in the above-described example, even when the Y component dvd_y of the difference vector dvdLX related to the disparity vector is not encoded as the code of the encoded stream Te, a value decided in advance on the side of the image decoding device 31 is used as the value of the Y component. On the other hand, when the X component is a main value and the Y component is an ignorable value, for example, zero, the precision in disparity prediction does not deteriorate even in the above-described example. Accordingly, in the above-described example, it is possible to obtain the advantageous effect in which the coding efficiency is improved without the deterioration in the quality of the decoded image.

Here, an example of a coding data structure (syntax table) which is an execution target by the inter-prediction parameter extraction section 3031 will be described.

FIG. 21 is a conceptual diagram illustrating an example of an encoded data structure.

(a) to (c) of FIG. 21 illustrate a syntax 603 indicating that a viewpoint arrangement flag (camera arrangement 1D flag) camera_arrangement_1D_flag is extracted in the code input from the entropy decoding section 301. The viewpoint arrangement flag camera_arrangement_1D_flag is a code indicating whether viewpoints are arranged 1-dimensionally. For example, when the value of the viewpoint arrangement flag camera_arrangement_1D_flag is 1, the viewpoint arrangement flag camera_arrangement_1D_flag indicates that the viewpoints are arranged 1-dimensionally. When the value of the viewpoint arrangement flag camera_arrangement_1D_flag is 0, the viewpoint arrangement flag camera_arrangement_1D_flag indicates that the viewpoints are not arranged 1-dimensionally. Thus, the vector difference decoding section 30312 extracts the viewpoint arrangement flag camera_arrangement_1D_flag from the syntax 603.

(a) of FIG. 21 illustrates an example in a video parameter set video_parameter_set_rbsp( ) (b) of FIG. 21 illustrates an example in a picture parameter set pic_parameter_set_rbsp, and (c) of FIG. 21 illustrates an example in a slice header slice_header( ). When a view identifier view_id has a value other than 0 (a case other than a base view) in the example, the viewpoint arrangement flag camera_arrangement_1D_flag is extracted, but may be extracted without reference to the view identifier view_id.

FIG. 22 is a conceptual diagram illustrating an example of the encoded data structure.

In FIG. 22, a syntax 604 indicates that a syntax mvd_conding1D is included in an encoded stream when the value of the viewpoint arrangement flag camera_arrangement_1D_flag is 1 and the value of the reference layer information reference_layer_info is the same as the value (that is, 1) of INTER_VIEW. In the other cases, the syntax 604 indicates that a syntax mvd_coding is included in the encoded stream.

That is, when the syntax 604 indicates that the viewpoints are arranged 1-dimensionally (camera_arrangement_1D_flag=1), the syntax 604 indicates that the vector difference decoding section 30312 executes a syntax extracting each different code depending on whether the vector mvLX is the disparity vector or the motion vector.

The syntax mvd_coding1D and the syntax mvd_coding are indicated by a syntax 605 and a syntax 606 in FIG. 22, respectively. The meaning overviews of syntax elements abs_mvd_greater0_flag [XY], abs_mvd_grater1_flag [XY], abs_mvd_minus2_flag [XY], and abs_mvd_sign_flag [XY] have been described above. In comparison between the syntax 605 and the syntax 606, when a flag indicating that the viewpoints are arranged 1-dimensionally is 1 (positive) and the suffix XY of each syntax element is 0 (negative), that is, only the X component of the difference vector is included in the encoded stream Te. That is, the vector difference decoding section 30312 extracts (decodes) only the X component of the difference vector. In other cases, when the flag indicating that the viewpoints are arranged 1-dimensionally is 0, the decoding is executed in both of the case in which the suffix XY of each syntax element is 0 and the case in which the suffix XY of each syntax element is 1. That is, the vector difference decoding section 30312 extracts (decodes) both of the X component and the Y component. The details of the syntax mvd_coding1D will be described as follows.

The syntax mvd_coding1D is a syntax indicating that three kinds of codes indicting the X component mvdLX[0], abs_mvd_greater0_flag [0], abs_mvd_minus2 [0], and mvd_sing_flag [0], of the difference vector related to the disparity vector are extracted. Here, abs_mvd_greater0_flag [0] is a code indicating whether the absolute value of the X component mvdLX [0] is greater than 0. When the absolute value of the X component mvdLX [0] is greater than 0, the value of abs_mvd_greater0_flag [0] is 1. When the absolute value of the X component mvdLX [0] is 0, the value of abs_mvd_greater0_flag [0] is 0.

Here, abs_mvd_minus2 [0] is a code indicating that a value is less than the absolute value of the X component mvdLX [0] by 2 when the absolute value is greater than 1. Further, mvd_sign_flag [0] is a code indicating that the positive or negative value of the X component mvdLX [0]. When the X component mvdLX [0] has a positive value, the value of mvd_sign_flag [0] is 1. When the X component mvdLX [0] has a negative value, the value of mvd_sign_flag [1] is 0.

Thus, the vector difference decoding section 30312 executes the syntax 605 and extracts such three kinds of codes, abs_mvd_greater0_flag [0], abs_mvd_minus2 [0], and mvd_sign_flag[0]. Thereafter, the vector difference decoding section 30312 calculates the X component mvdLX [0] of the difference vector using the following expression.

if (!abs_greater0_flag[0]) abs_mvd_minus2[0]=−2 if (!abs_greater1_flag[0]) abs_mvd_minus2[0]=−1 mvdLX[0]=(abs_mvd_minus2[0]+2)*(1−2*mvd_sign_flag[0])

That is, the first two expressions indicate that abs_mvd_minus2 [XY] is decided as −2 when abs_greater0_flag[0] is 0 and abs_mvd_minus2 [0] is decided as −1 when abs_greater1_flag [0] is 0. The subsequent expression indicates that the value mvdLX [0] of the X component of the difference vector is decided by deciding either a positive value or a negative value is decided in a value obtained by adding 2 to abs_mvd_minus2 [0] according to mvd_sign_flag [0]. The vector difference decoding section 30312 decides 0 as the Y component mvdLX [1] of the difference vector.

The encoded stream structure may be not a structure in which the syntax mvd_coding1D and the syntax mvd_coding are switched but a structure in which only the syntax mvd_coding is used by arranging the viewpoint 1-dimensionally by the syntax 604 (camera_arrangement_1D_flag=1). In this case, the Y component (abs_mvd_greater0_flag [1]) of the difference vector is included in the encoded stream only when camera_arrangement_1D_flag==1 and reference_layer_info (ref_idx_LX[x0][y0])==INTERVIEW as in the following expression.

if(camera_arrangement_1D_flag==1 &&! reference_layer_info (ref_idx_LX[x0][y0])==INTER_VIEW)

abs_mvd_greater0_flag [1]

In the case of the encoded stream structure, the encoded data vector difference decoding section 30312 decodes the Y component (abs_mvd_greater0_flag [1]) of the difference vector only when camera_arrangement_1D_flag==1 and reference_layer_info (ref_idx_LX[x0][y0])==INTER_VIEW.

The encoded data vector difference decoding section 30312 sets 0 in the flag when the flag (abs_mvd_greater0_flag [1]) indicating whether the absolute value of the Y component of the difference vector exceeds 0 is not decoded (abs_mvd_greater0_flag[1]=0).

(Example of Reference Picture List)

Next, an example of the reference picture list will be described. The reference picture list is a line formed from reference pictures stored in the reference picture memory 306 (see FIG. 2).

Figure 17:
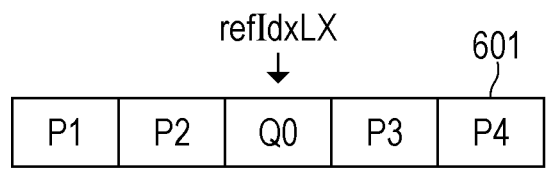
FIG. 17 is a conceptual diagram illustrating an example of a reference picture list.

FIG. 17 is a conceptual diagram illustrating an example of the reference picture list.

In the reference picture list 601, five rectangles arranged in one line right and left indicate reference pictures. Codes P1, P2, Q0, P3, and P4 shown in order from the left end to the right are codes indicating the reference pictures. P such as P1 indicates a viewpoint P and Q of Q0 indicates a viewpoint Q different from the viewpoint P. The suffixes of P and Q indicate the picture order number POC. A downward directed arrow immediately below refIdxLX indicates that the reference picture index refIdxLX is an index referring to the reference picture Q0 in the reference picture memory 306.

(Example of Vector Candidate)

Next, an example of the above-described vector candidate will be described.

Figure 18:
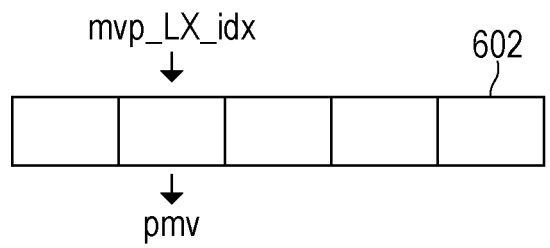
FIG. 18 is a conceptual diagram illustrating an example of a vector candidate.

FIG. 18 is a conceptual diagram illustrating an example of a vector candidate.

A prediction vector list 602 illustrated in FIG. 18 is a list formed by a plurality of vector candidates derived by the vector candidate derivation section 3033.

In the prediction vector list 602, five rectangles arranged in one line right and left indicate prediction vectors. A downward directed arrow immediately below mvp_LX_idx at the second from the left end and pmv below indicate an index in which the vector index mvp_LX_idx refers to the vector pmv in the prediction parameter memory 307.

(Acquisition of Candidate Vector)

Next, an example of a method of acquiring candidate vectors will be described. A candidate vector is generated based on a vector related to a referred block with reference to a block which is a block subjected to the decoding process and is a block (for example, an adjacent block) within a range decided in advance from a decoding target block.

Figure 20:
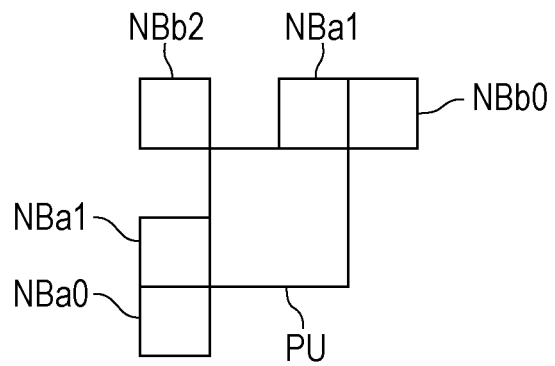
FIG. 20 is a conceptual diagram illustrating an example of an adjacent block.

FIG. 20 is a conceptual diagram illustrating an example of an adjacent block.

In FIG. 20, a PU indicted by a rectangle is a decoding target block. Two rectangles NBa0 and NBa1 adjacent to the left side of the PU and three rectangles NBb2, NBb1, and NBb0 adjacent to the upper side of the PU indicate adjacent blocks.

The vector candidate derivation section 3033 (see FIG. 3) reads the vectors in order from the two blocks NBa0 and NBa1 adjacent to the left side of the PU from the prediction parameter memory 307 and derives one candidate vector based on the read vectors. The vector candidate derivation section 3033 reads the three blocks NBb2, NBb1, and NBb0 adjacent to the upper side of the PU in order from the prediction parameter memory 307 and derives one candidate vector based on the read vectors.

When the candidate vector is derived, the vector candidate derivation section 3033 preferentially executes processes to be described below in order of (1) and (2).

(1) When the reference picture of the adjacent block is the same as the reference picture indicated by the reference picture index refIdx of the decoding target block and the prediction direction LX, a vector related to the adjacent block is read. Thus, when the vector indicated by the reference picture index refIdx and the prediction direction LX is the disparity vector, the vector referred to in the adjacent block is determined to be disparity vector.

As the prediction parameters referred to in the adjacent block, there are a prediction parameter related in the prediction direction indicated by LX and a prediction parameter related to a prediction direction (LY) different from the prediction direction indicated by LX. Here, the prediction parameter is referred to in order of the vector related to the prediction direction indicated by LX and the vector related to the prediction direction indicated by LY.

When the vector related to the prediction direction indicated by LX is read, it is determined whether the reference picture index refIdx of the reference target is the same as the reference picture index of the decoding target picture. In this way, it can be determined whether the picture of the decoding target is the same as the read picture from which the vector is read.

When the vector related to the prediction direction indicated by LY is read, it is determined whether the picture order number POC of the picture from the vector is read is the same as the POC of the picture of the decoding target. In this way, it can be determined whether the picture of the decoding target is the same as the picture from which the vector is read. This is because the picture referred to is different according to the prediction direction even when the reference picture index is the same.

(2) When it is determined that the vector may not be read from the same picture as the picture of the decoding target in (1), the following process is performed.

When the reference picture referred to in the adjacent block and the reference picture indicated by the reference picture index refIdxLX of the decoding target block are together the long-term reference pictures, the vector is referred to in the order of the vector related to the prediction direction indicated by LX and the vector related to the prediction direction indicated by LY. This is because the reference picture related to the base view is stored as the long-term reference picture in the reference picture memory 306. That is, when the reference picture indicated by the reference picture index refIdxLX is the long-term reference picture, the vector related to the block of the reference picture is the disparity vector. Therefore, the disparity vector of the adjacent block is referred to.

When the reference picture referred to in the adjacent block and the reference picture indicated by the reference picture index refIdxLX of the decoding target block are together the short-term reference pictures, the vector read from the adjacent block is subjected to a scaling process. The value of the read vector is taken as a value within a pre-decided range because of the scaling process. The short-term reference picture is a reference picture other than the long-term reference picture and is a reference picture stored only for a pre-decided time in the reference picture memory 306 and is removed when the time has passed.

When depth information (depth map) indicating a distance of a subject in a depth direction is input other than (1) and (2), the vector candidate derivation section 3033 may extract the depth information in the decoding target block and calculate the disparity vector indicating a disparity with a size corresponding to the extracted depth information as a candidate vector.

(Example of Reference Picture)

Next, an example of the reference picture used at the time of the derivation of the vector will be described.

Figure 19:
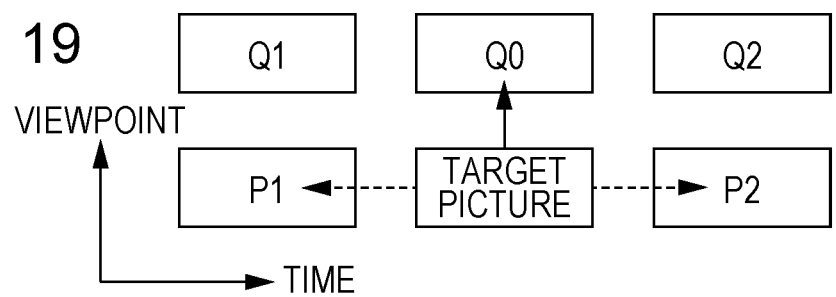
FIG. 19 is a conceptual diagram illustrating an example of a reference picture.

FIG. 19 is a conceptual diagram illustrating an example of a reference picture.

In FIG. 19, the horizontal axis represents a time and the vertical axis represents a viewpoint.

As illustrated in FIG. 19, rectangles in horizontal two rows and vertical three columns (six in total) indicate pictures. Of the six rectangles, the second rectangle from the left side of the lower row indicates a picture (target picture) of the decoding target and the remaining five rectangles indicate the reference pictures. A reference picture Q0 indicated by an upward arrow from the target picture is a picture that has the same time as the target picture and a different viewpoint from the target picture. In the disparity prediction in which the target picture serves as a criterion, the reference picture Q0 is used. A reference picture P1 indicated by a leftward arrow from the target picture is a picture that has the same viewpoint as the target picture and is a previous picture of the target picture. A reference picture P2 indicated by a rightward arrow from the target picture is a picture that has the same viewpoint as the target picture is a subsequent picture of the target picture. In motion prediction in which the target picture is a criterion, the reference picture P1 or P2 is used.

MODIFICATION EXAMPLE D1

Next, a modification example D1 of the embodiment will be described. The same reference numerals are given to the same configuration and the above-description description will be quoted.

An image decoding device 31a according to the modification example includes an AMVP prediction parameter derivation section 3032a instead of the AMVP prediction parameter derivation section 3032 of the inter-prediction parameter decoding section 303 (see FIG. 3) of the image decoding device 31. The remaining configuration of the image decoding device 31a according to the modification example D1 is the same as the configuration of the image decoding device 31 (see FIG. 2).

Figure 5:
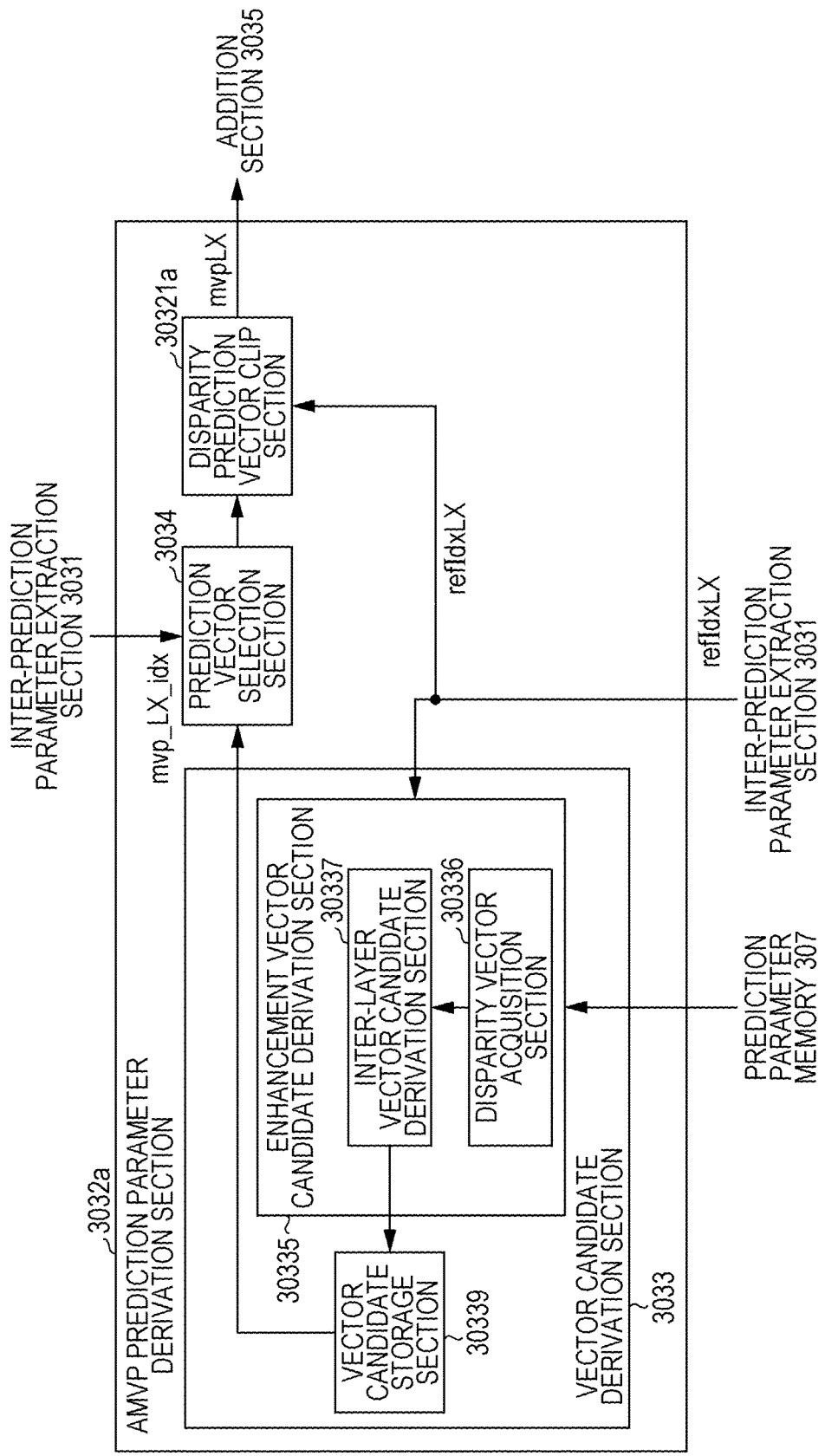
FIG. 5 is a schematic diagram illustrating the configuration of an AMVP prediction parameter derivation section according to a modification example D1 of the embodiment.

FIG. 5 is a schematic diagram illustrating the configuration of an AMVP prediction parameter derivation section 3032a according to the modification example.

An AMVP prediction parameter derivation section 3032a includes a disparity prediction vector clip section 30321a in addition to a vector candidate derivation section 3033 and a prediction vector selection section 3034.

The vector candidate derivation section 3033 is configured to include an enhancement vector candidate derivation section 30335, and a vector candidate storage section 30339, and a basic vector candidate derivation section (not illustrated) (to be described below).

The enhancement vector candidate derivation section 30335 is configured to include a disparity vector acquisition section 30336 and an inter-layer vector candidate derivation section 30337 (inter-view vector candidate derivation section).

The reference picture index refIdx and the reference layer information reference_layer_info are input from the inter-prediction parameter extraction section 3031 (see FIG. 3) to the disparity vector acquisition section 30336. When the reference layer information reference_layer_info indicates that the vector mvLX is the disparity vector, the disparity vector acquisition section 30336 reads the disparity vector dvLX related to the reference picture indicated by the reference picture index refIdx from the prediction parameter memory 307. The read disparity vector is the disparity vector dvLX of each block within the pre-decided range from the decoding target block. The disparity vector acquisition section 30336 outputs the read disparity vector dvLX to the inter-layer vector candidate derivation section 30337.

The reference picture index refIdxLX is input from the inter-prediction parameter extraction section 3031 (see FIG. 4) to the inter-layer vector candidate derivation section 30337 and the disparity vector dvLX of each block from the disparity vector acquisition section 30336 is input to the inter-layer vector candidate derivation section 30337.

The inter-layer vector candidate derivation section 30337 specifies the reference picture (layer image) related to the reference picture index refIdx. In a case in which the reference picture is the layer image different from the target picture, the inter-layer vector candidate derivation section 30337 outputs the derived disparity vector of the disparity vector acquisition section 30336. The case in which the reference picture is the layer image different from the target picture is, for example, a case in which the reference picture is a non-criterion viewpoint non-base view (also referred to as a non-base view) and the target picture is a criterion viewpoint (also referred to as a base view) in some cases.

In the case of the layer image in which the reference picture is the same as the target picture, the inter-layer vector candidate derivation section 30337 specifies a different parameter reference layer image (here, a layer image of a criterion viewpoint) from the target picture, derives the disparity vector in regard to the specified picture from the disparity vector acquisition section 30336, and reads the vector of the parameter reference layer image (the layer image of the criterion viewpoint) located at a position corresponding to the disparity vector from the prediction parameter memory 307.

More specifically, in the case of the layer image in which the reference picture is the same as the target picture, the inter-layer vector candidate derivation section 30337 specifies the position of a block located at a position deviated from a starting point by the disparity vector dvLX input from the disparity vector acquisition section 30336 using the following expressions when the decoding target block in the specified picture (layer image) is the starting point.

xRef=xP+((nPSW−1)>>1)+((dvLX [0]+2)>>2)

yRef=yP+((nPSH−1)>>1)+((dvLX [1]+2)>>2)

The specified block is referred to as a correspondence block. Here, xRef and yRef indicate the coordinates of the correspondence block, xP and yP are the coordinates of upper left coordinates of the decoding target block, nPSW and nPSH are the width and height of the decoding target block, and dvLX [0] and dvLX [1] are an X component and a Y component of the disparity vector input from the disparity vector acquisition section 30336. Further, . . . >>~ indicates shift to the right by ~bits. That is, a bit value of . . . is a bit shift operator indicating calculation of shift by the number of lower digits by ~bits. The inter-layer vector candidate derivation section 30337 reads the vector mvLX related to the correspondence block from the prediction parameter memory 307.

The inter-layer vector candidate derivation section 30337 stores the read vector mvLX as a vector candidate in the vector candidate storage section 30339.

The reference picture index refIdx and the prediction vector mvpLX from the prediction vector selection section 3034 are input to the disparity prediction vector clip section 30321*a*. The prediction vector mvpLX is a 2-dimensional vector that includes a component value mvp_x in the X direction and a component value mvp_y in the Y direction as elements.

Here, when the prediction vector mvpLX is the prediction vector dvpLX based on the disparity vector, that is, the reference layer determination section 30311 determines that the inter-layer prediction is performed using the reference picture index refIdx as an input, the disparity prediction vector clip section 30321*a* restricts the Y component dvp_y to a value within the pre-decided range. The value of the pre-decided range is, for example, one value (zero or the like). When the Y component dvp_y is less than a pre-decided lower limit (−64 pixels or the like), the lower limit is used. When the Y component dvp_y is greater than a pre-decided upper limit (64 pixels or the like), the upper limit is used.

The disparity prediction vector clip section 30321*a* reconstructs the disparity vector dvpLX from the component value dvp_x in the X direction and the component value dvp_y in the Y direction in which the value is restricted and outputs the reconstructed disparity vector dvpLX to the addition section 3035 (see FIG. 3).

When the prediction vector mvpLX is the motion prediction vector, the disparity prediction vector clip section 30321*a*, that is, the reference layer determination section 30311 determines that the inter-layer prediction is not performed using the reference picture index refIdx as the input, the input motion prediction vector mvpLX is output to the addition section 3035.

The disparity prediction vector clip section 30321*a* may input the reference layer information reference_layer_info input from the reference layer determination section 30311. When the input reference layer information reference_layer_info is the vector mvLX is the disparity vector, the disparity prediction vector clip section 30321*a* determines that the prediction vector mvpLX is the disparity prediction vector.

A process of deriving a candidate (candidate vector) of the prediction vector in the vector candidate derivation section 3033 will be described.

The above-described image decoding device 31*a* includes an AMVP prediction parameter derivation section 3032*a* that derives the prediction vector of the decoding target block and includes a reference layer determination section 30311 that determines whether the vector of the target block or the vector difference is for inter-layer prediction which is the prediction between different layers. When the reference layer determination section 30311 determines that the inter-layer prediction is performed, at least one component of the prediction vector of the decoding target block is restricted to a pre-decided value.

Even when the Y component dv_y of dvLX of the disparity vector generally has a pre-decided value, for example, has a tendency to be concentrated and distributed on the periphery of zero, the Y component dv_y has a value distant from the range in coding in some cases. In this case, accuracy of the disparity prediction may deteriorate.

On the other hand, in the modification example D1, since the Y component dvp_y of the prediction vector related to the disparity vector is restricted to a value of a pre-decided range, the deterioration in the accuracy in the disparity prediction can be suppressed. Thus, the coding efficiency is improved.

MODIFICATION EXAMPLE D2

Next, another modification example D2 of the embodiment will be described. The same reference numerals are given to the same configuration and the above-description description will be quoted.

The main configuration of an image decoding device 31*b* according to the modification example D2 is the same as the configuration of the image decoding device 31*a* according to the modification example D1. That is, the image decoding device 31*b* includes the disparity prediction vector clip section 30321*a* (see FIG. 5) as in the image decoding device 31*a* according to the modification example D1. Differences between both of the image decoding devices will be mainly described.

When the vector mvLX is the disparity vector, disparity vector restriction information disparity_restriction is included in the encoded stream Te input to the entropy decoding section 301 (see FIG. 2) in the image decoding device 31*b*.

The disparity vector restriction information disparity_restriction is information indicating whether the Y component dvp_y of the prediction vector is restricted to a value of a pre-decided range and indicating whether the Y component dvd_y of the difference vector is restricted to a pre-decided value. For example, the fact that the value of the disparity vector restriction information disparity_restriction is zero indicates that both values of the Y component dvp_y of the prediction vector and the Y component dvd_y of the difference vector are not restricted. The fact that the value of the disparity vector restriction information disparity_restriction is 1 indicates that the Y component dvp_y of the prediction vector is restricted to the value of the pre-decided range and the value of the Y component dvd_y of the difference vector is not restricted. The fact that the value of the disparity vector restriction information disparity_restriction is 2 indicates that the value of the Y component dvd_y of the difference vector is limited to the value of the pre-decided range without restriction of the Y component dvp_y of the prediction vector. The fact that the value of the disparity vector restriction information disparity_restriction is 3 indicates that the value of the Y component dvp_y of the prediction vector is limited to the value of the pre-decided range and the value of the Y component dvd_Y of the difference vector is restricted to the value of the pre-decided range.

In particular, when the value of the pre-decided range is set to 0 in the restriction of the Y component of the difference vector and the value of the disparity vector restriction information disparity_restriction is zero or 1, the difference vector dvdLX is a 2-dimensional vector including the X component dvd_x and the Y component dvd_y as elements. When the value of the disparity vector restriction information disparity_restriction is 2 or 3, the difference vector dvdLX is a scalar value that includes the X component dvd_x as an element and does not include the Y component dvd_y as an element.

When the entropy decoding section 301 in the image decoding device 31b separates the disparity vector restriction information disparity_restriction from the encoded stream Te and outputs the separated disparity vector restriction information disparity_restriction to the inter-prediction parameter extraction section 3031 (see FIGS. 3 and 4). The inter-prediction parameter extraction section 3031 outputs the disparity vector restriction information disparity_restriction to the disparity prediction vector clip section 30321a (see FIG. 5).

The disparity vector restriction information disparity_restriction input from the entropy decoding section 301 is input to the vector difference decoding section 30312 (see FIG. 4) of the inter-prediction parameter extraction section 3031 (see FIG. 3).

When the value of the disparity vector restriction information disparity_restriction is zero or 1, the difference vector mvdLX input from the entropy decoding section 301 is output the addition section 3035.

When the value of the disparity vector restriction information disparity_restriction is 2 or 3, the vector difference decoding section 30312 restricts the Y component dvd_Y to a value of a pre-decided range. The vector difference decoding section 30312 integrates the X component dvd_x of the input difference vector dvdLX and the Y component dvd_y of which the value is restricted to the value of the pre-decided range to reconstruct the difference vector dvdLX. The vector difference decoding section 30312 outputs the reconstructed difference vector dvdLX to the addition section 3035 (see FIG. 3).

The disparity vector restriction information disparity_restriction is input from the inter-prediction parameter extraction section 3031 to the disparity prediction vector clip section 30321a (see FIG. 5). When the value of the disparity vector restriction information disparity_restriction is zero or 2, the disparity prediction vector clip section 30321a output the predicted vector dvpLX input from the prediction vector selection section 3034 to the addition section 3035. When the value of the disparity vector restriction information disparity_restriction is 1 or 3, the disparity prediction vector clip section 30321a restricts the Y component dvp_y to the value of the pre-decided range. The disparity prediction vector clip section 30321a reconstructs the prediction vector dvpLX from the X component dvp_x and the Y component dvp_y of which the value is restricted to the value of the pre-decided range and outputs the reconstructed prediction vector dvpLX to the addition section 3035.

In the modification example D2, the reference layer determination section 30311 (see FIG. 4) may be omitted in the inter-prediction parameter extraction section 3031.

The disparity vector restriction information disparity_restriction may be included in the encoded stream Te for each layer image (parallax image) or may be included for each sequence. Coding parameters in regard to a sequence of all of the layers (viewpoints) included in a certain stream are referred to as a view parameter set (VPS). A set of the coding parameters for each sequence is referred to as a sequence parameter set (SPS). The sequence is a set of a plurality of pictures from resetting (re-configuring) performed once to subsequent resetting in the decoding process.

The above-described image decoding device 31b includes a reference layer determination section 30311 that determines whether the vector of the target block or the vector difference is for the inter-layer prediction which is the prediction between different layers. When the disparity vector restriction information disparity_restriction is decoded in a higher parameter of the target block and the reference layer determination section 30311 determines the inter-layer prediction and when the disparity vector restriction information disparity_restriction is a predetermined value, at least one component of the vector of the target block is not decoded from the encoded data but is derived as a predetermined value (for example, 0). When the reference layer determination section 30311 determines the inter-layer prediction, at least one component of the difference vector of the target block is not decoded from the encoded data but is derived as a predetermined value (for example, 0).

In this way, in the modification example D2, whether to use the disparity in the Y direction can be switched according to arrangement of the viewpoints (cameras) or the like at which an image is acquired or a scene of a photographed image. For example, in a certain image (for example, an image of a grid extending in the vertical direction) in which an edge in the vertical direction is mainly shown, a disparity (parallax) in the Y direction is not perceived. Accordingly, in an image photographed by a plurality of cameras arranged at positions distant from a straight line extending in the horizontal direction, whether to use the disparity in the Y direction can be switched depending on whether a scene is the scene in which an edge in the vertical direction is mainly shown. Accordingly, suppression of the deterioration in the image quality of the scene as a whole and reduction in an information amount of the encoded stream Te can be compatible.

MODIFICATION EXAMPLE D3

Next, still another modification example D3 of the embodiment will be described.

An image decoding device 31c according to the modification example D3 includes an inter-prediction parameter decoding section 303c instead of the inter-prediction parameter decoding section 303 (see FIG. 3) of the image decoding device 31 (FIGS. 1 and 2). The main configuration of an image decoding device 31c according to the modification example D3 is the same as the configuration of the image decoding device 31 excluding an inter-prediction parameter decoding section 303c. Thus, the same reference numerals are given to the same configuration and the above-description description will be quoted.

When the reference layer information reference_layer_info is 1, that is, the vector mvLX is the disparity vector (the inter-layer prediction is performed), the vector difference decoding section 30312 decodes the component value (X component) dvd_x in the horizontal direction (X direction) from the encoded stream Te and sets the component value (Y component) dvd_y in the vertical direction (Y direction) to a pre-decided value, for example, zero. The vector difference decoding section 30312 decodes the difference vector dvdLX by integrating the X component dvd_x and the Y component dvd_y and configuring the difference vector dvdLX.

On the other hand, when the vector mvLX is the motion vector, the vector difference decoding section 30312 decodes the X component mvd_x and the Y component mvd_y from the encoded stream Te and outputs the X component and the Y component as the difference vector mvdLX. The vector difference decoding section 30312 outputs the decoded difference vector mvdLX (or dvdLX) to the addition section 3035.

When the difference vector mvdLX is the difference vector related to the disparity vector, the inter-prediction parameter decoding section 303 according to the modification example D3 decodes the X component dvd_x from the encoded stream Te and derives the Y component dvd_y according to a pre-decided predetermined rule.

On the other hand, when the vector mvLX is the motion vector, the vector difference decoding section 30312 decodes the X component mvd_x and the Y component mvd_y from the encoded stream Te and outputs the X component and the Y component as the difference vector mvdLX. The vector difference decoding section 30312 outputs the decoded difference vector mvdLX (or dvdLX) to the addition section 3035.

Even when the difference vector mvdLX is the difference vector related to the disparity vector, the difference vector mvdLX may also be, for example, a 2-dimensional vector in which the value of the Y component mvd_y is normally zero.

The encoded stream Te input to the entropy decoding section 301 (see FIG. 2) includes coefficients indicating a relation between the X component dvd_x and the Y component dvdLX_y of the disparity vector. As the coefficients, there are a gradient coefficient inter_view_grad and an intercept coefficient inter_view_offset. The gradient coefficient inter_view_grad is a coefficient indicating a change amount of the Y component dvd_y with respect to a change in the X component dvd_x. The intercept coefficient inter_view_offset is a coefficient indicating the value of the Y component dvdLX_y when the X component dvd_x is zero.

Figure 6:
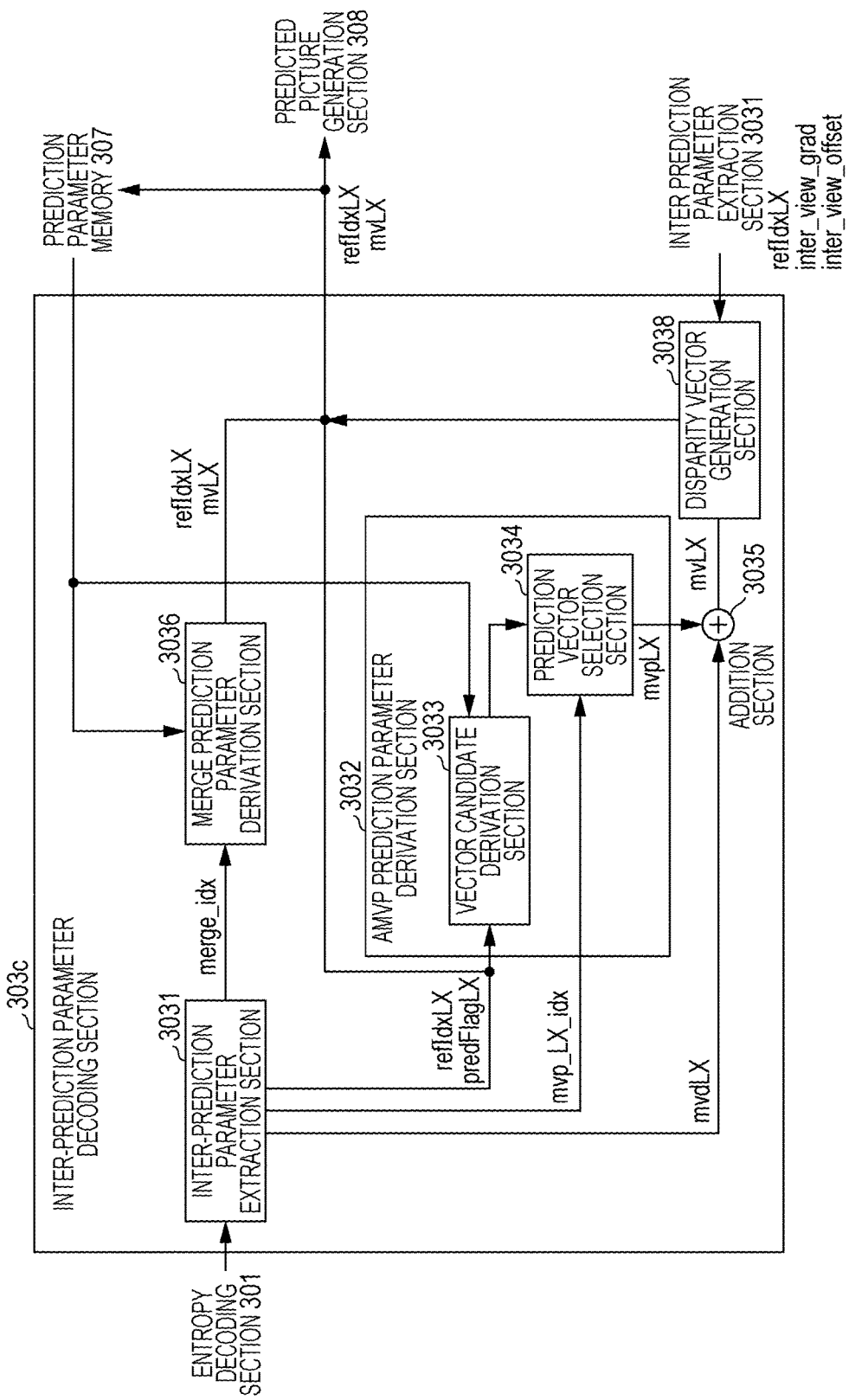
FIG. 6 is a schematic diagram illustrating the configuration of an inter-prediction parameter decoding section according to a modification example D3 of the embodiment.

FIG. 6 is a schematic diagram illustrating the configuration of the inter-prediction parameter decoding section 303c according to the modification example. The inter-prediction parameter decoding section 303c further includes a disparity vector generation section 3038 in the inter-prediction parameter decoding section 303 (see FIG. 3) of the image decoding device 31 (see FIG. 2). The main configuration of the inter-prediction parameter decoding section 303c according to the modification example D3 is the same as the configuration of the inter-prediction parameter decoding section 303 (see FIG. 3) excluding the disparity vector generation section 3038. Thus, the same reference numerals are given to the same configuration and the above-description description will be quoted.

Here, the inter-prediction parameter extraction section 3031 separates the gradient coefficient inter_view_grad and the intercept coefficient inter_view_offset from the encoded stream Te. The inter-prediction parameter extraction section 3031 outputs the separated gradient coefficient inter_view_grad and the intercept coefficient inter_view_offset to the disparity vector generation section 3038. Even when the encoded stream Te does not include the gradient coefficient inter_view_grad and includes the intercept coefficient inter_view_offset, the inter-prediction parameter extraction section 3031 can be applied. In this case, the inter-prediction parameter extraction section 3031 separates the intercept coefficient inter_view_offset from the encoded stream Te and outputs the intercept coefficient inter_view_offset to the disparity vector generation section 3038.

The disparity vector dvLX output to the disparity vector generation section 3038 by the addition section 3035 is a scalar value that includes the X component dv_x as an element and does not include the Y component dv_y. The disparity vector dvLX may be a vector in which the value of the Y component dv_y is a fixed value (or an indefinite) which is zero.

Next, the configuration of the disparity vector generation section 3038 will be described.

Figure 7:
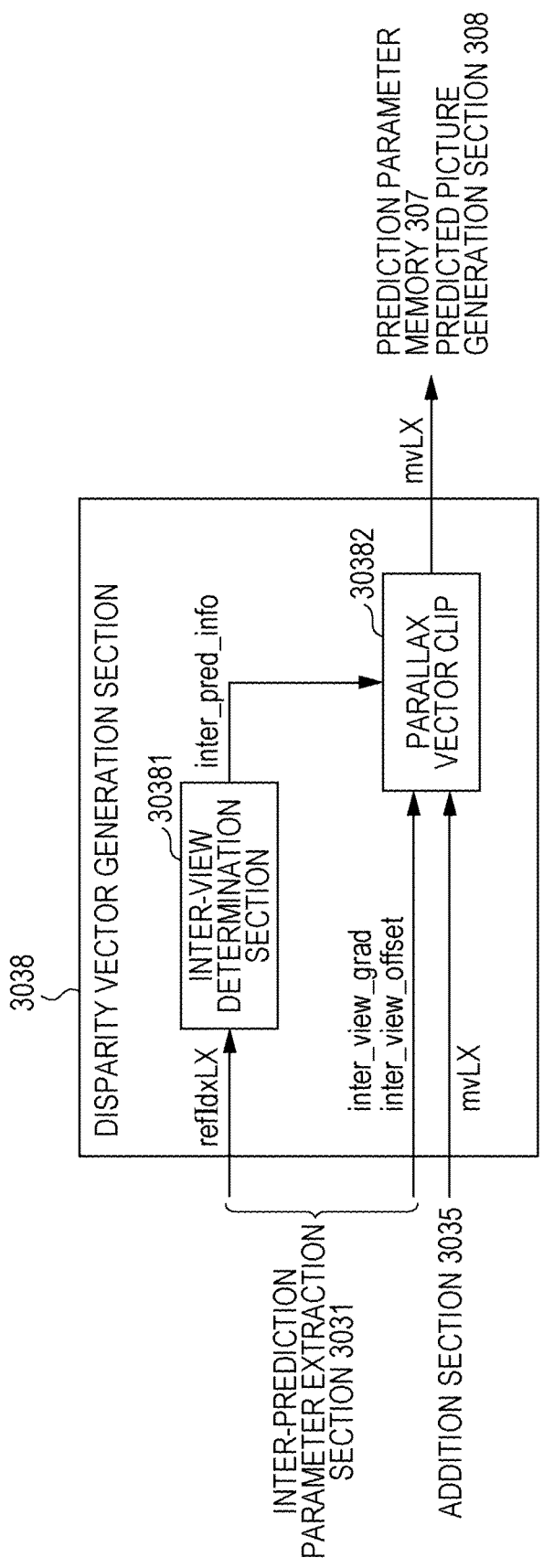
FIG. 7 is a schematic diagram illustrating the configuration of a disparity vector generation section according to the modification example D3 of the embodiment.

FIG. 7 is a schematic diagram illustrating the configuration of the disparity vector generation section 3038 according to the modification example.

The disparity vector generation section 3038 is configured to include a reference layer determination section 30381 and a disparity vector setting section 30382.

As in the reference layer determination section 30311 (see FIG. 4), the reference layer determination section 30381 determines whether the vector mvLX is the inter-layer prediction (disparity vector) or the motion vector based on the reference picture index refIdxLX input from the inter-prediction parameter extraction section 3031. The reference layer determination section 30381 generates the reference layer information reference_layer_info in regard to the vector mvLX. The reference layer determination section 30381 outputs the generated reference layer information reference_layer_info to the disparity vector setting section 30382.

The vector mvLX is input from the addition section 3035 to the disparity vector setting section 30382, and the gradient coefficient inter_view_grad and the intercept coefficient inter_view_offset are input from the inter-prediction parameter extraction section 3031 to the disparity vector setting section 30382.

When the reference layer information reference_layer_info indicates that the vector mvLX is the inter-layer prediction (disparity vector), the disparity vector setting section 30382 calculates the Y component dv_y based on the X component dv_x, the gradient coefficient inter_view_grad, and the intercept coefficient inter_view_offset. Here, the disparity vector setting section 30382 uses an expression, dv_y=inter_view_grad·dv_x+inter_view_offset. When the encoded stream Te does not include the gradient coefficient inter_view_grad and includes the intercept coefficient inter_view_offset, the disparity vector setting section 30382 uses an expression, dv_y=inter_view_offset. The disparity vector setting section 30382 may derive a median value of the Y component dv_y by a sum of the intercept coefficient inter_view_offset and a product of the absolute value of the X component dv_x and the gradient coefficient inter_view_grad and a and may perform a process of changing the sign of the median value of the Y component dv_y so match the sign of the X component dv_x.

The disparity vector setting section 30382 integrates the input X component dv_x and the calculated Y component dv_y to configure the 2-dimensional disparity vector dvLX, stores the configured disparity vector dvLX in the prediction parameter memory 307, and outputs the disparity vector dvLX to the predicted picture generation section 308. Both of inter_view_grad and inter_view_offset are integers.

When the Y component dv_y is quantized in a predetermined quantization step GRAD, the disparity vector setting section 30382 may calculate the Y component dv_y using the following expression:

$$dv\_y = inter\_view\_grad \cdot dv\_x / GRAD + inter\_view\_offset.$$

When the value of the quantization step GRAD is a GSHIFT power of 2 (GRAD=1<<GSHIFT), the disparity vector setting section 30382 may use the following expression:

$$dv\_y = floor\{(inter\_view\_grad + GROUND + dv\_x >> GSHIFT) + inter\_view\_offset\}.$$

Here, the value of GSHIFT is a predetermined shift value (integer) greater than 1. Here, 1<<GSHIFT indicates an integer which is a GSHIFT power of 2. Further, floor {...} indicates a floor function supplying an integer portion of a real number .... Further, ... >>~ is a bit shift operator indicating calculation of shifting a bit value of ... by ~bits to the number of lower digits. That is, ... >>GSHIFT indicates that ... is divided by the GSHIFT power of 2. ROUND is an integer used to realize rounding division. The value of ROUND is 1<<(GSHIFT-1), that is, a half value of the GSHIFT power of 2 which is divider.

When the reference layer information reference_layer_info indicates that the vector mvLX is the motion vector, the disparity vector setting section 30382 stores the motion vector mvLX input from the addition section 3035 in the prediction parameter memory 307 without change and outputs the motion vector mvLX to the predicted picture generation section 308.

The gradient coefficient inter_view_grad and the intercept coefficient inter_view_offset may be included for each sequence or may be included for each picture in the encoded stream Te. That is, a set of the coding parameters for each sequence is referred to as a sequence set and a set of the coding parameters for each picture is a picture parameter set (PPS). A set of parameters in units of slices may be included in a slice header. In particular, such coefficients may be included in each picture to follow a minute change in units of pictures of a scene.

The above-described image decoding device 31c includes the reference layer determination section 30381 that determines that the vector of the target block or the vector difference is for the inter-layer prediction which is the prediction between the different layers. When the reference layer determination section 30381 determines that the inter-layer prediction is performed, at least one component of the vector of the target block is derived based on one component of the target block and a value decoded from the upper parameter than the target block or based on the value decoded from the upper parameter than the target block. The reference layer determination section 30381 determines that the inter-layer prediction, at least the one component of the difference vector of the target block is not decoded from the encoded data but is derived as a predetermined value (for example, 0).

In this way, in the modification example D3, the disparity in the Y direction can be reproduced even when the disparity in the Y direction is not completely a predetermined value (for example, zero) in a case in which the arrangement or the direction of the viewpoints (cameras) at which an image is acquired is not precisely parallel in one direction. In the modification example, a relation between the disparity in the X direction and the disparity in the Y direction can be switched according to a scene of the photographed image. The suppression of the deterioration in the image quality of the scene as a whole and reduction in an information amount of the encoded stream Te can be compatible.

MODIFICATION EXAMPLE D4

Next, still another modification example D4 of the embodiment will be described. The same reference numerals are given to the same configuration and the above-description description will be quoted.

An image decoding device 31d according to the modification example includes an inter-prediction parameter decoding section 303d instead of the inter-prediction parameter decoding section 303 (see FIG. 3) of the image decoding device 31. The main configuration of the inter-prediction parameter decoding section 303d according to the modification example D4 is the same as the configuration of the inter-prediction parameter decoding section 303 (see FIG. 3). Thus, the same reference numerals are given to the same configuration and the above-description description will be quoted.

Figure 8:
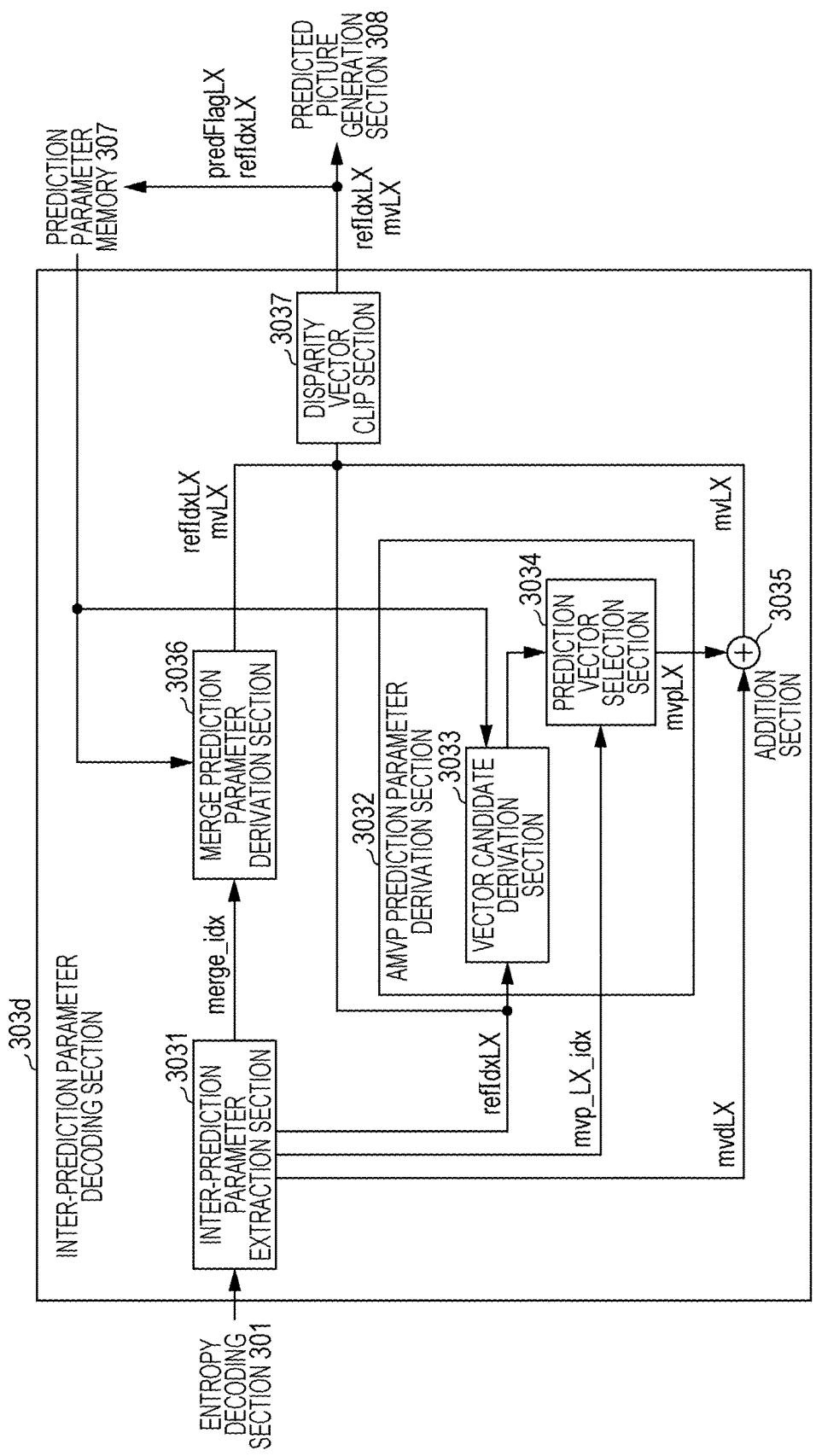
FIG. 8 is a schematic diagram illustrating the configuration of an inter-prediction parameter decoding section according to the modification example D4 of the embodiment.

FIG. 8 is a schematic diagram illustrating the configuration of the inter-prediction parameter decoding section 303d according to the modification example.

The inter-prediction parameter decoding section 303d is configured to include an inter-prediction parameter extraction section 3031, an AMVP prediction parameter derivation section 3032, an addition section 3035, a merge prediction parameter derivation section 3036, and a disparity vector clip section (disparity vector restriction section) 3037.

The disparity vector clip section 3037 stores the reference picture index refIdxLX input from the inter-prediction parameter extraction section 3031 in the prediction parameter memory 307 and outputs the reference picture index refIdxLX to the predicted picture generation section 308. When the vector mvLX input from the addition section 3035 is for the inter-layer prediction (disparity vector), that is, a reference layer determination section 30371 determines the inter-layer prediction using the reference picture index refIdx as an input, the disparity vector clip section 3037 restricts a range of a value of the vector to a value of a pre-decided range and outputs the disparity vector dvLX of which the value is restricted to the predicted picture generation section 308.

The disparity vector clip section 3037 may restrict a range of a value of the disparity vector dvLX input from the merge prediction parameter derivation section 3036 to a value within a pre-decided range, as in the disparity vector dvLX input from the addition section 3035.

Figure 9:
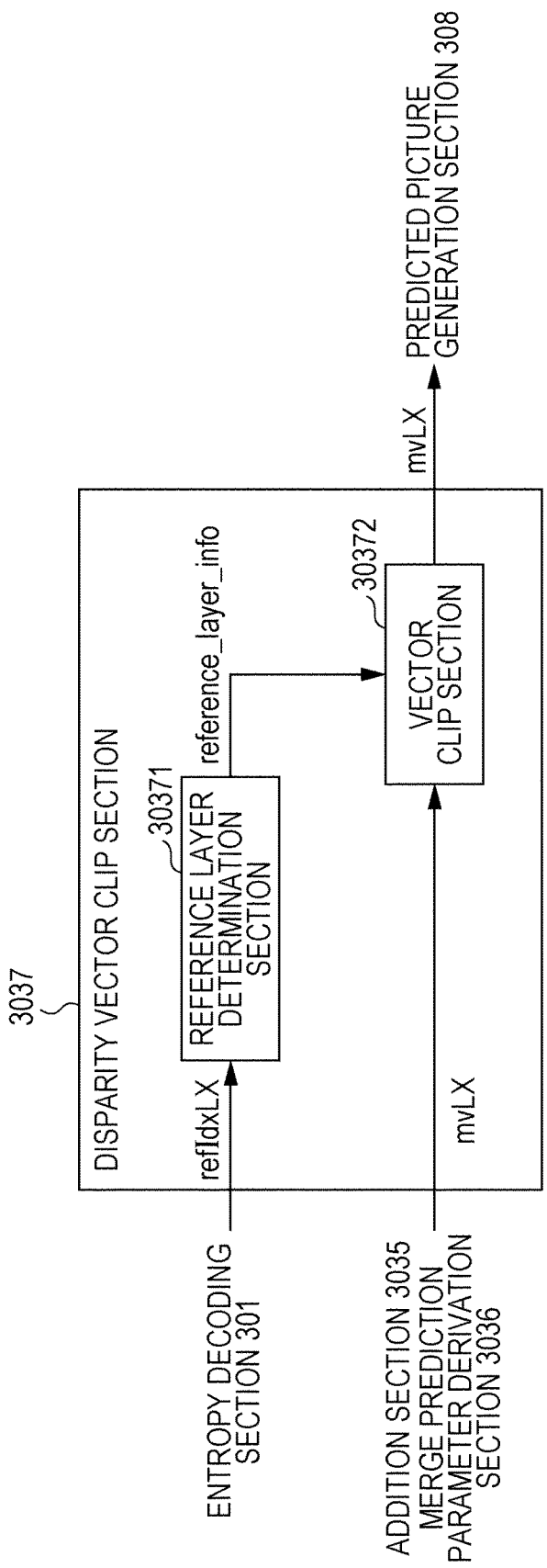
FIG. 9 is a schematic diagram illustrating the configuration of a disparity vector clip section according to the modification example D4 of the embodiment.

FIG. 9 is a schematic diagram illustrating the configuration of the disparity vector clip section 3037 according to the modification example D4.

The disparity vector clip section 3037 is configured to include the reference layer determination section 30371 and a vector clip section 30372.

The reference layer determination section 30371 determines whether the vector mvLX is the disparity vector (the disparity vector: the inter-layer prediction is performed) or the motion vector based on the reference picture index refIdxLX input from the entropy decoding section 301, as in the reference layer determination section 30311 (see FIG. 4).

The vector mvLX is input from the addition section 3035 or the merge prediction parameter derivation section 3036 is input to the vector clip section 30372 and the reference layer information reference_layer_info is input from the reference layer determination section 30371 to the vector clip section 30372.

When the reference layer information reference_layer_info indicates the vector mvLX is the disparity vector (the inter-layer prediction is performed), the vector clip section 30372 restricts the value of the disparity vector dvLX to a value within a pre-decided range. The restriction of the disparity vector may be performed one of the X component and the Y component or both of the X component and the Y component.

For example, when the value of the X component dv_x of the disparity vector dvLX is greater than a pre-decided upper limit of the X component, the vector clip section 30372 decides the value of the X component dv_x as the upper limit of the X component. When the value of the X component dv_x is less than a pre-decided lower limit of the X component, the vector clip section 30372 decides the value of the X component dv_x as the lower limit of the X component.

When the value of the Y component dv_y is greater than a pre-decided upper limit of the Y component, the vector clip section 30372 decides the value of the Y component dv_y as the upper limit of the Y component. When the value of the Y component dv_y is less than a pre-decided lower limit of the Y component, the vector clip section 30372 decides the value of the Y component dv_y as the lower limit of the Y component.

In consideration of the fact that the plurality of layer images are processed in parallel, as will be described below, for example, a value such as 28 or 56 is effective as the upper limit of the Y component. A range of the disparity vector is, for example, about 10% of the width of a screen. The upper limit of the X component is, for example, 10% or ⅛ of the width of a screen. The upper limit of the X component may be ¹⁄₁₆ of the width of a screen.

In the above-described example, when the values of the X component dv_x and the Y component dv_y exceed the pre-decided values, the upper limit and the lower limit have been decided, but the embodiment is not limited thereto. For example, the vector clip section 30372 may restrict the values based on surplus values of a variable range of the X component dv_x and the Y component dv_y (that is, a difference between the upper limit and the lower limit). For example, when the variable width of the X component is $2^k$ (where k is an integer greater than 0, for example, 7), dv_x may be restricted to dv_x % $2^k$-$2^k$ (when dv_x≥$2^{k-1}$) or dv_X % $2^k$ (where 0≤dv_x<$2^{k-1}$). Here, . . . % ~ indicates a surplus value obtained by dividing a variable . . . by a variable ~. In this way, the value of the X component dv_x is restricted between the minimum value $-2^{k-1}$ and the maximum value $2^{k-1}-1$.

Since the value of the difference vector dvdLX with respect to the displacement vector dvLX is restricted, an coding amount at the time of the encoding of the difference vector dvdLX can be reduced.

In each of the above-described examples, the variable range of the Y component may be set to be less than the variable range of the X component. For example, when the variable with of the X component is 2048, the variable with of the Y component is set to 64. That is, by setting the range of the value of the Y component to be narrower than the range of the value of the X component, an information amount related to the Y component can be reduced.

The vector clip section 30372 outputs the disparity vector dvLX of which the value is restricted to the predicted picture generation section 308.

When the reference layer information reference_layer_info indicates that the vector mvLX is not for the inter-layer prediction (the motion vector), the vector clip section 30372 outputs the input vector mvLX to the predicted picture generation section 308 without change.

In the modification example, an internal memory 3061 (a cache memory) may be included and the reference picture block may be read from the inter-predicted picture generation section 309 via the internal memory 3061. The internal memory 3061 may be a storage medium with a smaller storage capacity than the reference picture memory 306 and a fast access speed.

Figure 10:
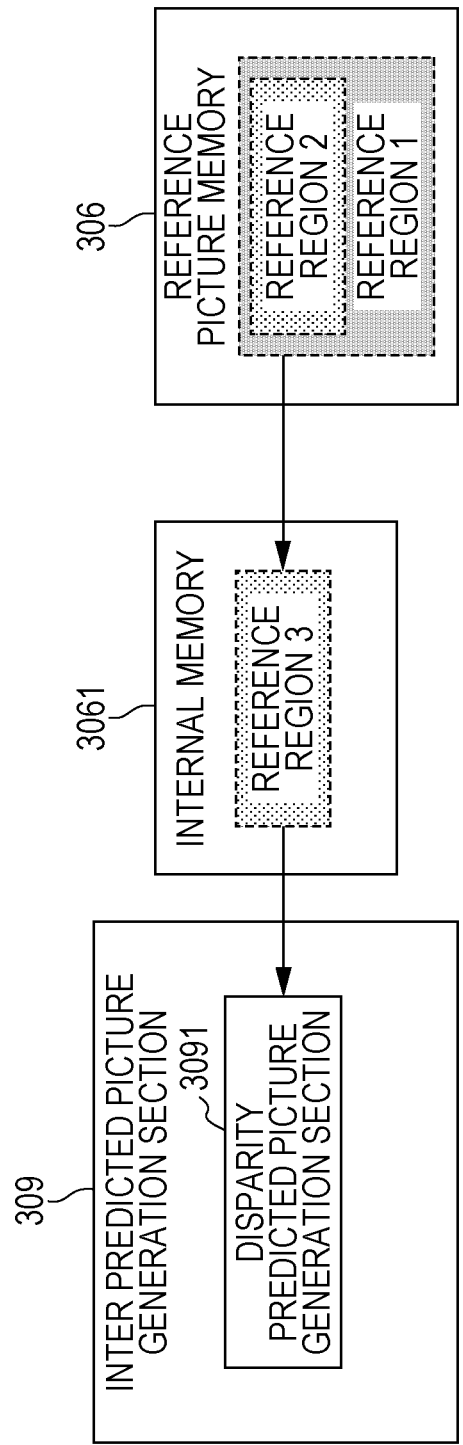
FIG. 10 is a conceptual diagram illustrating an example of a configuration in which an inter-predicted picture generation section reads a reference picture block according to the modification example D4 of the embodiment.

FIG. 10 is a conceptual diagram illustrating an example of a configuration in which the inter-predicted picture generation section 309 reads a reference picture block according to the modification example D4.

A rectangular region indicating the reference picture memory 306 in FIG. 10 include reference region 1. Reference region 1 is a reference region of the disparity vector before a value taken in the modification example D4 is restricted. Reference region 1 includes reference region 2. Reference region 2 is a reference region of which a value taken in the modification example D4 is restricted.

The internal memory 3061 includes reference region 3. Reference region 3 is a region in which the reference picture stored in the reference region 2 of the reference picture memory 306 is temporarily stored. The inter-predicted picture generation section 309 includes a disparity predicted picture generation section 3091.

The disparity predicted picture generation section 3091 reads the reference picture block located at a position indicated by the disparity vector mvLX using the decoding target block as a criterion from the internal memory 3061. Here, a region from which the reference picture block is read is reference region 3. Reference region 3 suffices when a range of a value of the disparity vector mvLX is contained. Therefore, since a storage capacity of the internal memory 3061 according to the modification example D4 can be set to be small, the image decoding device can be realized economically. The disparity predicted picture generation section 3091 performs a prediction process on the read reference picture block to generate a disparity compensation predicted picture as the predicted picture block P.

Figure 23:
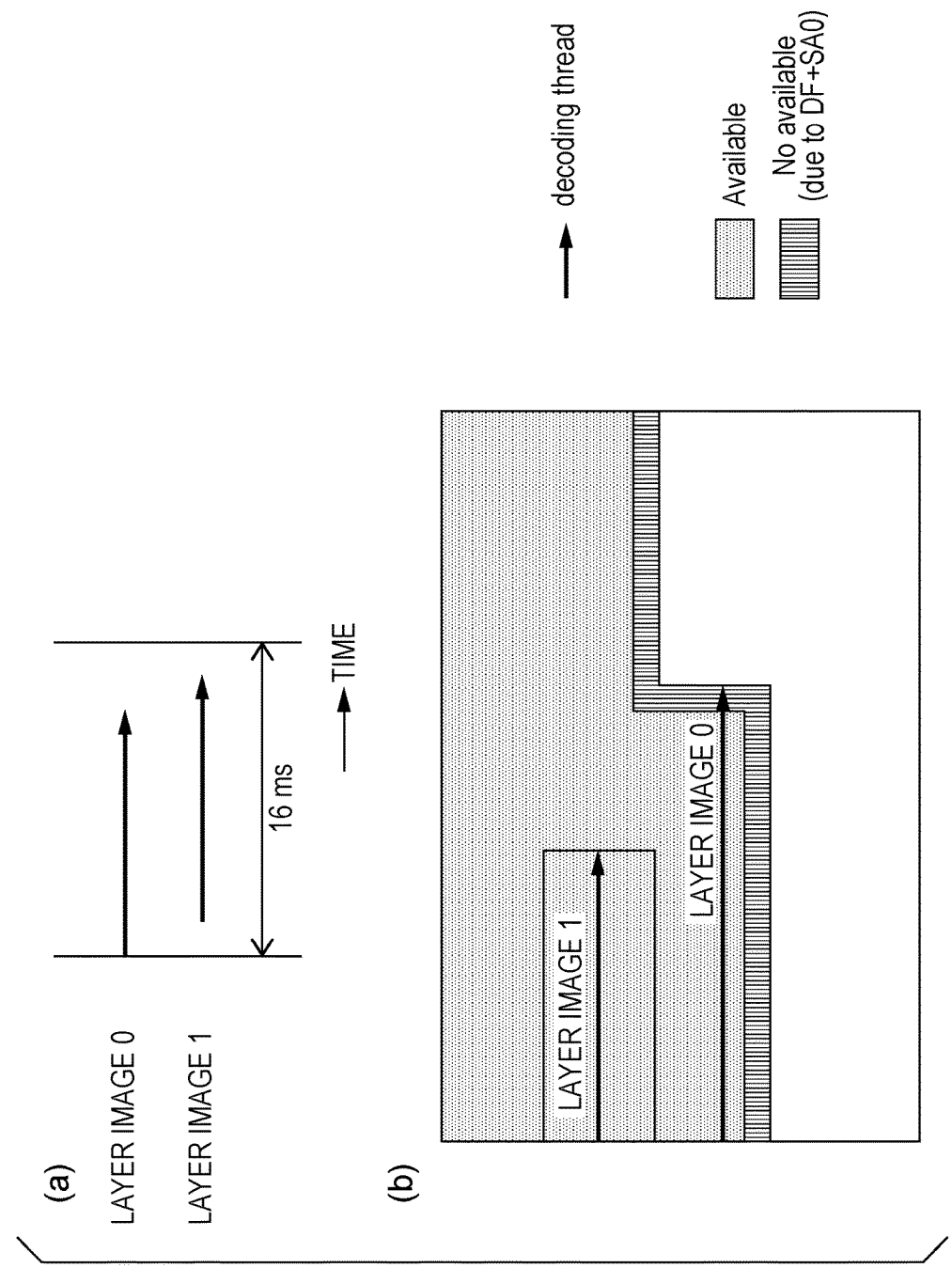
FIG. 23 is a diagram for describing necessity to restrict a disparity vector.

FIG. 23 is a diagram for describing necessity to restrict the disparity vector.

As illustrated in (a) of FIG. 23, when a moving image formed by a plurality of layer images is decoded, the plurality of layer images (here, layer 0 and layer 1) are decoded in parallel to complete the decoding within a predetermined time (in this example, 16 ms) using a device with a restricted decoding speed.

Since layer 1 is encoded depending on layer 0 in the scalable coding, the layers may not be decoded completely in parallel. However, for example, when the layers are decoded in a block unit, layer 1 can be decoded later than layer 0 merely by predetermined block lines.

(b) of FIG. 23 illustrates an example in which layer 1 is decoded later than layer 0 by one coding block (1 CTB [Coding Tree Block] line) (shown on the upper side in (b) of FIG. 23). An arrow in (b) of FIG. 23 indicate region (decoding thread) in which each layer image is decoded. The leading end of the arrow indicates a right end of a block in which a decoding process is currently being executed. A hatched portion indicates a region in which layer image 1 is available as a current reference picture in the decoding of layer 1 in a region in which the decoding process is executed in the decoding process. A vertical stripe portion indicates a region in which layer image 1 is not available as a current reference picture in the decoding of layer image 0 in the region in which the decoding process is executed in the decoding process. The reason why layer image 1 is not available is process delay in the decoding process, for example, deblocking filtering (DF) and sample adaptive offset filtering (SAO) (due to DF+SAO).

Here, as a range of the disparity vector indicating a region of an image of layer 0 which can be referred to from layer 1, for example, restriction expressed by the following expression may be imposed:

upper limit of Y coordinate of disparity vector=height of encoded block×N−LFH−MCH upper limit of X coordinate of disparity vector=width of encoded block×M−LFW−MCW Here, N is the number of delaying encoded block lines (rows), M is the number of delaying encoded columns (columns), LFW and LFH are the width and height of a range related to a loop filter, and MCW and MCH are the width and height of a range related to a motion compensation filter. Typically, LFW and LFH are 4 obtained by adding 3 of a range applied to the deblocking filter and 1 of a range applied to the adaptive offset filter, but not limited thereto. For example, when the adaptive offset filter is not applied to the reference layer, 3 (LFH=LFW=3) of only the deblocking filter may be used. When the loop filter is not applied to the reference layer, 0 (LFH=LFW=0) may be used. Further, MCW and MCH are 4 when the number of taps of the motion compensation filter is 8, and are 3 when the number of taps is 6.

For example, when the size of the encoded block is 32, the range of the disparity vector is as follows in the case of delay of one line:

upper limit of Y coordinate of disparity vector=32× 1−4−4=28.

Here, the upper limit of the Y coordinate of the disparity vector may be a value equal to or greater than 28. For example, when the size of the encoded block is 64, the following value may be decided as the range of the disparity vector in the case of delay of one line:

upper limit of Y coordinate of disparity vector=64× 1−4−4=56.

Here, the upper limit of the Y coordinate of the disparity vector may be a value equal to or greater than 56.

The above-described image decoding device 31$d$ includes a prediction parameter decoding section (inter-prediction parameter decoding section 303$d$) that derives a vector of a target block from a sum of the prediction vector and the vector difference decoded from the encoded data. The image decoding device 31$d$ includes a predicted image generation section (the inter-predicted picture generation section 309) that reads a reference image of a region indicated by a vector derived by the vector derivation section from the reference image storage section and generates a predicted image based on the read reference image. The image decoding device 31$d$ includes a reference layer determination section 30371 that determines whether the vector of the target block is for the inter-layer prediction which is the prediction between the different layers. The image decoding device 31$d$ includes a vector clip mechanism (the vector clip section 30372) that restricts at least one component of the vector of the target block to a predetermined range when the reference layer determination section 30371 determines that the vector of the target block is for the inter-layer prediction.

Thus, in the modification example D4, it is possible to decrease a range in which the value of the disparity vector can be taken. This range corresponds to a reference region which is a range referred to when the inter-predicted picture generation section 309 refers to a reference picture of a different layer from the decoding target (target layer image) from the reference picture memory 306 in a certain decoding block. That is, in the modification example, by decreasing the reference region in the reference picture memory 306 of the different layer image from the decoding target layer, a storage medium with a small capacity can be allowed to be used as the reference picture memory 306, and thus a process can be performed at a high speed.

As described with reference to FIG. 23, when the decoding of the different layer image (for example, the base view) from the decoding target picture and the decoding of the decoding target picture are performed in parallel, the reference range of the different layer image from the decoding target picture referred to from the decoding target picture is restricted. Therefore, the decoding of the decoding target picture can be performed simultaneously before the different layer image from the decoding target picture is completely decoded.

MODIFICATION EXAMPLE D5

Next, still another modification example D5 of the embodiment will be described. The same reference numerals are given to the same configuration and the above-description description will be quoted.

An image decoding device 31$e$ according to the modification example D5 includes an enhancement vector candidate derivation section 30335$e$ instead of the enhancement vector candidate derivation section 30335 (see FIG. 5) of the image decoding device 31$c$.

The image decoding device 31$e$ may include or may not include the disparity vector clip section 3037 (see FIG. 8) of the inter-prediction parameter decoding section 303.

Figure 11:
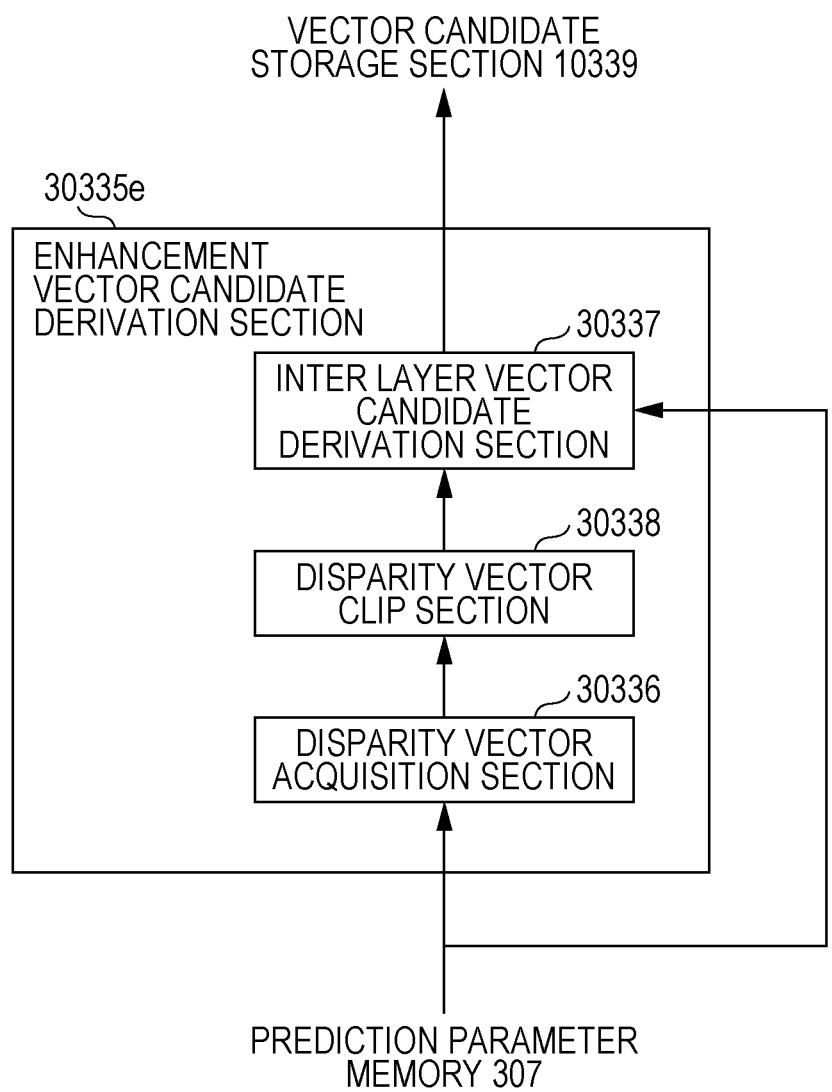
FIG. 11 is a schematic diagram illustrating the configuration of an enhancement vector candidate derivation section according to a modification example D5 of the embodiment.

FIG. 11 is a schematic diagram illustrating the configuration of the enhancement vector candidate derivation section 30335$e$ according to the modification example D5.

The enhancement vector candidate derivation section 30335$e$ is configured to include a disparity vector clip section (disparity vector restriction section) 30338 in addition to the disparity vector acquisition section 30336 and the inter-layer vector candidate derivation section 30337.

As described above, when the reference picture is the layer image different from the target picture, the inter-layer vector candidate derivation section 30337 outputs the disparity vector derived by the disparity vector acquisition section 30336. When the reference picture is the same layer image as the target picture, the different layer image (here, the layer image of the criterion viewpoint) from the target picture is specified, the disparity vector corresponding to the specified picture is derived from the disparity vector acquisition section 30336, the vector of the layer image (the layer image of the criterion viewpoint) located at a position corresponding to the disparity vector is read from the prediction parameter memory 307.

The disparity vector clip section 30338 according to the modification example D5 restricts the reference region when the prediction parameter of the different layer image from the target picture is read from the prediction parameter memory 307 in the inter-layer vector candidate derivation section 30337. The range of the value of the disparity vector dvLX input from the disparity vector acquisition section 30336 is restricted to a value within a pre-decided range. The process of restricting the value of the disparity vector dvLX by the disparity vector clip section 30338 may be the same as that of the disparity vector clip section 30372.

The disparity vector clip section 30338 restricts the reference region according to, for example, the following expressions:

dvLX [0]'=Clip3 (−DataRangeX, DataRangeX−1, dvLX[0]), and dvLX [1]'=Clip3 (−DataRangeY, DataRangeY−1, dvLX[1]).

Here, dvLX [0] and dvLX [1] are disparity vectors input from the disparity vector acquisition section 30336, dvLX [0]' and dvLX [1]' are disparity vectors of outputs, and DataRangeX and DataRangeY are predetermined integers expressing restriction ranges. Clip3 (x, y, z) is a function of restricting z to x or more and y or less.

The disparity vector clip section 30338 may restrict the reference region using the following expressions:

dvLX [0]'=Clip3 (−DataRangeX, DataRangeX, dvLX [0]), and dvLX [1]'=Clip3 (−DataRangeY, DataRangeY, dvLX [1]).

The disparity vector clip section 30338 outputs each disparity vector dvLX of which the value is restricted to the inter-layer vector candidate derivation section 30337.

In this case, for example, the inter-layer vector candidate derivation section 30337 specifies the position of the block located at a position deviated from a starting point by the disparity vector dvLX restricted by the disparity vector clip section 30338 using the following expressions when the decoding target block in the specified picture is the starting point.

xRef=xP+((nPSW−1)>>1)+((dvLX [0]'+2)>>2)

yRef=yP+((nPSH−1)>>1)+((dvLX [1]'+2)>>2)

Here, xRef and yRef indicate the coordinates of the correspondence block, xP and yP are the coordinates of upper left coordinates of the decoding target block, nPSW and nPSH are the width and height of the decoding target block, and dvLX [0]' and dvLX [1]' are an X component and a Y component of the disparity vector input from the disparity vector acquisition section 30338. Further, xP+((nPSW−1)>>1), yP+((nPSH−1)>>1) indicates that the center of the decoding target block is used as the starting point of the decoding target block, but different position such as the upper left or the lower right of the decoding target block may be used.

When the Y component of the disparity vector is restricted to 0, the inter-layer vector candidate derivation section 30337 may specify the position of the correspondence block using the disparity vector related to the Y component as 0 using the following expressions.

xRef=xP+((nPSW−1)>>1)+((dvLX [0]'+2)>>2)

yRef=yP+((nPSH−1)>>1)

In this case, the X component of the correspondence block corresponds to a position deviated from the X component of the starting point by the disparity vector in the decoding target block, but the Y component of the correspondence block is identical to the Y component of the starting point in the decoding target block.

In this way, the inter-layer vector candidate derivation section 30337 restricts the prediction parameter of the vector mvLX or the like in the block already processed in the different layer image (for example, the target layer image is a non-criterion viewpoint image and the reference layer image is a criterion viewpoint image) from the target layer image to the reference region read from the prediction parameter memory 307. This is because the reference region corresponds to the range of the value of the disparity vector dvLX when the decoding target block is the starting point.

That is, in the modification example D5, by decreasing the reference region in the prediction parameter memory 307, a storage medium with a small capacity can be allowed to be used as the prediction parameter memory 307, and thus a process can be performed at a high speed. Here, in the modification example D5, an internal memory 3076 may be included and the inter-layer vector candidate derivation section 30337 may read the prediction parameter via the internal memory 3076. The internal memory 3076 may be a storage medium with a smaller storage capacity than the prediction parameter memory 307 and a fast access speed.

Figure 12:
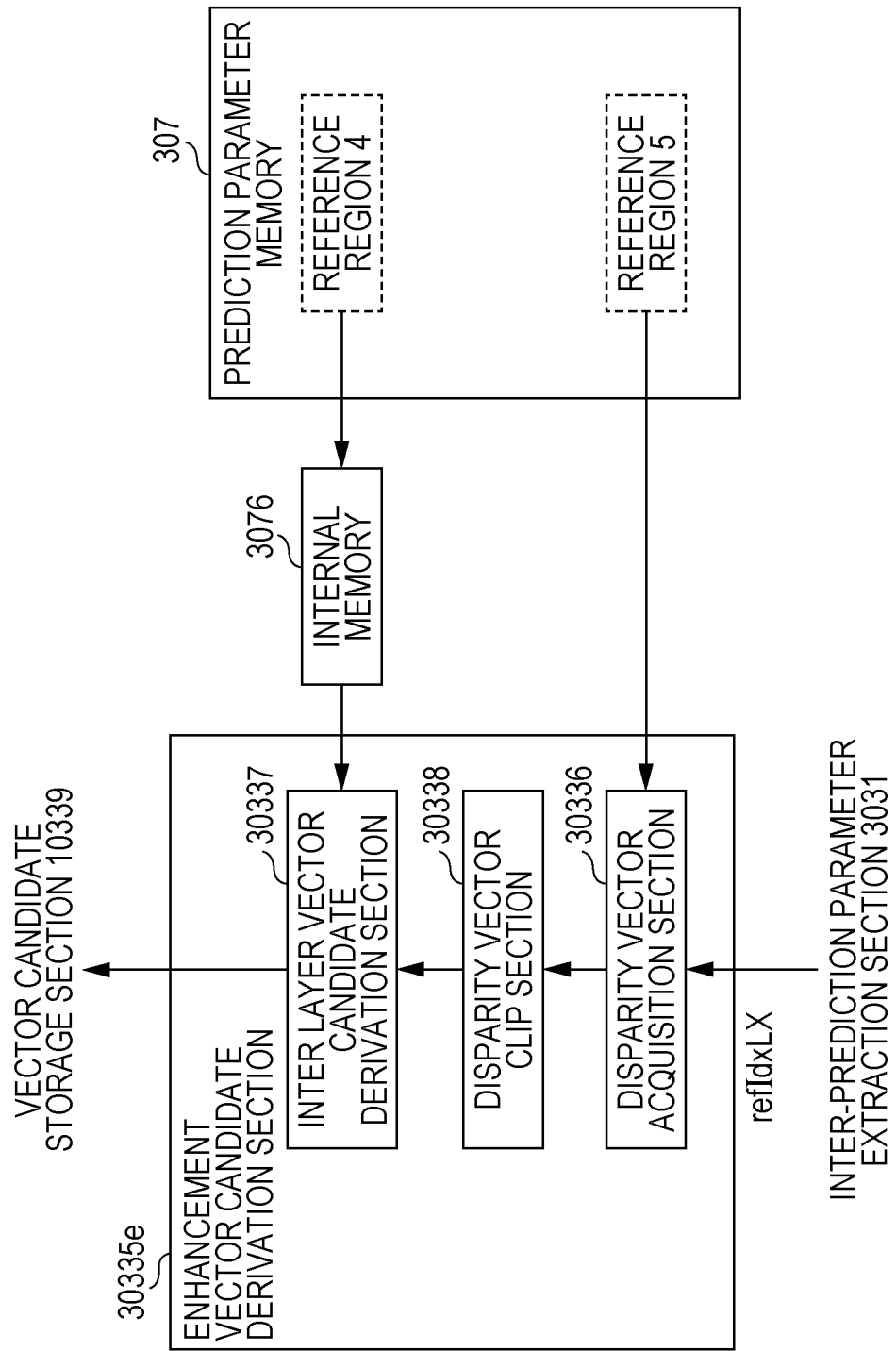
FIG. 12 is a conceptual diagram illustrating an example of a configuration in which prediction parameters are read according to the modification example D5 of the embodiment.

FIG. 12 is a conceptual diagram illustrating an example of a configuration in which prediction parameters are read according to the modification example D5.

A rectangular region indicating the prediction parameter memory 307 in FIG. 12 includes reference region 4 and reference region 5. Reference region 5 is a reference region of the prediction parameter of the decoding target picture (target layer image), that is, a region in which the prediction parameter to be read by the disparity vector acquisition section 30336 is stored. Since the prediction parameter read by the disparity vector acquisition section 30336 is restricted to association with the block in a range decided in advance from the decoding target block on the same picture as the decoding target picture, reference region 5 is restricted to a range according to the number of blocks. Reference region 4 is a reference region of the prediction parameter of the different layer image (for example, an image of the base view) from the decoding target, that is, a region in which the prediction parameter to be read by the inter-layer vector candidate derivation section 30337 is stored. Reference region 4 is a range of a value of the disparity vector dvLX when the decoding target block is the starting point. In the modification example D5, since the range of the value of the disparity vector is restricted by the disparity vector clip section 30338 is restricted, reference region 4 is restricted according to the range.

The above-described image decoding device 31e includes the disparity vector derivation section (the disparity vector acquisition section 30336) that derives the disparity vector of the target block and the prediction parameter decoding section (the enhancement vector candidate derivation section 30335e) that derives the prediction vector of the target block from the position deviated by the disparity vector in a view from the target block of a vector already decoded and stored in a prediction parameter storage section. The image decoding device 31e includes the prediction image generation section (the inter-predicted picture generation section 309) that reads the reference image of a region indicated by the vector derived by the vector derivation section and generates the predicted image based on the read reference image. The image decoding device 31e includes the reference layer determination section 30371 that determines whether the vector of the target block is for the inter-layer prediction which is the prediction between the different layers. The image decoding device 31e includes a vector clip mechanism (the vector clip section 30338) that restricts at least one component of the vector of the disparity block to a predetermined range when the reference layer determination section 30371 determines that the vector of the target block is for the inter-layer prediction.

The prediction parameter such as the motion vector mvLX or the like in the different layer image from the decoding target picture stored in reference region 4 of the prediction parameter memory 307 is temporarily stored in the internal memory 3076. The inter-layer vector candidate derivation section 30337 reads the prediction parameter from the internal memory 3076. Reference region 4 suffices when a range of a value of the disparity vector dvLX is contained. Therefore, since a storage capacity of the internal memory 3076 according to the modification example D5 can be set to be small, the image decoding device can be realized economically.

The image decoding device 31e according to the modification example D5 further includes a merge prediction parameter derivation section 3036e to be described below instead of the merge prediction parameter derivation section 3036 (see FIG. 6) of the image decoding device 31c.

Figure 13:
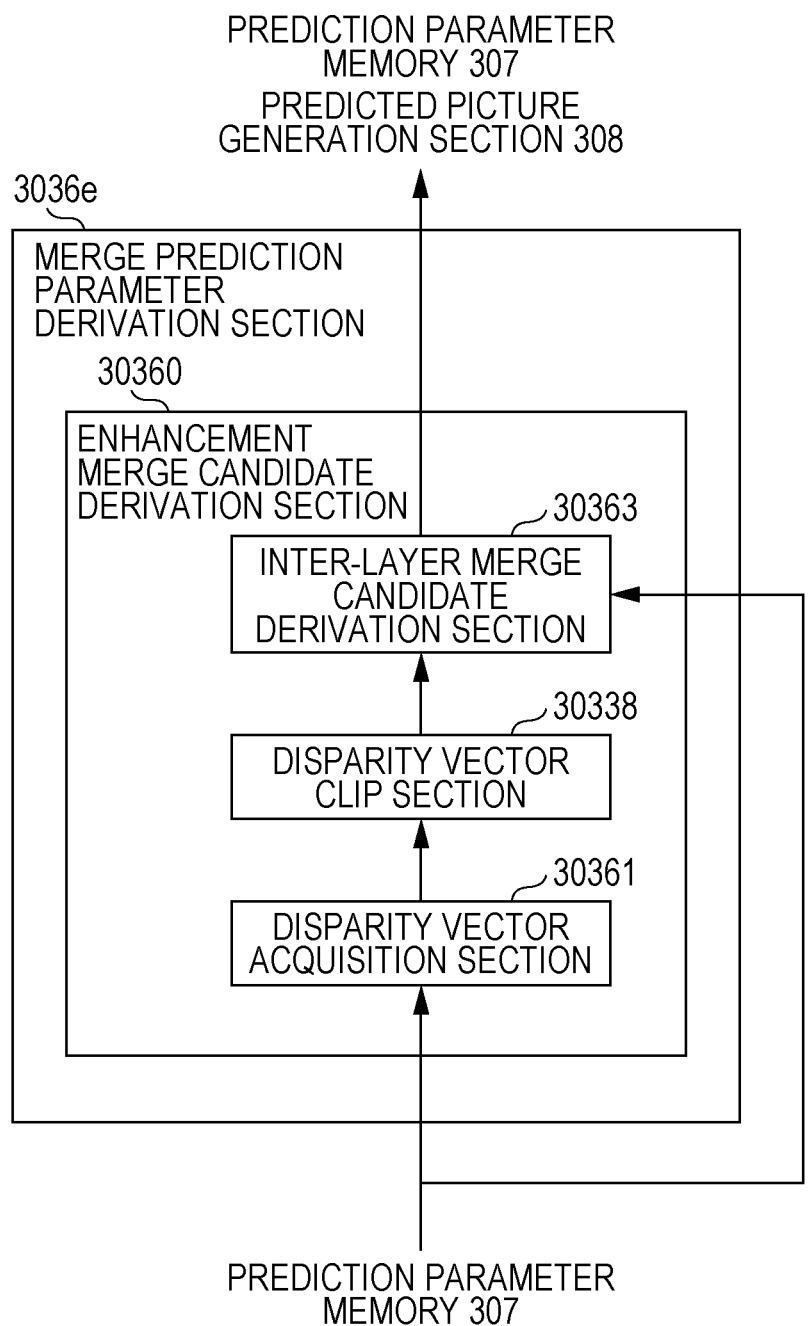
FIG. 13 is a schematic diagram illustrating the configuration of a merge prediction parameter derivation section according to the modification example D5 of the embodiment.

FIG. 13 is a schematic diagram illustrating the configuration of the merge prediction parameter derivation section 3036e according to the modification example D5.

The merge prediction parameter derivation section 3036e includes a merge candidate derivation section and a merge candidate selection section (neither of which are illustrated). The merge candidate derivation section derives a merge candidate list formed by a plurality of merge candidates. The merge candidate selection section selects a merge candidate indicted by a merge index merge_idx from the merge candidate list. The merge candidate derivation section includes a basic merge candidate derivation section (not illustrated) and an enhancement merge candidate derivation section 30360. The basic merge candidate derivation section derives a prediction parameter of a reference block in a pre-decided range as a merge candidate from the decoding target block. The reference block is, for example, a block adjacent to at least one of the lower left end, the upper left end, and the upper right end of the decoding target block. The enhancement merge candidate is a merge candidate derived using the prediction parameter of a reference layer image of a different layer from the decoding target picture (the target layer image). The enhancement merge candidate derivation section 30360 included in the merge prediction parameter derivation section 3036e is configured to include a disparity vector acquisition section 30361, a disparity vector clip section 30338, and an inter-layer merge candidate derivation section 30363.

The disparity vector dvLX is read from the block adjacent to the target block to the disparity vector acquisition section 30361 from the prediction parameter memory 307. The disparity vector acquisition section 30361 outputs the read disparity vector dvLX to the disparity vector clip section 30338.

The disparity vector clip section 30338 restricts the range of a each value of the disparity vector dvLX input from the disparity vector acquisition section 30361 to a value within a pre-decided range. The above-described process is quoted as a process of restricting the value of the disparity vector dvLX by the disparity vector clip section 30338.

The inter-view layer candidate derivation section 30363 specifies the reference picture index refIdx corresponding to the different layer image (for example, the base view) from the layer image of the decoding target picture.

The inter-layer merge candidate derivation section 30363 specifies the layer image (for example, the base view) related to the read reference picture index refIdx. The inter-layer merge candidate derivation section 30363 specifies the correspondence block located at a position deviated from a starting point by the disparity vector dvLX input from the disparity vector clip section 30338 when the decoding target block in the specified picture is the starting point. The inter-layer merge candidate derivation section 30363 reads the prediction parameter related to the correspondence block, stores the read prediction parameter in the prediction parameter memory 307, and outputs the prediction parameter to the predicted picture generation section 308.

In this way, the inter-layer merge candidate derivation section 30363 restricts the reference region which is a range of the block from the prediction parameter is read and is a range of a value of the disparity vector dvLX when the decoding target block is the starting point.

That is, in the modification example D5, by decreasing the reference region in the prediction parameter memory 307 in the different layer image from the decoding target picture, a storage medium with a small capacity can be allowed to be used as the prediction parameter memory 307, and thus a process can be performed at a high speed. In the modification example D5, an internal memory 3072 (not illustrated) may be included and the inter-layer merge candidate derivation section 30363 may read the prediction parameter via the internal memory 3072. The internal memory 3072 may be a storage medium with a smaller storage capacity than the prediction parameter memory 307 and a fast access speed. In this way, the image decoding device can be realized economically.

In the enhancement vector candidate derivation section 30335e and the inter-layer merge candidate derivation section 30363 according to the modification example D5, as described with reference to FIG. 23, when the decoding of the different layer image (for example, the base view) from the decoding target picture and the decoding of the decoding target picture are operated in parallel, the reference region of the prediction parameter in the prediction parameter memory 307 of the different layer image from the decoding target picture referred to from the decoding target picture is restricted. Therefore, before the different layer image (for example, the base view) from the decoding target picture is completely decoded (even when none of the prediction parameters in the prediction parameter memory 307 of the different layer image can be referred to), the decoding of the decoding target picture can be performed.

MODIFICATION EXAMPLE D6

Next, still another modification example D6 of the embodiment will be described.

An image decoding device 31f according to the modification example D6 includes an entropy decoding section 301f, instead of the entropy decoding section 301 (see FIG. 3) of the image decoding device 31 (see FIGS. 1 and 2). The main configuration of the image decoding device 31*f* according to the modification example D6 is the same as that of the image decoding device 31 excluding the entropy decoding section 301*f*. Accordingly, the same reference numerals are given to the same configuration and the above-description will be quoted.

Before the description of the modification example D6, the configuration of the above-described entropy decoding section 301 will be described.

Figure 24:
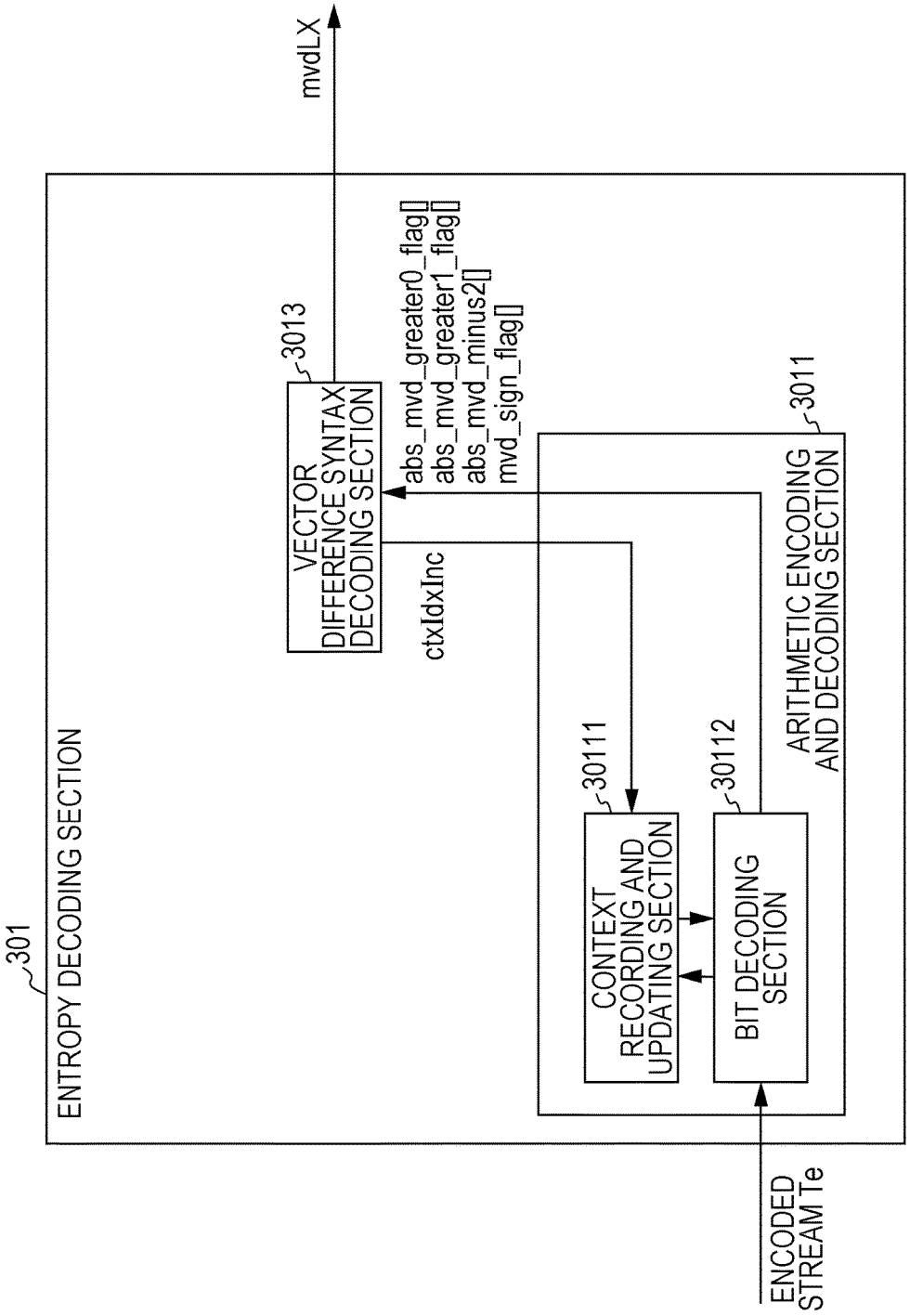
FIG. 24 is a block diagram illustrating the configuration of an entropy decoding section according to the embodiment.

FIG. 24 is a block diagram illustrating the configuration of the above-described entropy decoding section 301.

The entropy decoding section 301 is configured to include an arithmetic encoding and decoding section 3011 and the vector difference syntax decoding section 3013.

The arithmetic encoding and decoding section 3011 decodes each bit included in the encoded stream Te with reference to a context variable DV. The arithmetic encoding and decoding section 3011 is configured to include a context recording and updating section 30111 and a bit decoding section 30112.

The context recording and updating section 30111 records and updates the context variable CV managed in association with each context index ctxIdxInc. Here, the context variable CV includes (1) a superiority symbol MPS (most probable symbol) in which an occurrence probability is high and (2) a probability state index pStateIdx for designating an occurrence probability of the superiority symbol MPS.

The context recording and updating section 30111 updates the context variable CV with reference to the context index ctxIdxInc decided based on a transformation coefficient obtained by the inverse quantization and inverse DCT 311 and the value of Bin decoded by the bit decoding section 30112, and records the updated context variable CV until subsequent update. Bin indicates each of the bits of a bit string forming the information. The value of the superiority symbol MPS is 0 or 1. When the superiority symbol MPS and the probability state index pStateIdx are updated whenever the bit decoding section 30112 decodes one Bin.

The context index ctxIdxInc may be a value directly designating a context or may be an increment value from a base value.

The bit decoding section 30112 decodes each bit Bin included in the encoded stream Te related to the difference vector with reference to the context variable CV recorded in the context recording and updating section 30111. The bit decoding section 30112 may use a decoding scheme corresponding to context-based adaptive binary arithmetic coding (CABAC) in the decoding. The bit decoding section 30112 supplies the value of Bin obtained through the decoding to the vector difference syntax decoding section 3013. The value of Bin obtained through the decoding is also supplied to the context recording and updating section 30111 and is referred to so that the context variable CV is updated.

The vector difference syntax decoding section 3013 derives the context index ctxIdxInc for decoding each Bin of abs_mvd_greater0_flag [XY], abs_mvd_greater1_flag [XY], abs_mvd_minus2 [XY], and mvd_sign_flag which are syntax elements included in the vector difference, and outputs the context index ctxIdxInc to the arithmetic encoding and decoding section 3011. The arithmetic encoding and decoding section 3011 decodes such syntax elements. Here, abs_mvd_greater0_flag [XY], abs_mvd_greater1_flag [XY], abs_mvd_minus2 [XY], and mvd_sign_flag [XY] are a flag indicating whether the absolute value of the difference vector exceeds 0 (which corresponding to a flag indicating whether the difference vector is 0), a flag indicating whether the absolute value of the difference vector exceeds 1, a flag indicating a value obtained by subtracting 2 from the absolute value of the difference vector, and mvd_sign_mvd is a flag indicating the sign of the difference vector. When suffix XY is a variable that takes a value of 0 in the case of the X component and a value of 1 in the case of the Y component.

The vector difference syntax decoding section 3013 derives the context index ctxIdxInc based on the decoded reference layer information reference_layer_info. Here, derivation table information in which reference_layer_info and the context index ctxIdxInc are associated may be stored in the vector difference syntax decoding section 3013 and the derivation table information may be used to derive the context index ctxIdxInc. Next, an example of the derivation table information will be described.

Figure 26:
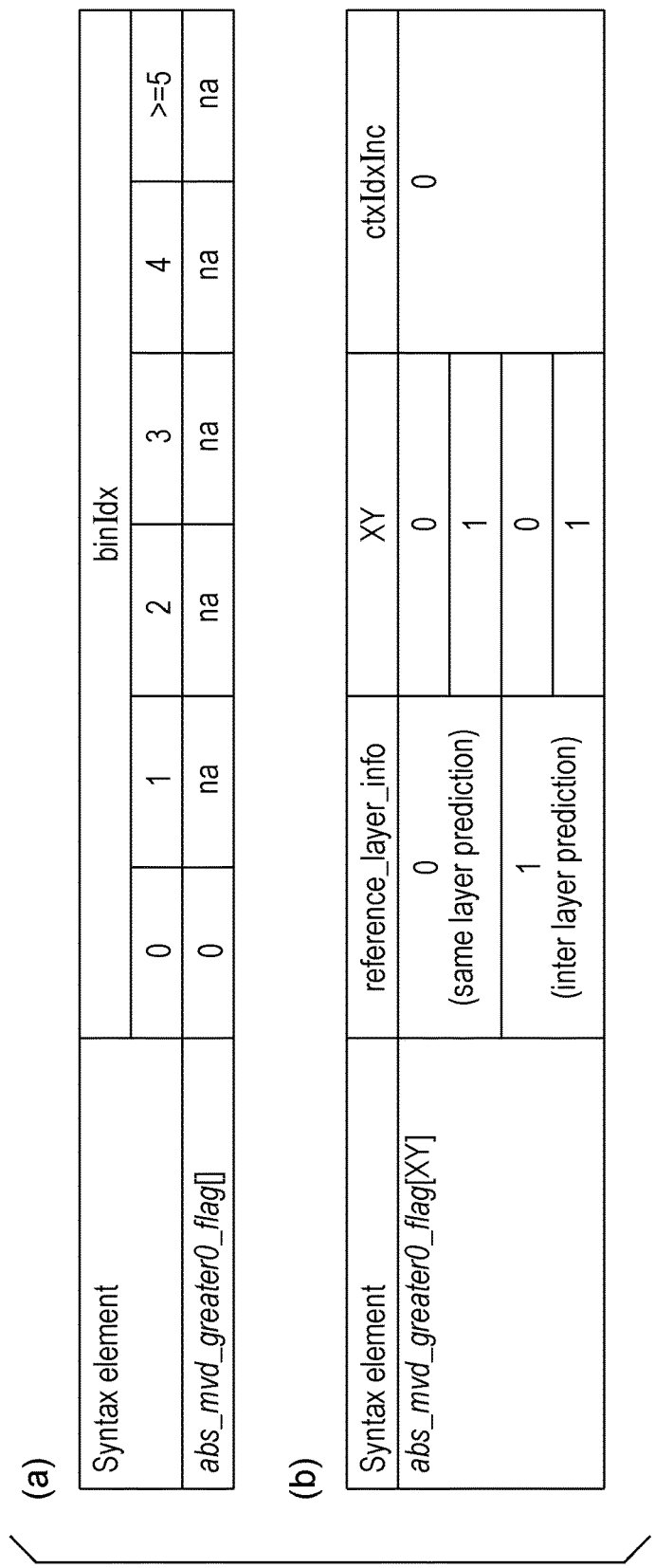
FIG. 26 is a diagram illustrating an example of derivation table information.

FIG. 26 is a diagram illustrating an example of the derivation table information.

(a) of FIG. 26 illustrates the value of the context index of each Bin of abs_mvd_greater0_flag [ ] indicating whether the absolute of the difference vector exceeds 0 as a syntax element. (a) of FIG. 26 indicates that BinIdx=0, that is, the context index of first bit is typically 0. The context index ctxIdxInc of abs_mvd_greater0_flag [XY] is 1-bit information that has no value corresponding to other bits.

(b) of FIG. 26 illustrates the context index ctxIdxInc for each reference layer information reference_layer_info, each X component, and each Y component in regard to abs_mvd_greater0_flag [XY] as the syntax element. In the example illustrated in (b) of FIG. 26, the value of the context index ctxIdxInc is typically 0 irrespective of the reference layer information reference_layer_info, the X component, and the Y component. In the example, the syntax element abs_mvd_greater0_flag [XY] indicates the same context is used for the decoding without depending on whether the layer (reference layer) of the reference picture indicated by the vector corresponding to the syntax element is the base layer (base view) or the inter-layer (inter-view) or whether the syntax element of the difference vector which is a target is the X component or the Y component.

In the above-described CABAC, when the probability of Bin being 1 (or a probability of Bin being 0) according to a condition is different, the context variable CV is used to reduce the coding amount using a conditional probability effectively. In the example, the context is derived without depending on whether the difference vector is the X component or the Y component. However, this assumes that a probability of the value of the syntax element of the difference vector being 0 is not considerably different due to this component.

The invention is not limited to the example illustrated in FIG. 26. The syntax element which is a target even in an example to be described below is not limited to abs_mvd_greater0_flag [XY], but may correspond to the reference layer information reference_layer_info and the context index ctxIdxInc as in another syntax element abs_mvd_greater1_flag [XY].

Next, the configuration of the entropy decoding section 301*f* according to the modification example D6 will be described.

Figure 25:
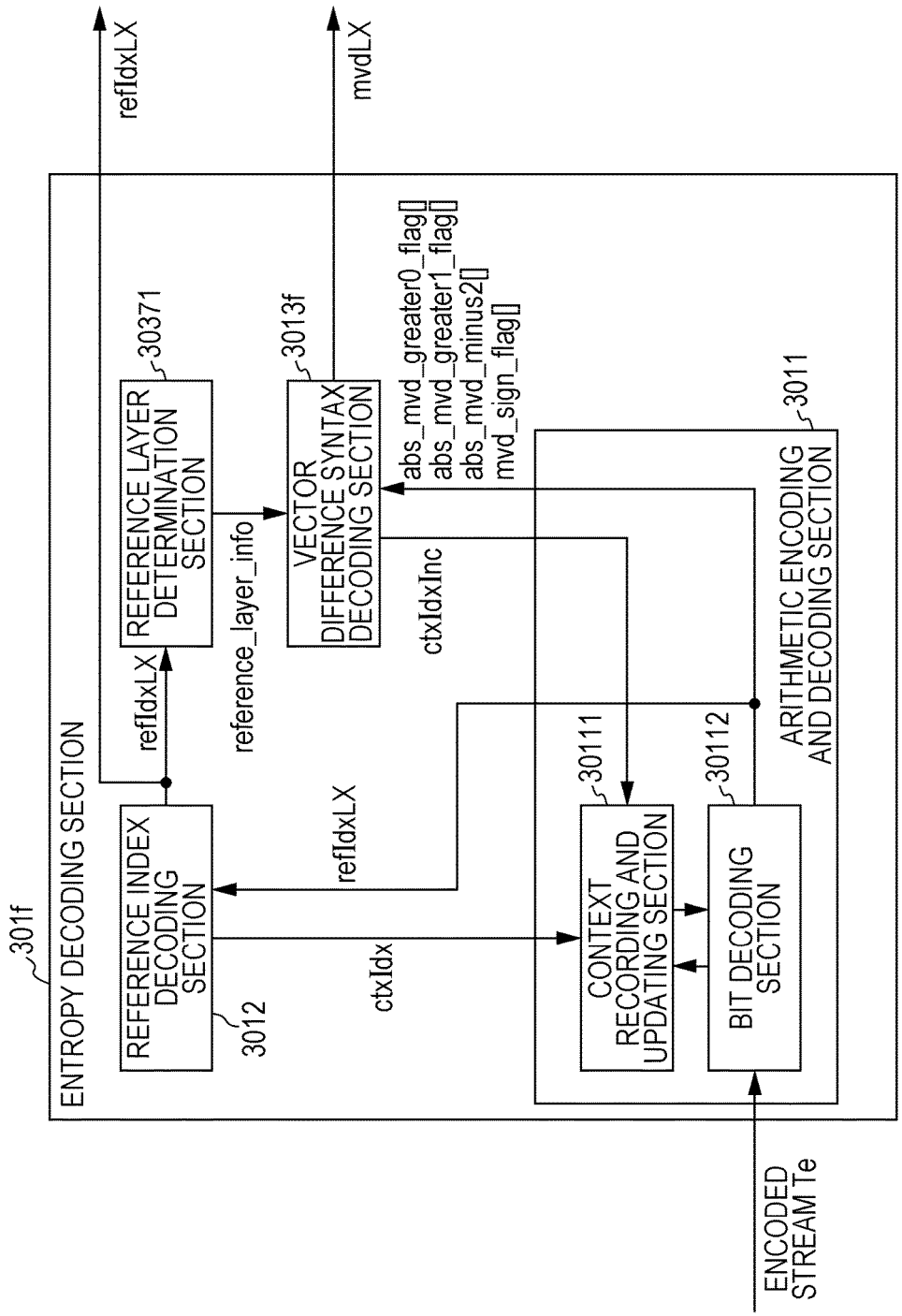
FIG. 25 is a block diagram illustrating the configuration of an entropy decoding section 301f according to a modification example D6 of the embodiment.

FIG. 25 is a block diagram illustrating the entropy decoding section 301*f* according to the modification example D6.

As illustrated in FIG. 25, the entropy decoding section 301*f* according to the modification example D6 includes a reference index decoding section 3012 and a reference layer determination section 30371 in the entropy decoding section 301 (see FIG. 24), as illustrated in FIG. 25. A vector difference syntax decoding section 3013*f* is included instead of the vector difference syntax decoding section 3013. The reference index decoding section 3012 decodes the reference picture index refIdxLX from the encoded stream Te and outputs the reference picture index refIdxLX to the reference layer determination section 30371. As described above, the reference layer determination section 30371 decides the reference layer information reference_layer_info based on the reference picture index refIdxLX.

The vector difference syntax decoding section 3013*f* decides the context index ctxIdxInc using one of the derivation tables to be described below based on the reference layer information reference_layer_info decided by the reference layer determination section 30371.

Figure 27:
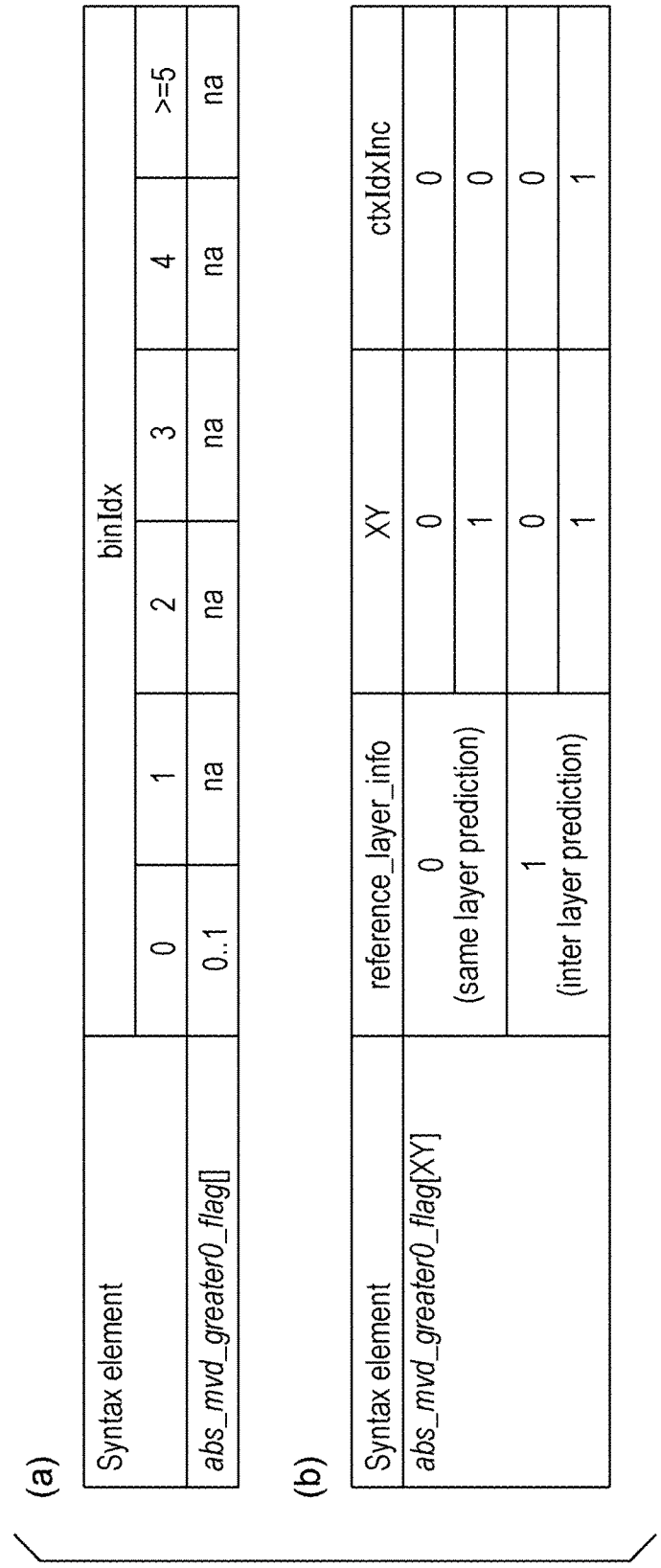
FIG. 27 is a diagram illustrating another example of derivation table information.

FIG. 27 is a diagram illustrating another example of derivation table information.

(a) of FIG. 27 indicates that 0 or 1 is taken as a range of a value of the context index ctxIdxInc given in regard to the syntax element abs_mvd_greater0_flag [ ].

(b) of FIG. 27 illustrates derivation table information indicating the context index ctxIdxInc in regard to the syntax element abs_mvd_greater0_flag [XY]. As in (b) of FIG. 26, this example also shows a method of deciding the context index ctxIdxInc using, as a condition, a value of XY identifying whether the reference layer information reference_layer_info and the syntax element abs_mvd_greater0_flag [XY] of the decoding target are the X component or the Y component. In this example, when the reference layer information reference_layer_info is 0, that is, the same-layer prediction (the reference picture is the same layer or the same viewpoint image as the target picture and the difference vector is the motion vector), the same context index (ctxIdx=0) match both of the X component and the Y component of the syntax element of the difference vector. When the reference layer information reference_layer_info is 1, that is, the inter-layer prediction (the reference picture is the different layer or the different viewpoint image as the target picture and the difference vector is the disparity vector), the context indexes ctxIdx with different value can match the X component and the Y component of the syntax element of the difference vector.

In the example of (b) of FIG. 27, ctxIdx=0 is used for the X component of the disparity vector so that the context is the same as that of the motion vector and ctxIdx=1 is used for the Y component of the disparity vector so that the context is different from that of the motion vector.

In general, when the reference picture is the different viewpoint image from the target picture (the inter-view prediction in the inter-layer prediction), the Y component of the disparity vector indicating the disparity from the reference picture concentrates on 0. In this case, the Y component of the difference vector of the disparity vector also tends to concentrate on 0. That is, a probability of the Y component abs_mvd_greater0_flag [1] of the flag abs_mvd_greater0_flag [XY] indicating whether the absolute value of the difference vector exceeds 0 or not being 1 in the case of the inter-layer prediction is considerably lower than a probability of the flag abs_mvd_greater0_flag [XY] indicating whether the absolute value of the difference vector exceeds 0 or not in the case of the same-layer prediction (motion vector) and the flag abs_mvd_greater0_flag [0] indicating whether the X component of the difference vector is 0 or not being 1 in the case of the layer prediction (disparity vector). Thus, by assigning the different contexts to the contexts of the X component of the difference vector of the same-layer prediction and the inter-layer prediction and the Y component of the difference vector of the inter-layer prediction in consideration of the fact that the occurrence probability of the value of Bin is considerably different due to the reference picture and the vector component, it is possible to obtain the advantageous effect of reducing the coding amount of the difference vector.

Figure 28:
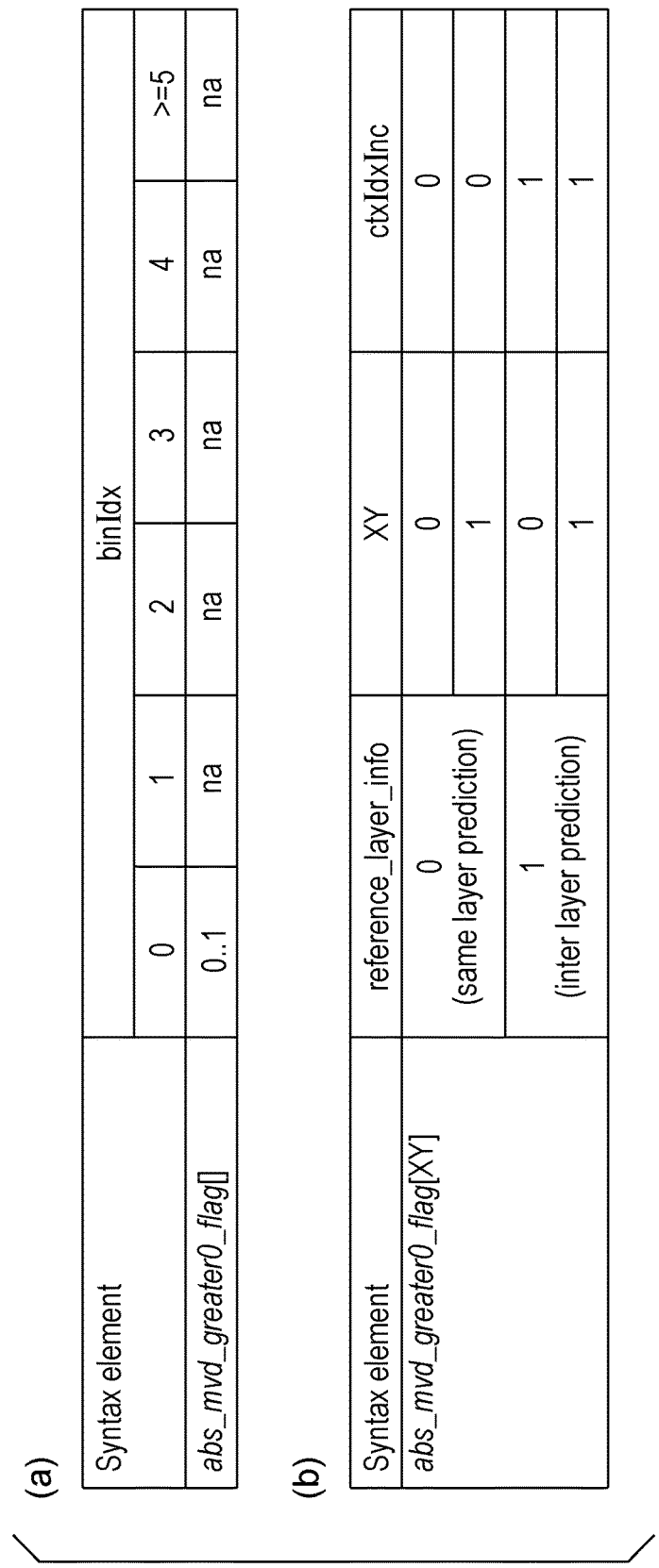
FIG. 28 is a diagram illustrating still another example of the derivation table information.

FIG. 28 is a diagram illustrating still another example of the derivation table information.

(a) of FIG. 28 indicates that 0 or 1 is taken as a range of a value of the context index ctxIdxInc given in regard to the syntax element abs_mvd_greater0_flag [ ].

(b) of FIG. 28 illustrates derivation table information indicating the context index ctxIdxInc in regard to the syntax element abs_mvd_greater0_flag [XY].

In this example, different context indexes ctxIdxInc are matched between when the reference layer information reference_layer_info is 0 and when the reference layer information reference_layer_info is 1. Specifically, the same context (ctxIdxInc=0) matches both of the X component and the Y component in the case of the same-layer prediction (the case of the motion vector). The different context (ctxIdxInc=1) from the same-layer prediction matches both of the X component and the Y component in the case of the inter-layer prediction (the case of the disparity vector).

In general, when the reference picture is different image (for example, a low-resolution picture in the spatial scalable) which is the same viewpoint image as the target picture, both of the X component and the Y component of the disparity vector indicating the disparity from the reference picture concentrate on 0. In this case, the difference vector of the disparity vector also tends to concentrate on 0. This means that a probability of the flag abs_mvd_greater0_flag [XY] indicating that the absolute value of the difference vector exceeds 0 being 1 in the case of the inter-layer prediction is considerably lower than a probability of the flag abs_mvd_greater0_flag [XY] indicating that the absolute value of the difference vector exceeds 0 in the other case, that is, the case of the same-layer prediction (motion vector) and the flag abs_mvd_greater0_flag [0] indicating whether the X component of the difference vector is 0 or not in the case of the inter-view (disparity vector) being 1. Thus, by assigning the different contexts to the contexts of the difference vector (the motion vector) of the same-layer prediction and the difference vector (the disparity vector) of the inter-layer prediction in consideration of the fact that different occurrence probabilities are different according to a condition, it is possible to obtain the advantageous effect of reducing the coding amount of the difference vector.

Figure 29:
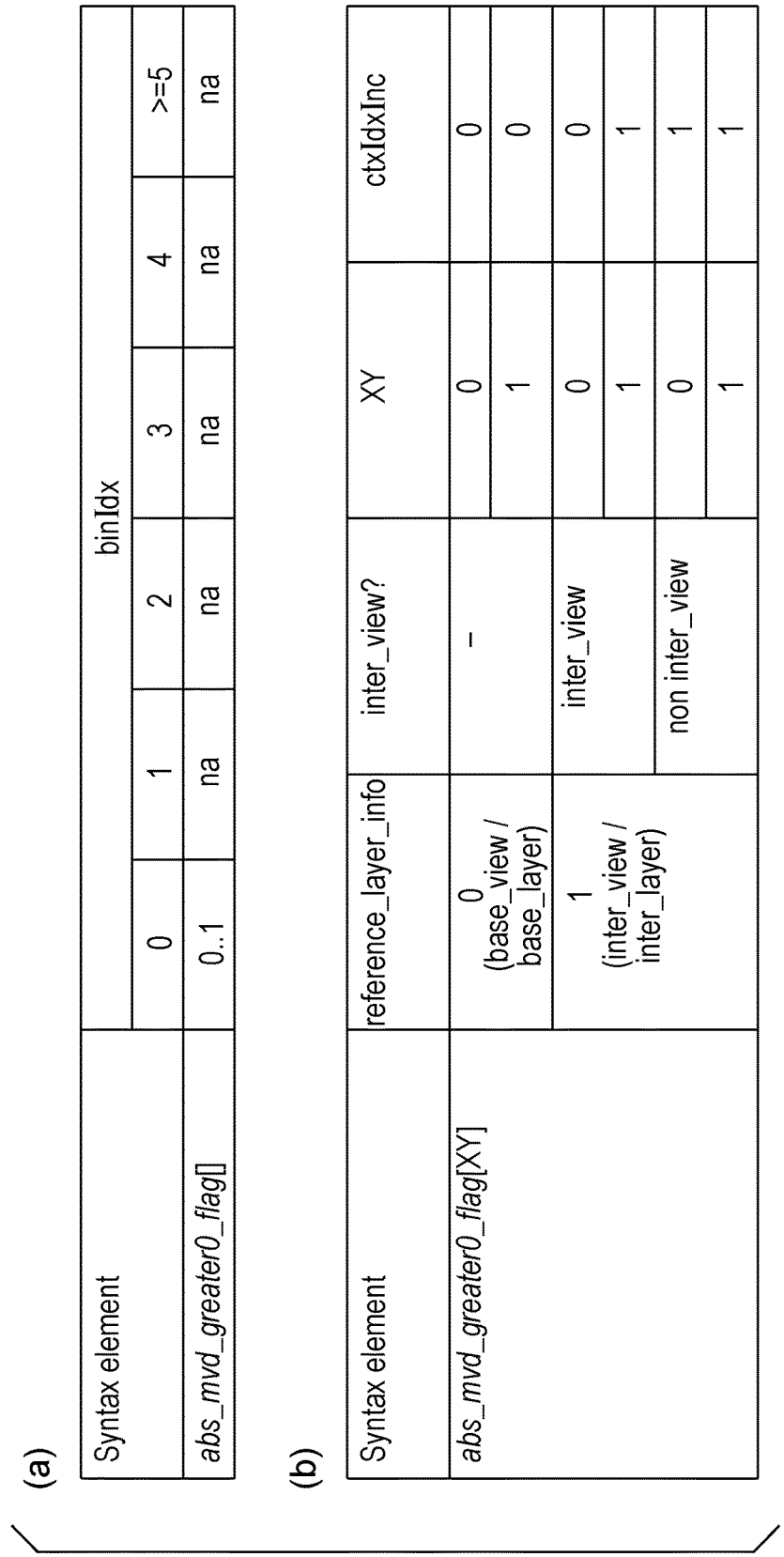
FIG. 29 is a diagram illustrating still another example of the derivation table information.

FIG. 29 is a diagram illustrating still another example of the derivation table information.

(a) of FIG. 29 indicates that 0 or 1 is taken as a range of a value of the context index ctxIdxInc given in regard to the syntax element abs_mvd_greater0_flag [ ].

(b) of FIG. 29 illustrates derivation table information indicating the context index ctxIdxInc in regard to the syntax element abs_mvd_greater0_flag [XY].

In this example, when the reference layer information reference_layer_info is 0, as in FIGS. 27 and 28, the same context (ctxIdxInc=0) is assigned commonly to the X component and the Y component of the difference vector of the flag abs_mvd_greater0_flag [XY]. When the reference layer information is 1, the context index ctxIdxInc is switched depending on whether the inter-layer prediction is the prediction (inter_view) between different viewpoint images or the prediction (non-inter_view) between the same viewpoint images. In the case of the prediction between the different viewpoint images, as in FIG. 27, the different context index (ctxIdxInc=1) from the X component is assigned to the Y component of the difference vector of the flag abs_mvd_greater0_flag [XY]. In the case of the prediction between the same viewpoint image, as in FIG. 28, the different context index (ctxIdxInc=1) from the case of the same-layer prediction is assigned to the X component and the Y component of the difference vector of the flag abs_mvd_greater0_flag [XY].

As described above, by assigning the different contexts from the case of the motion vector using the fact that the probability of the Y component of the difference vector being 0 is high, when the disparity vector is the disparity vector of the vector between the different viewpoint images, and the probability of the X component and the Y component of the difference vector being 0 is high, when the disparity vector is the vector between the same viewpoint images, it is possible to obtain the advantageous effect of reducing the coding amount of the difference vector.

Figure 30:
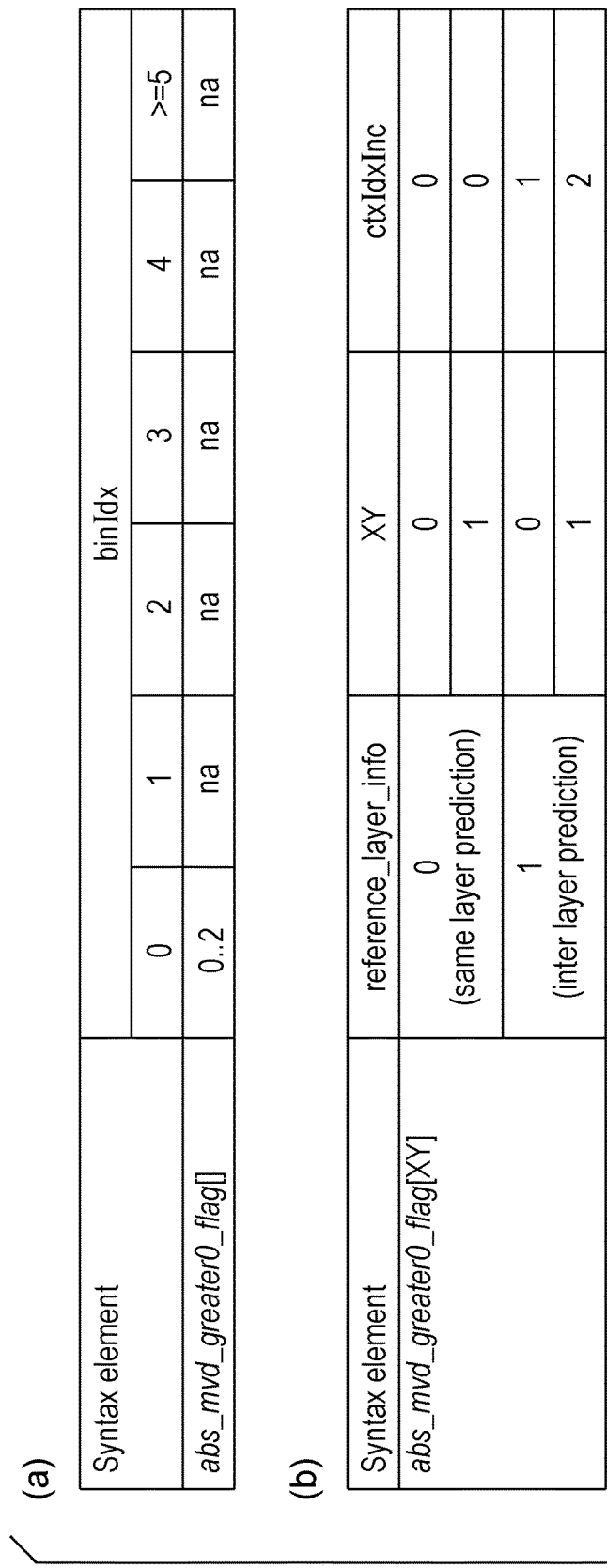
FIG. 30 is a diagram illustrating still another example of the derivation table information.

FIG. 30 is a diagram illustrating still another example of the derivation table information.

(a) of FIG. 30 indicates that one of 0 to 2 is taken as a range of a value of the context index ctxIdxInc given in regard to the syntax element abs_mvd_greater0_flag [ ]. That is, three contexts are used for the decoding.

(b) of FIG. 30 illustrates derivation table information indicating the context index ctxIdxInc in regard to the syntax element abs_mvd_greater0_flag [XY].

In this example, when the reference layer information reference_layer_info is 0 and the prediction is the same layer prediction, the same context index ctxIdxInc matches the X component and the Y component of abs_mvd_greater0_flag [XY] (ctxIdxInc=0). When the reference layer information reference_layer_info is 1 and the prediction is the inter-layer prediction, the different context different from the case of the same-layer prediction matches the X component and the Y component of the flag abs_mvd_greater0_flag [ ] and the different context indexes ctxIdxInc match the X component and the Y component. Here, "ctxIdxInc=1" matches the X component and "ctxIdxInc=2" matches the Y component.

As described above, by assigning the different contexts according to the conditions of the disparity vector and the motion vector while using the method of deriving the same context index, irrespective of whether the disparity vector is the disparity vector of the vector between the different viewpoint images or whether the disparity vector is the vector between the same viewpoint images, it is possible to obtain the advantageous effect of reducing the coding amount of the difference vector.

Figure 31:
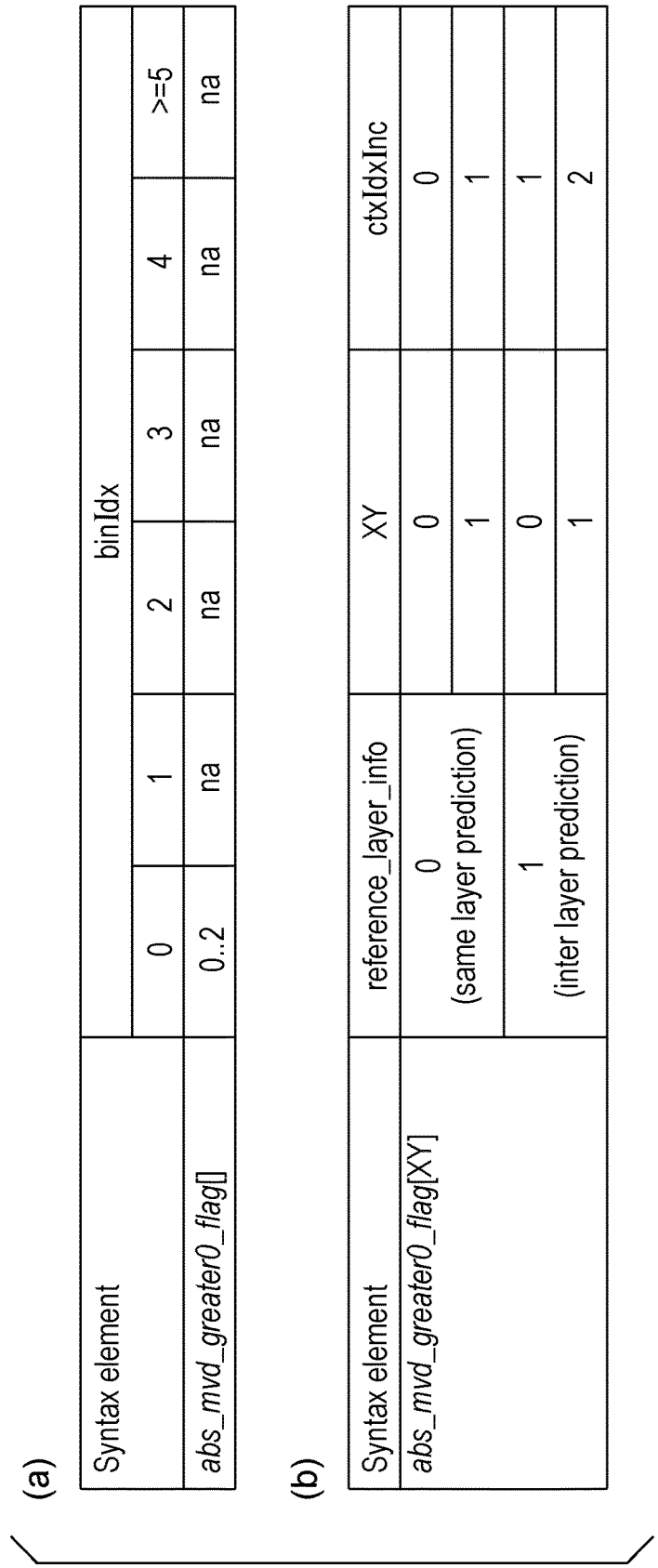
FIG. 31 is a diagram illustrating still another example of the derivation table information.

FIG. 31 is a diagram illustrating still another example of the derivation table information.

(a) of FIG. 31 indicates that one of 0 to 2 is taken as a range of a value of the context index ctxIdxInc given in regard to the syntax element abs_mvd_greater0_flag [ ].

(b) of FIG. 31 illustrates derivation table information indicating the context index ctxIdxInc in regard to the syntax element abs_mvd_greater0_flag [XY].

In this example, when the reference layer information reference_layer_info is 1 and the prediction is the inter-layer prediction, the different context indexes ctxIdxInc match the X component and the y component of the flag abs_mvd_greater0_flag [ ] and the same context index ctxIdxInc matches the Y component of the same-layer prediction and the X component of the inter-layer prediction. Specifically, when the reference layer information reference_layer_info is 0, that is, the prediction is the same-layer prediction, "ctxIdxInc=0" matches the X component of the difference vector and "ctxIdxInc=1" matches the Y component. When the reference layer information reference_layer_info is 1, that is, the prediction is the inter-layer prediction, "ctxIdxInc=1" matches the X component of the difference vector and "ctxIdxInc=2" matches the Y component.

This uses the fact that the probability of the Y component of the difference vector of the inter-layer prediction being 0 is high, the probability of the X component of the difference vector of the same-layer prediction being 0 is low, and the X component of the difference vector of the other inter-layer prediction and the Y component of the difference vector of the same-layer prediction become 0 at substantially the same probability. In this way, it is possible to obtain the advantageous effect of reducing the coding amount of the difference vector.

MODIFICATION EXAMPLE D7

Next, still another modification example D7 of the embodiment will be described.

The image decoding device 31g (not illustrated) according to the modification example D7 includes an entropy decoding section 301g instead of the entropy decoding section 301f of the image decoding device 31f. The main configuration of the image decoding device 31g according to the modification example D7 is the same as the configuration of the image decoding device 31f excluding the entropy decoding section 301g. Accordingly, the same reference numerals are given to the same configuration and the above-description description will be quoted.

Figure 32:
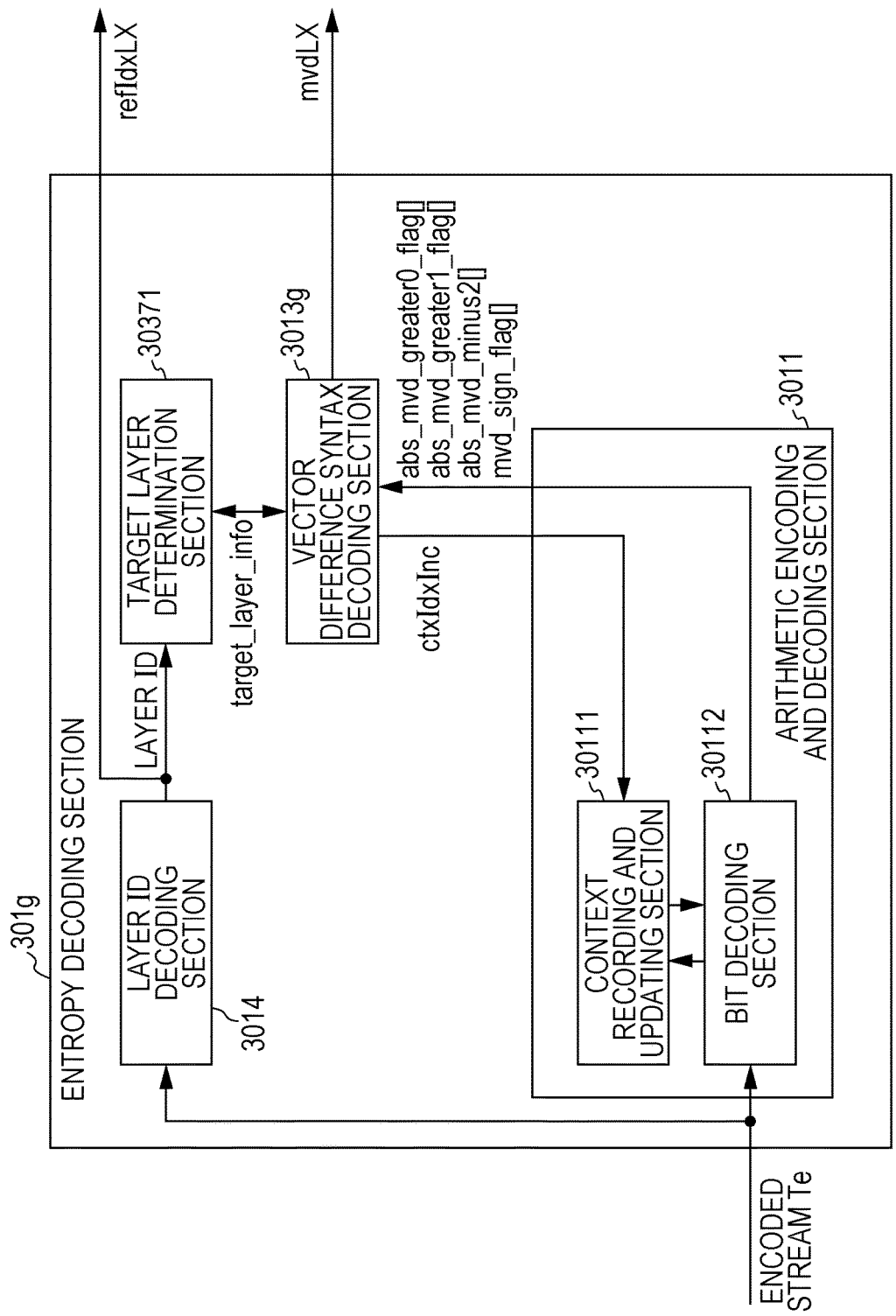
FIG. 32 is a schematic diagram illustrating the configuration of an entropy decoding section according to a modification example D7 of the embodiment.

FIG. 32 is a block diagram illustrating the entropy decoding section 301g according to the modification example D7.

As illustrated in FIG. 32, the entropy decoding section 301g according to the modification example D7 includes the layer ID decoding section 3014 and the target layer determination section 30171 in addition of the configuration of the entropy decoding section 301 (see FIG. 24) and includes a vector difference syntax decoding section 3013g instead of the vector difference syntax decoding section 3013. The layer ID decoding section 3014 decodes a layer ID from a network abstract layer (NAL) unit header included in the encoded stream Te. The NAL unit header is information included in the header of each NAL unit which is one constituent unit of the encoded stream Te. The NAL unit header includes a decoding parameter in which the above-described layer ID is the beginning.

The target layer determination section 30171 identifies whether the decoding target picture is the base layer image or the non-base layer image based on the decoded layer ID and derives target layer information target_layer_info. A value of the target layer information target_layer_info is, for example, 0 when the decoding target picture is the base layer image and is 1 when the decoding target picture is the non-base layer image. A layer ID decoding unit 3014 does not identify whether the decoding target picture is the base layer image or the non-base layer image, but may identify whether the decoding target picture is a base view image or a non-base view image. In this case, the layer ID decoding unit 3014 determines that the view of the decoding target picture is the base view when the view ID of the decoding target picture is 0 and determines that the view of the decoding target picture is the non-base view when the view ID is a value other than 0. Here, a value of the target layer information target_layer_info is 0 when the view of the target layer information is the base view and is 1 when the view thereof is the non-base view. The view ID is derived from the layer ID using a table that indicates a correspondence relation between the layer ID and the view ID and is stored in advance. The target layer determination section

30171 extracts the table indicating the correspondence relation from a VPS included in the encoded stream.

Figure 33:
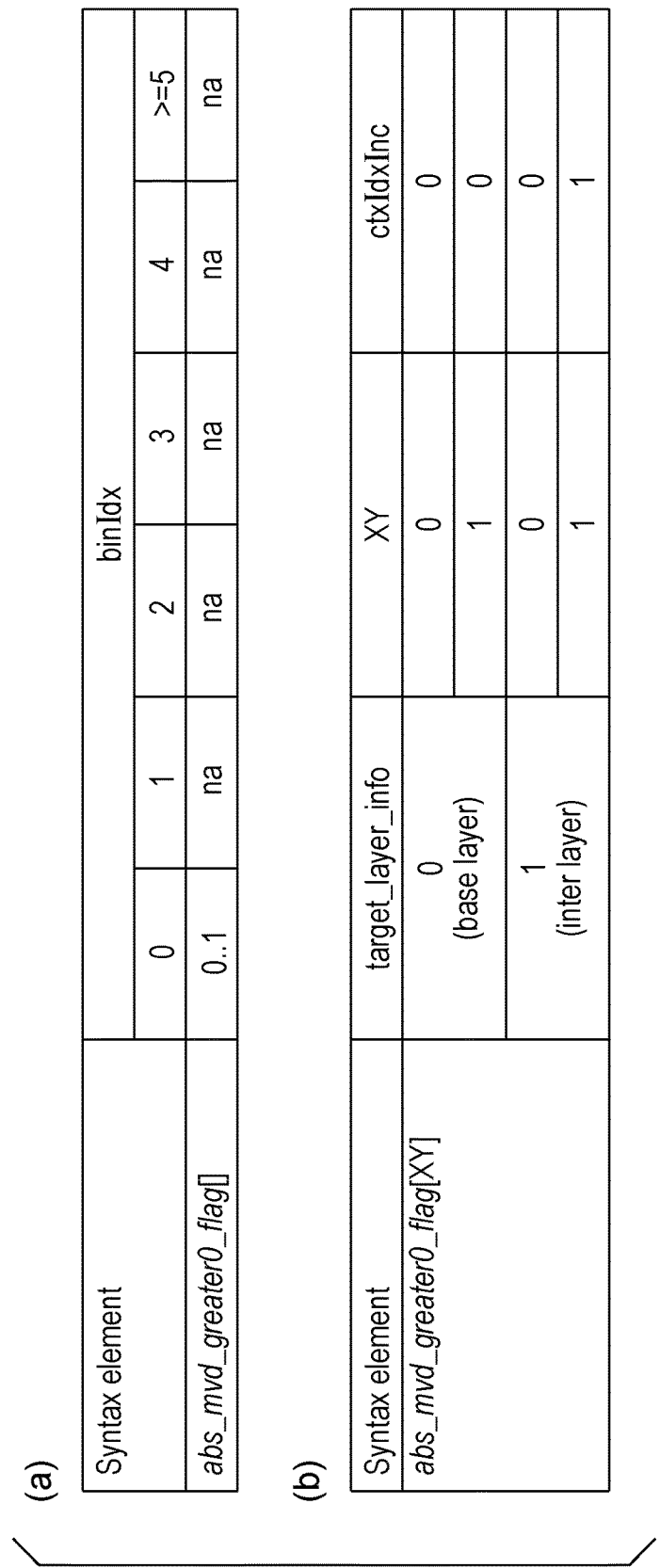
FIG. 33 is a diagram illustrating an example of the derivation table information according to the modification example D7 of the embodiment.

The vector difference syntax decoding section 3013g according to the modification example D7 derives the context index ctxIdxInc using a derivation table illustrated in FIG. 33 from the decided target layer information target_layer_info.

FIG. 33 is a diagram illustrating an example of the derivation table information according to the modification example D7.

(a) of FIG. 33 indicates that 0 or 1 is taken as a range of a value of the context index ctxIdxInc given in regard to the syntax element abs_mvd_greater0_flag [ ].

(b) of FIG. 33 illustrates derivation table information indicating the context index ctxIdxInc in regard to the syntax element abs_mvd_greater0_flag [XY].

In this example, when the target layer information target_layer_info is 0, the same context is used for the X component and the Y component of the syntax element abs_mvd_greater0_flag [ ] in the case of the base layer (or the base view) and the different context indexes ctxIdxInc match the X component and the Y component of the flag abs_mvd_greater0_flag [ ] in the case of the non-base layer (or the non-base view). When the target layer information target_layer_info is 1, the context index ctxIdxInc=0 matches the X component and the context index ctxIdxInc=1 matches the Y component in the case of the non-base layer (the inter-layer or the non-base view). In this way, the context index 0 is used for the X component of the difference vector of the base layer (base view) so that the context is the same as the X component, and the context index 1 is used for the Y component of the difference vector of the non-base layer so that the context is different from the Y component.

That is, when the decoding target picture is the base layer, only the picture of the same layer is used as the reference picture in principle. Therefore, the vector used for the decoding of the base layer image is the motion vector which is the vector predicted in the same layer. Since the picture of the different layer from the picture of the same layer is also used as the reference picture in the non-base layer, the vector used for the decoding is the motion vector which is the vector of the same-layer prediction in some case and is the disparity vector which is the vector of the inter-layer prediction in some cases. The vector of the inter-layer prediction is the disparity vector in some cases. By assigning the different contexts to the X component and the Y component of the flag (the syntax element abs_mvd_greater0_flag [XY]) indicating the absolute value of the difference vector exceeds 0 in this case, it is possible to obtain the advantageous effect of reducing the coding amount of the difference vector. In the above-described modification example D6, it is necessary to identify the reference layer using the reference picture index. In the modification example D7, however, it is not necessary to identify the reference layer and the realization is possible by identifying the target layer. Since the target layer is fixed without depending on the prediction unit unlike the reference layer (the reference picture index is not necessary), the reference layer can be identified. Therefore, in the modification example D7, the decoding process is easier than in the above-described modification example D6.

MODIFICATION EXAMPLE D8

Next, still another modification example D8 of the embodiment will be described. In the modification example D8, by restricting reference coordinates when the prediction parameters (the vector and the reference list index) stored in the prediction parameter memory 307 are referred to in the AMVP prediction parameter derivation section 3032 and the merge prediction parameter derivation section 3036 of the image decoding device 31, a memory necessary in the prediction parameter memory 307 is reduced. More specifically, the reference image is restricted when the prediction parameters of an already processed block of the layer image the different layer from the layer image of the decoding target picture are referred to.

An image decoding device 32h according to the modification example D8 includes an AMVP prediction parameter derivation section 3032h instead of the AMVP prediction parameter derivation section 3032 in the inter-prediction parameter decoding section 303 (see FIG. 3).

Figure 36:
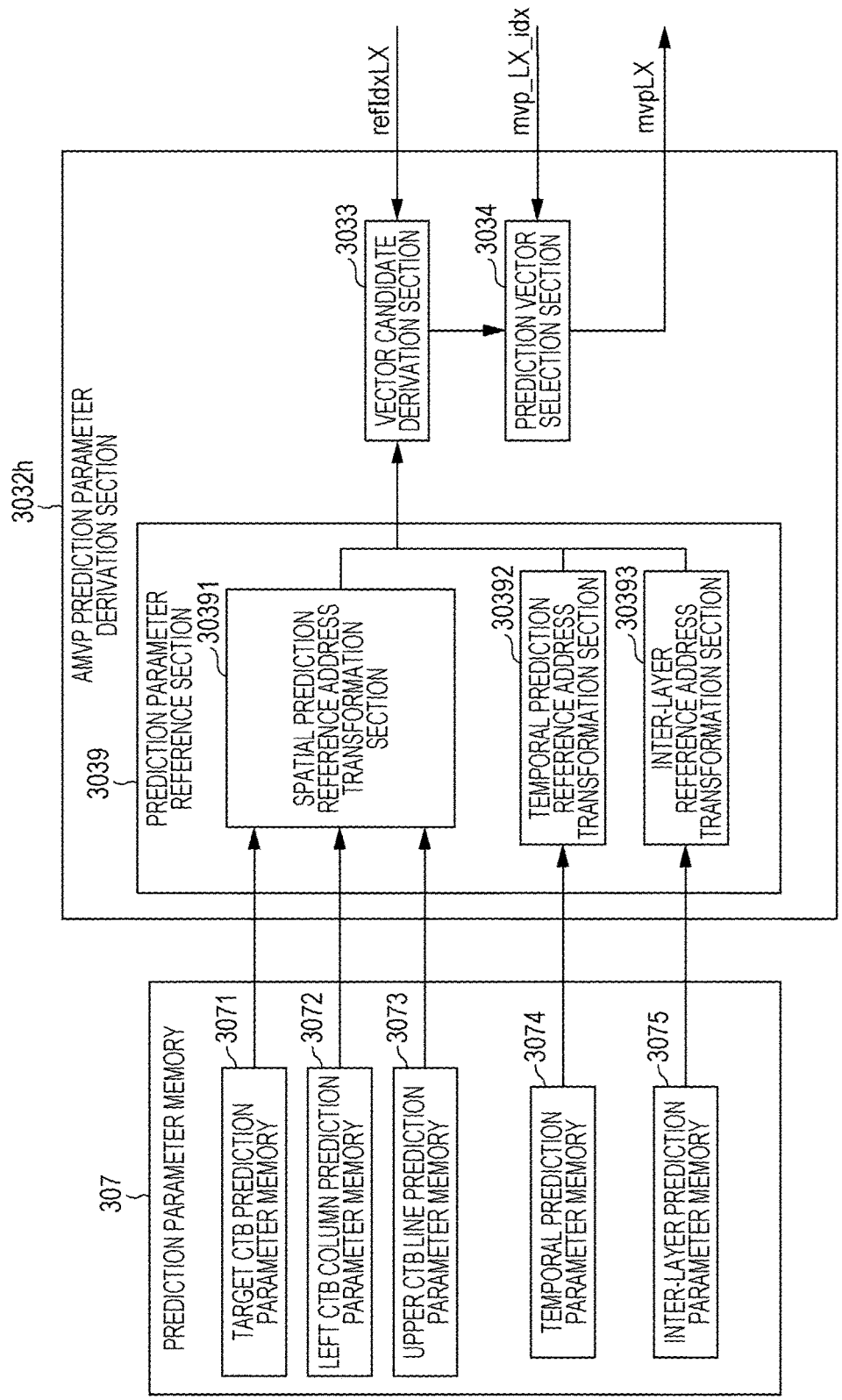
FIG. 36 is a block diagram illustrating the configurations of an AMVP prediction parameter derivation section and a prediction parameter memory according to a modification example D8 of the embodiment.

FIG. 36 is a block diagram illustrating the configurations of the AMVP prediction parameter derivation section 3032h and the prediction parameter memory 307 according to the modification example D8.

The AMVP prediction parameter derivation section 3032h includes the vector candidate derivation section 3033 and the prediction vector selection section 3034, as described above. The AMVP prediction parameter derivation section 3032h includes a prediction parameter reference section 3039. The prediction parameter reference section 3039 includes a spatial prediction reference address transformation section 30391, a temporal prediction reference address transformation section 30392, and an inter-layer reference address transformation section 30393 (inter-layer reference address transformation section).

The vector candidate derivation section 3033 included in the AMVP prediction parameter derivation section 3032h derives the vector candidate with reference to the prediction parameter of the already-decoded prediction unit PU.

At this time, the prediction parameters of the prediction unit of the previous picture and the prediction parameters (inter-layer prediction parameters) of the prediction unit of the different layer from the target layer are referred to in order (for example, a raster scan order) of a prediction parameter (target CTB prediction parameter) of the prediction unit within the decoding target block, that is, a target CTB, a prediction parameter (left CTB column prediction parameter) of the prediction unit of the CTB located left, and a prediction parameter (upper CTB line prediction parameter) of the prediction unit of the CTB located above the target CTB. The prediction parameter reference section 3039 refers to these prediction parameters from a target CTB prediction parameter memory 3071, a left CTB column prediction parameter memory 3072, an upper CTB line prediction parameter memory 3073, a temporal prediction parameter memory 3074, and an inter-layer prediction parameter memory 3075 included in the prediction parameter memory 307. At this time, the spatial prediction reference address transformation section 30391 and the temporal prediction reference address transformation section 30392 perform transformation on the coordinates of a reference destination. An operation of the inter-layer reference address transformation section 30393 will be described below.

When the vector candidate derivation section 3033 of the AMVP prediction parameter derivation section 3032h derives the vector candidate, a process in the case in which the prediction parameters of the layer image of the different layer from the layer of the decoding target picture is referred to may be the same as the process in the case in which the vector candidate is derived in the inter-layer vector candidate derivation section 30337 (see FIG. 11) when the merge candidate is the enhancement vector candidate. Further, when the merge candidate is derived in the merge candidate derivation section 30364, the process in the case in which the prediction parameters of the layer image of the different layer from the layer of the decoding target picture is referred to may be the same as the process in the case in which the merge candidate is derived in the inter-layer merge vector candidate derivation section 30363 (see FIG. 13) when the merge candidate is the enhancement merge candidate.

Figures 37, 38:
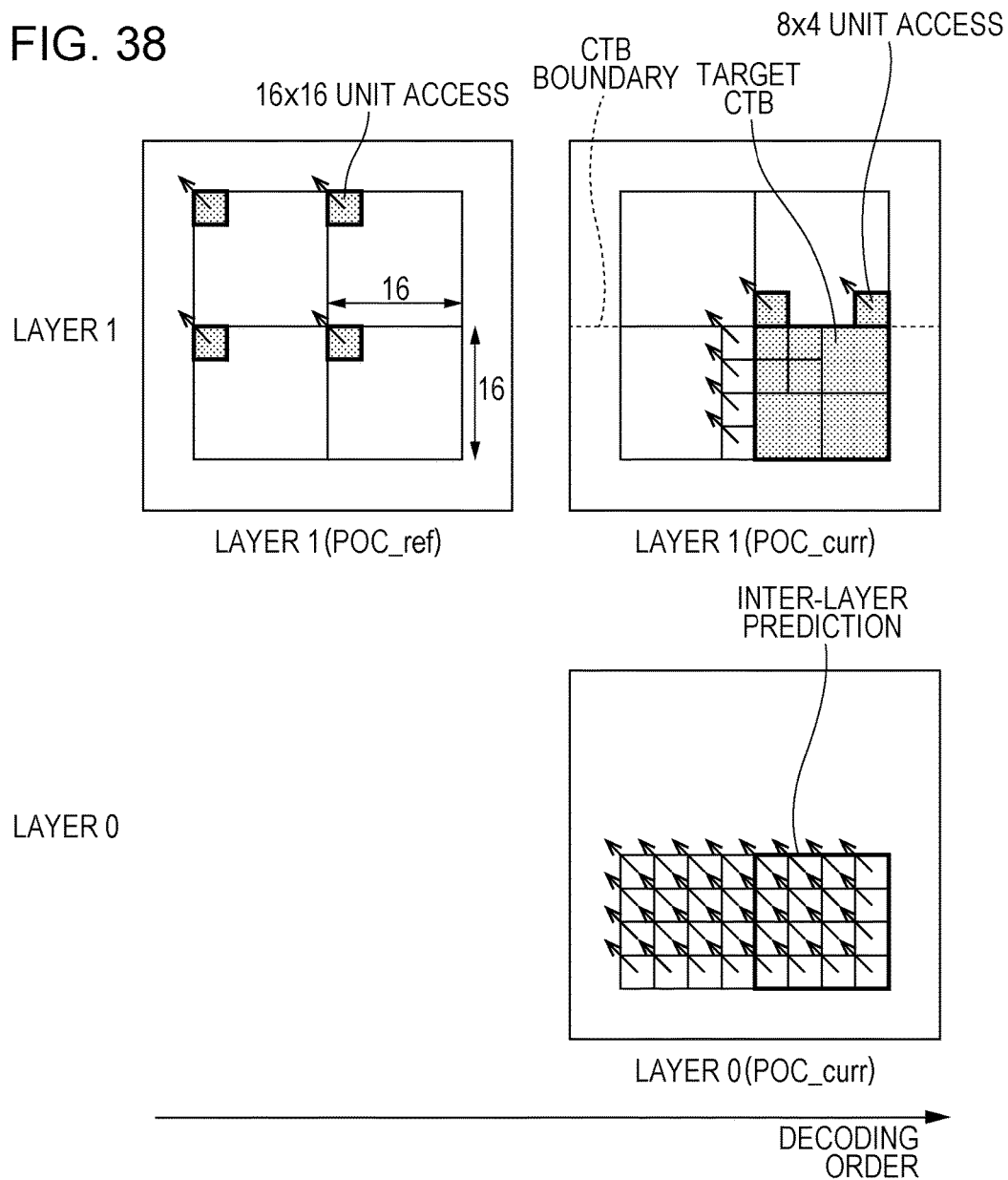
FIG. 37 is a diagram illustrating examples of expressions used for coordinate transformation.
FIG. 38 is a block diagram illustrating the configurations a merge prediction parameter derivation section and a prediction parameter memory 307 according to a modification example D8 of the embodiment.

FIG. 37 is a diagram illustrating examples of expressions used for coordinate transformation.

As shown in expressions of (a) of FIG. 37, the spatial prediction reference address transformation section 30391 transforms an X coordinate xP into xP' according to the following expression when the prediction unit to be referred to is present in a picture of the target prediction unit and a picture (the picture of the same layer and the same display time) and the coordinates (xP−1, yP) to be referred to is located above the target CTB (when yp−1 is less than ((yC>>Log 2 CtbSizeY)<<log 2CtbSizeY)):

$$xP'=(xP>>3)<<3+((xP>>3) \& 1)*7.$$

In this case, when xP is 0 to 7, xP is transformed to 0. When xP is 8 to 15, xP is transformed to 15. The prediction parameter reference section 3039, the prediction parameter is referred to using the transformed coordinates.

As shown in the expressions of (b) of FIG. 37, the temporal prediction reference address transformation section 30392 transforms coordinates (xP, yP) to be referred to into (xP', yP') when the layer in which the prediction unit to be referred to is present in a picture having the same layer and a different display time as the target prediction unit in vector candidate derivation by the vector candidate derivation section 3033.

$$xP'=(xP>>4)<<4$$

$$yP'=(yP>>4)<<4$$

The prediction parameter reference section 3039 makes a reference using the transformed coordinates. The coordinates to be referred are in multiples of 16 in both of the X coordinate and the Y coordinates through the transformation.

Next, an example where a region in which the above-described coordinate transformation is performed and the prediction parameter is referred to on the prediction parameter memory 307 will be described.

FIG. 38 is a conceptual diagram illustrating example of a region referred to in the coordinate transformation.

In FIG. 38, a reference region related to the picture of layer 1 is illustrated in the upper part and a reference region related to the picture of layer 0 is illustrated in the lower part. The horizontal indicates the decoding order.

FIG. 38 illustrates a picture (layer 1 (POC_curr)) of a target prediction unit at a current time (POC_curr), a picture (layer 0 (POC_ref)) of the prediction unit of the same layer (layer 1) as the layer of the target picture at a previous time (POC_ref)), and a picture (layer 0 (POC_curr)) of a different layer (layer 0) from the target prediction unit at the current time (POC_curr). In this example, the regions of two pictures (Layer 0 (POC_ref) and (layer 0 (POC_curr)) are referred to.

As illustrated in FIG. 38, in the prediction parameter reference of the CTB above the target CTB, the prediction parameter is referred to in 8×4 units by transforming (restricting) a reference address by the spatial prediction reference address transformation section 30391. The prediction parameter of the prediction unit at a different display time from the target picture of the same layer (layer 1) as the layer of the target picture is referred to in 16×16 units by the temporal prediction reference address transformation section 30392. On the other hand, the prediction parameter of the different layer from the target picture is referred to as a minimum PU unit (8×4 or 4×8). In this case, in the inter-layer prediction parameter memory 3077, it is necessary to store the prediction parameter in 4×4 which is the greatest common divisor of the minimum PU unit, and thus a considerably large prediction parameter memory is necessary.

Referring back to FIG. 36, the prediction parameter reference section 3039 refers to the prediction parameter stored in the prediction parameter memory 391 when the merge candidate is derived in a merge candidate derivation section 30364 to be described below.

Here, in the case of referring to the prediction parameter of the layer image of the different layer from the layer of the decoding target picture, the inter-layer reference address transformation section 30393 transforms the address to be referred to, referring the inter-layer prediction parameter memory 3075 in the prediction parameter memory 307 storing the prediction parameter of the layer image of the different layer, when the vector candidate is derived in the AMVP prediction parameter derivation section 3032$h$ or when a merge candidate is derived in the merge candidate derivation section 30361.

Next, a block diagram illustrating the configurations of a merge prediction parameter derivation section 3036$h$ and the prediction parameter memory 307 according to the modification example will be described.

Figure 39:
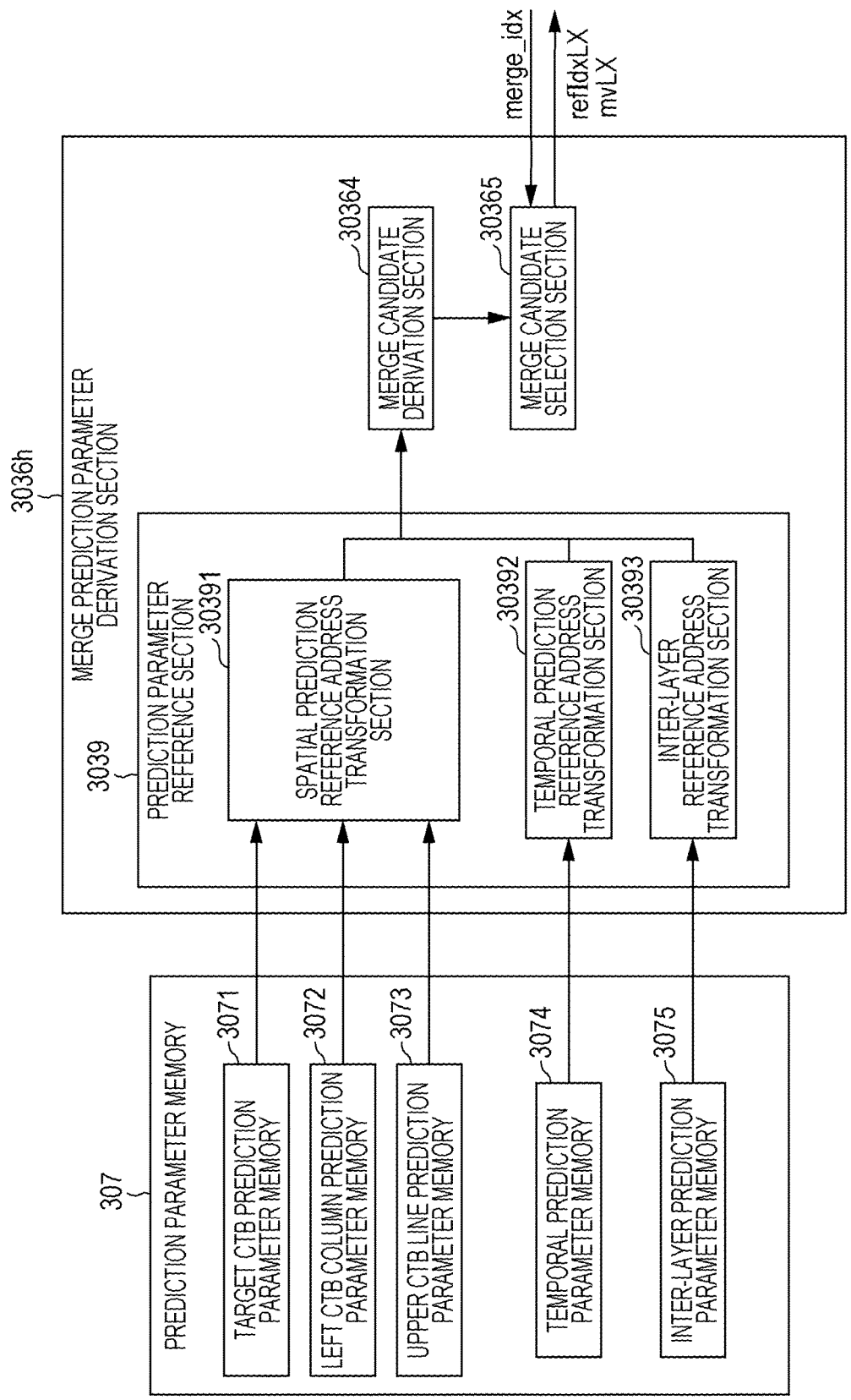
FIG. 39 is a diagram illustrating the configurations of an AMVP prediction parameter derivation section and a prediction parameter memory according to a modification example D8 of the embodiment.

FIG. 39 is a block diagram illustrating the configurations of the merge prediction parameter derivation section 3036$h$ and the prediction parameter memory 307 according to a modification example D8 of the embodiment.

The merge prediction parameter derivation section 3036$h$ includes a merge candidate derivation section 30364 and a merge candidate selection section 30365. The merge prediction parameter derivation section 3036$h$ further includes a prediction parameter reference section 3039 (see FIG. 36).

The merge candidate derivation section 30364 derives the prediction parameters referred to by the prediction parameter reference section 3039 as merge candidates and outputs the derived merge candidates to the merge candidate selection section 30365.

The merge candidate selection section 30365 selects a prediction parameter (for example, the vector mvLX and the reference picture index refIdxLX) as the merge candidate indicated by the input merge index merge_idx among the derived merge candidates. The merge candidate selection section 30365 outputs the selected merge candidate.

Figures 40, 41:
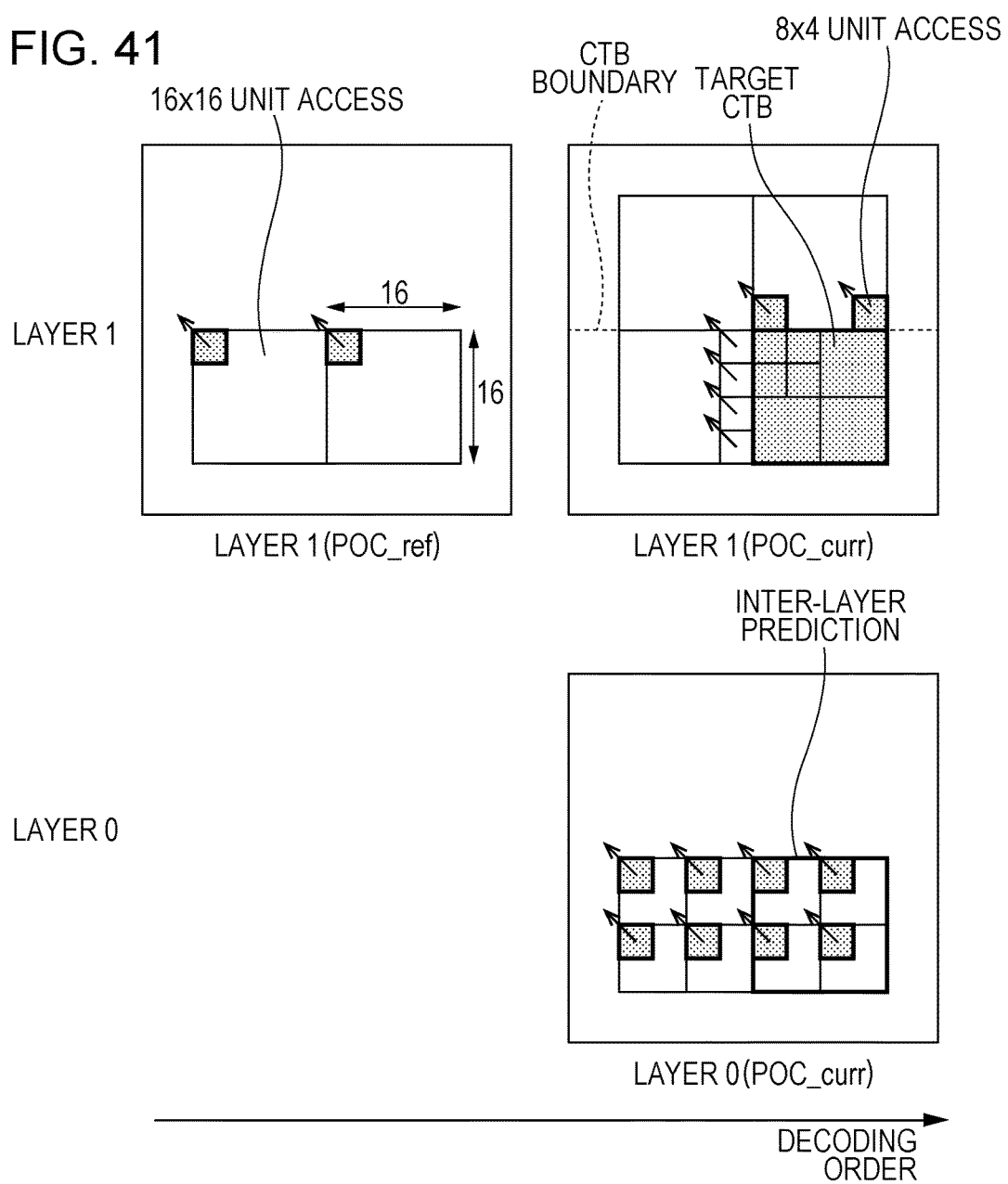
FIG. 40 is a diagram illustrating examples of expressions used for coordinate transformation.
FIG. 41 is a conceptual diagram illustrating another example of a region referred to in the coordinate transformation.

FIG. 40 is a diagram illustrating other examples of expressions used for the coordinate transformation.

Expressions of (a) of FIG. 40 are used for the inter-layer reference address transformation section 30393 to transform the coordinates (xP, yP) to be referred to into (xP', yP') when the reference layer information reference_layer_info is 1, that is, the inter-layer prediction is performed, in the vector candidate derivation of the vector candidate derivation section 3033.

$$xP'=(xP>>3)<<3$$

$$yP'=(yP>>3)<<3$$

The above calculation is calculation of truncating the lower 3 bits to 0 and the derivation can be also performed in the following expressions using a logical calculation product &:

xP'=(xP & ~3), and yP'=(yP & ~3).

Here, ~ is a calculation indicating logical NOT.

Coordinate transformation in the merge candidate derivation in the merge candidate derivation section 30364 may also be the same as these coordinate transformations.

FIG. 41 is a conceptual diagram illustrating another example of a region referred to in the coordinate transformation.

FIG. 41 illustrates a reference region based on the coordinates transformed by the inter-layer reference address transformation section 30393 in regard to the target prediction unit and the reference prediction unit illustrated in FIG. 40.

Through the above-described transformation, the prediction parameter memory is referred to in 8×8 units in the inter-layer prediction (layer 0 (POC_curr)). In this example, by referring a larger region than in the case that the prediction parameter memory is referred to in, for example, 4×4 units (or 4×8 units or 8×4 units) which are unit of smaller regions, the advantageous effect of reducing a memory amount of the prediction parameter memory is obtained. That is, even when the prediction parameter of a certain layer image is referred to in the decoding of other layer images (the inter-layer prediction of the prediction parameter is performed), the reference address of the prediction parameter for a certain layer image is restricted to predetermined addresses. Therefore, it is possible to perform compression of removing the prediction parameter other than the predetermined address.

Referring back to FIG. 40, in the inter-layer reference address transformation section 30393, expressions of (b) of FIG. 40 are used to transform the coordinates (xP, yP) to be referred to into (xP', yP') when the reference layer information reference_layer_info is 1, that is, the inter-layer prediction is performed in the vector candidate derivation of the vector candidate derivation section 3033.

xP'=(xP>>3)<<3)+((xP>>3) & 1)*7 yP'=(yP>>3)<<3)+((yP>>3) & 1)*7

Figure 42:
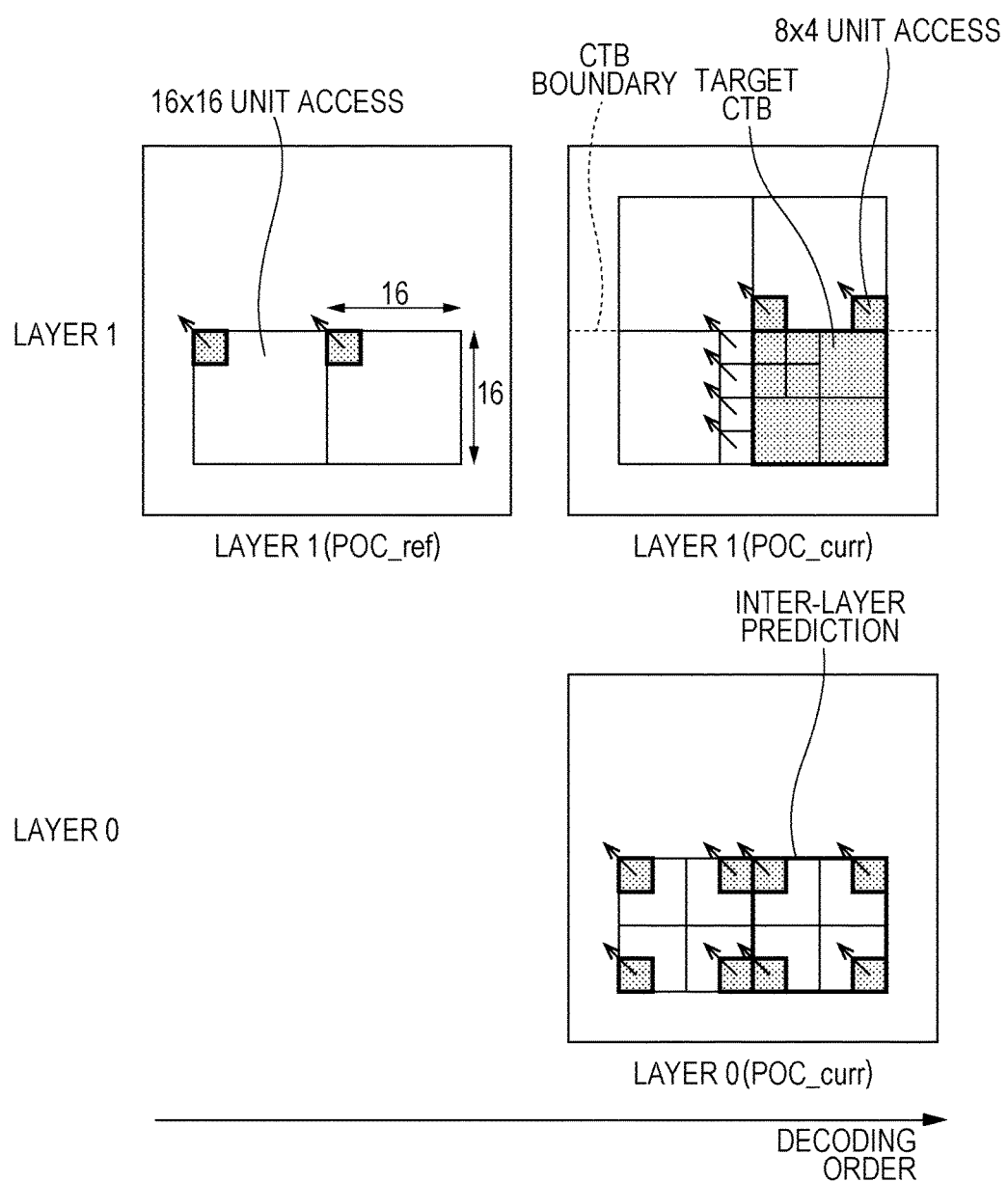
FIG. 42 is a conceptual diagram illustrating still another example of a region referred to in the coordinate transformation.

FIG. 42 is a conceptual diagram illustrating still another example of a region referred to in the coordinate transformation.

FIG. 42 illustrates a reference region based on the coordinates transformed by the inter-layer reference address transformation section 30393 in regard to the target prediction unit and the reference prediction unit illustrated in FIG. 40.

In the example illustrated in FIG. 42, the prediction parameter memory is referred to from a corner region of each block with a size of 16×16 units in layer 0 (POC_curr). Even in this case, since the prediction parameter memory is not referred to in 4×4 units (or 4×8 units and 8×4 units), which are smaller units, in the inter-layer prediction, the advantageous effect of reducing a memory amount of the prediction parameter memory is obtained.

(Configuration of Image Encoding Device)

Next, the configuration of the image encoding device 11 according to the embodiment will be described.

Figure 14:
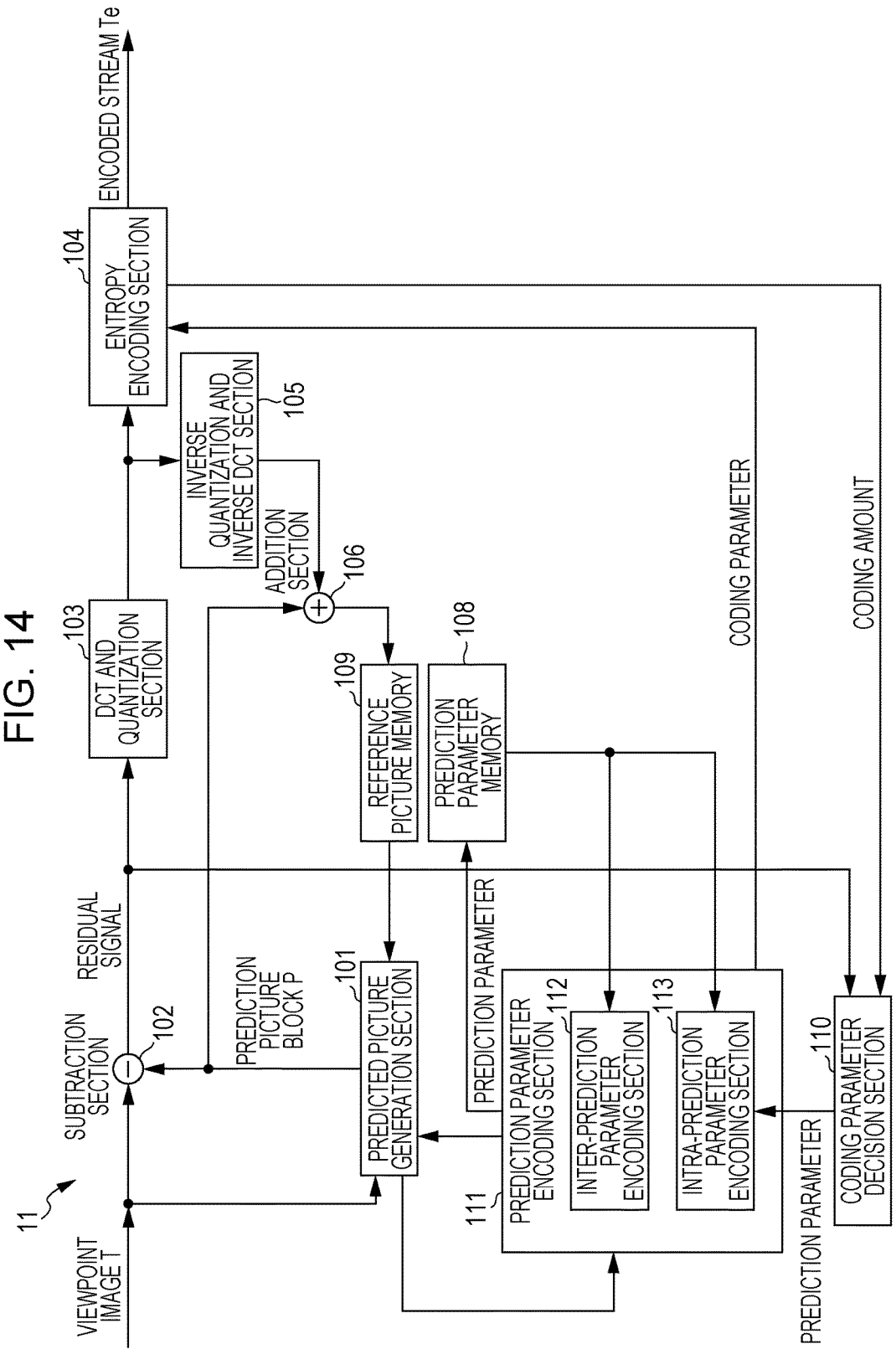
FIG. 14 is a block diagram illustrating the configuration of an image encoding device according to the embodiment.

FIG. 14 is a block diagram illustrating the configuration of the image encoding device 11 according to the embodiment.

The image encoding device 11 is configured to include a predicted picture generation section (prediction image generation section) 101, a subtraction section 102, a DCT and quantization section 103, an entropy encoding section 104, an inverse quantization and inverse DCT section 105, an addition section 106, a prediction parameter memory 108, a reference picture memory (reference image storage section) 109, a coding parameter decision section 110, and a prediction parameter encoding section 111. The prediction parameter encoding section 111 is configured to include an inter-prediction parameter encoding section 112 and an intra-prediction parameter encoding section 113.

The predicted picture generation section 101 generates the predicted picture block P for each block which is a region separated from each picture in regard to the picture at each viewpoint of the layer image T input from the outside. Here, the predicted picture generation section 101 reads the reference picture block from the reference picture memory 109 based on the prediction parameter input from the prediction parameter encoding section 111. The prediction parameter input from the prediction parameter encoding section 111 is, for example, the motion vector mvLX or the disparity vector dvLX. The predicted picture generation section 101 reads the reference picture block of the block located at a position indicated by the motion vector or the disparity vector predicated using a coding target block as a starting point. The predicted picture generation section 101 generates the predicted picture block P using one prediction scheme among a plurality of prediction schemes in regard to the read reference picture block. The predicted picture generation section 101 outputs the generated predicted picture block P to the subtraction section 102.

To select the prediction scheme, the predicted picture generation section 101 selects, for example, a prediction scheme in which an error value based on a difference between a signal value for each pixel of the block included in the layer image and a signal value for each pixel corresponding to the predicted picture block P is the minimum. The method of selecting the prediction scheme is not limited thereto.

When the picture of a coding target is the base view picture, the plurality of prediction schemes are intra-prediction, motion prediction, and merge prediction. The motion prediction is inter-temporal prediction in the above-described inter-prediction. The merge prediction is prediction in which the same reference picture block and prediction parameter as a block which is an already encoded block and is a block within a pre-decided range from the coding target block. When the picture of the coding target is the non-base view picture, the plurality of prediction schemes are intro-prediction, motion prediction, merge prediction, and disparity prediction. The disparity prediction (parallax prediction) is prediction between different layer images (different viewpoint images) in the above-described inter-prediction.

When the intra-prediction is selected, the predicted picture generation section 101 outputs the prediction mode predMode indicating the intra-prediction mode used at the time of the generation of the predicted picture block P to the prediction parameter encoding section 111.

When the motion prediction is selected, the predicted picture generation section 101 stores the motion vector mvLX used at the time of the generation of the predicted picture block P in the prediction parameter memory 108 and outputs the motion vector mvLX to the inter-prediction parameter encoding section 112. The motion vector mvLX indicates a vector from the position of the coding target block to the position of the reference picture block at the time of the generation of the predicted picture block P. Information indicating the motion vector mvLX includes information (for example, the reference picture index refIdxLX or the picture order number POC) indicating the reference picture and may indicate the prediction parameter. The predicted picture generation section 101 outputs a prediction mode predMode indicating the inter-prediction mode to the prediction parameter encoding section 111.

When the disparity prediction is selected, the predicted picture generation section 101 stores the disparity vector dvLX used at the time of the generation of the predicted picture block P in the prediction parameter memory 108 and outputs the disparity vector dvLX to the inter-prediction parameter encoding section 112. The disparity vector dvLX indicates a vector from the position of the coding target block to the position of the reference picture block at the time of the generation of the predicted picture block P. Information indicating the disparity vector dvLX includes information (for example, the reference picture index refIdxLX or the view identifier view_id) indicating the reference picture and may indicate the prediction parameter. The predicted picture generation section 101 outputs a prediction mode predMode indicating the inter-prediction mode to the prediction parameter encoding section 111.

When the merge prediction is selected, the predicted picture generation section 101 outputs the merge index merge_idx indicating the selected reference picture block to the inter-prediction parameter encoding section 112. Further, the predicted picture generation section 101 outputs a prediction mode predMode indicating the merge prediction mode to the prediction parameter encoding section 111.

The subtraction section 102 generates a residual signal by subtracting a signal value of the predicted picture block P input from the predicted picture generation section 101 from a signal value of the block corresponding to the layer image T input from the outside. The subtraction section 102 outputs the generated residual signal to the DCT and quantization section 103 and the coding parameter decision section 110.

The DCT and quantization section 103 perform DCT on the residual signal input from the subtraction section 102 to calculate a DCT coefficient. The DCT and quantization section 103 quantizes the calculated DCT coefficient to obtain a quantization coefficient. The DCT and quantization section 103 outputs the obtained quantization coefficient to the entropy encoding section 104 and the inverse quantization and inverse DCT section 105.

The quantization coefficient is input from the DCT and quantization section 103 to the entropy encoding section 104 and the coding parameter is input from the coding parameter decision section 110 to the entropy encoding section 104. As the input coding parameter, for example, there are codes such as the reference picture index refIdxLX, the vector index mvp_LX_idx, the difference vector mvdLX, the prediction mode predMode, and the merge index merge_idx.

The entropy encoding section 104 performs entropy encoding on the input quantization coefficient and coding parameter to generate the encoded stream Te and outputs the generated encoded stream Te to the outside.

The inverse quantization and inverse DCT section 105 performs inverse quantization on the quantization coefficient input from the DCT and quantization section 103 to obtain a DCT coefficient. The inverse quantization and inverse DCT section 105 performs the inverse DCT on the obtained DCT coefficient to calculate a decoding residual signal. The inverse quantization and inverse DCT section 105 outputs the calculated decoding residual signal to the addition section 106.

The addition section 106 adds a signal value of the predicted picture block P input from the predicted picture generation section 101 and a signal value of the decoding residual signal input from the inverse quantization and inverse DCT section 105 for each pixel to generate a reference picture block. The addition section 106 stores the generated reference picture block in the reference picture memory 109.

The prediction parameter memory 108 stores the prediction parameter generated by the prediction parameter encoding section 111 at a position decided in advance for each picture and block of the coding target.

The reference picture memory 109 stores the reference picture block generated by the addition section 106 at a position decided in advance for each picture and block of the coding target.

The coding parameter decision section 110 selects one set from a plurality of sets of coding parameters. The coding parameters are the above-described prediction parameters or parameters which are coding targets generated in association with the prediction parameters. The predicted picture generation section 101 generates the predicted picture block P using each set of coding parameters.

The coding parameter decision section 110 calculates a cost value indicating the size of an information amount or a coding error in each of the plurality of sets. The cost value is, for example, a sum of the coding amount and a value obtained by multiplying a squared error by a coefficient $\lambda$. The coding amount is an information amount of the encoded stream Te obtained by performing entropy coding on a quantized error and the coding parameter. The squared error is a total sum of squared values of residual values of residual signals calculated in the subtraction section 102 between the pixels. The coefficient $\lambda$ is a larger real number than preset zero. The coding parameter decision section 110 selects the set of coding parameters for which the calculated cost value is the minimum. In this way, the entropy encoding section 104 outputs the selected set of coding parameters as the encoded stream Te to the outside and does not output the unselected set of coding parameters.

The prediction parameter encoding section 111 derives the prediction parameters used at the time of the generation of the predicted picture based on the parameter input from the predicted picture generation section 101 and encodes the derived prediction parameter to generate the set of coding parameters. The prediction parameter encoding section 111 outputs the generated set of coding parameters to the entropy encoding section 104.

The prediction parameter encoding section 111 stores the prediction parameter corresponding to the set of coding parameters selected by the coding parameter decision section 110 among the generated sets of coding parameters in the prediction parameter memory 108.

When the prediction mode predMode input from the predicted picture generation section 101 is the inter-prediction mode, the prediction parameter encoding section 111 operates the inter-prediction parameter encoding section 112. When the prediction mode predMod indicates the intra-prediction mode, the prediction parameter encoding section 111 operates the intra-prediction parameter encoding section 113.

The inter-prediction parameter encoding section 112 derives the inter-prediction parameter based on the prediction parameter input from the coding parameter decision section 110. The inter-prediction parameter encoding section 112 includes the same configuration as the configuration in which the inter-prediction parameter decoding section 303 (see FIG. 2 or the like) derives the inter-prediction parameter as the configuration in which the inter-prediction parameter is derived. The configuration of the inter-prediction parameter encoding section 112 will be described below.

The intra-prediction parameter encoding section 113 decides an intra-prediction mode IntraPredMode indicated by the prediction mode predMode input from the coding parameter decision section 110 as the set of inter-prediction parameter.

(Configuration of Inter-Prediction Parameter Encoding Section)

Next, the configuration of the inter-prediction parameter encoding section 112 will be described.

Figure 15:
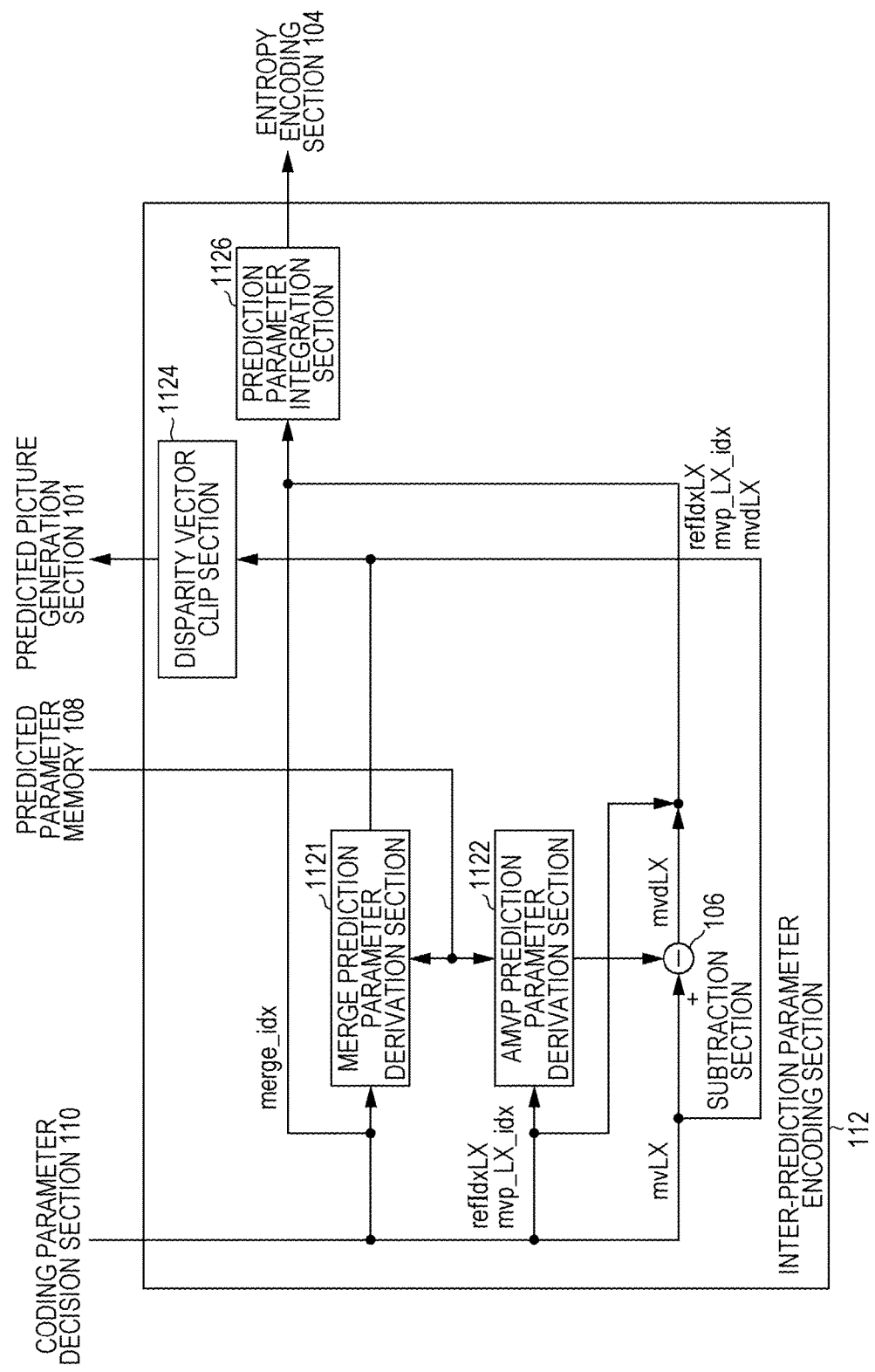
FIG. 15 is a schematic diagram illustrating the configuration of an inter-prediction parameter encoding section according to the embodiment.

FIG. 15 is a schematic diagram illustrating the configuration of the inter-prediction parameter encoding section 112 according to the embodiment.

The inter-prediction parameter encoding section 112 is configured to include a merge prediction parameter derivation section (a disparity vector generation section or a prediction parameter derivation section) 1121, an AMVP prediction parameter derivation section (a disparity vector generation section or a prediction parameter derivation section) 1122, a subtraction section 1123, a disparity vector clip section (disparity vector restriction section) 1124, and a prediction parameter integration section 1126.

The merge prediction parameter derivation section 1121 has the same configuration as the above-described merge prediction parameter derivation section 3036 (see FIG. 3).

When the prediction mode predMode input from the predicted picture generation section 101 indicates the merge prediction mode, the merge index merge_idx is input from the coding parameter decision section 110 to the merge prediction parameter derivation section 1121. The merge index merge_idx is output to the prediction parameter integration section 1126. The merge prediction parameter derivation section 1121 reads the vector mvLX and the reference picture index refIdxLX of the reference block indicated by the merge index merge_idx among the merge candidates from the prediction parameter memory 108. The merge candidate is a reference block which is a reference block (for example, among the reference blocks adjacent to the lower left end, the upper left end, and the upper right end of the coding target block) within a range decided in advance from the coding target block which is the coding target and is the reference block subjected to the coding process. The merge prediction parameter derivation section 1121 outputs the read prediction vector mvpLX and the reference picture index refIdxLX to the disparity vector clip section 1124 in association therewith.

The AMVP prediction parameter derivation section 1122 has the same configuration as the above-described AMVP prediction parameter derivation section 3032 (see FIG. 3).

When the prediction mode predMode input from the predicted picture generation section 101 indicates the inter-prediction mode, the vector mvLX is input from the coding parameter decision section 110 to the AMVP prediction parameter derivation section 1122. The AMVP prediction parameter derivation section 1122 derives the prediction vector mvpLX based on the input vector mvLX. The AMVP prediction parameter derivation section 1122 outputs the derived prediction vector mvpLX to the subtraction section 1123. The reference picture index refIdx and the vector index mvp_LX_idx are output to the prediction parameter integration section 1126.

The subtraction section 1123 subtract the prediction vector mvpLX input from the AMVP prediction parameter derivation section 1122 from the vector mvLX input from the coding parameter decision section 110 to generate a difference vector mvdLX. When the vector mvLX is the inter-layer prediction (disparity vector), the subtraction section 1123 omits the Y component mvd_y included in the difference vector mvdLX and causes the X component mvd_x to remain to generate a 1-dimensional difference vector (scalar value) mvdLX. Whether the vector mvLX is the disparity vector or the motion vector is determined based on the reference picture index refIdx as in the reference layer determination section 30311 (see FIG. 4). The subtraction section 1123 outputs the generated 1-dimensional difference vector mvdLX to the prediction parameter integration section 1126. When the vector mvLX is the motion vector, the subtraction section 1123 outputs the Y component mvd_y included in the difference vector mvdLX without omission directly to the prediction parameter integration section 1126.

The vector mvLX, the reference picture index refIdx, and the vector index mvp_LX_idx are input from the merge prediction parameter derivation section 1121 or the coding parameter decision section 110 to the disparity vector clip section 1124. The disparity vector clip section 1124 decides the value of the Y component dv_y which is the element of the input disparity vector dvLX to a pre-decided value (for example, zero) when the vector mvLX is the disparity vector. The disparity vector clip section 1124 retains the X component dv_x of the disparity vector dvLX without change. The disparity vector clip section 1124 outputs the disparity vector dvLX for which the value of the Y component dv_y is decided to the pre-decided value to the predicted picture generation section 101 in association with the reference picture index refIdx and the vector index mvp_LX_idx and stores the disparity vector dvLX in the prediction parameter memory 108.

Whether the vector mvLX is the disparity vector or the motion vector is determined based on the input reference picture index refIdx as in the reference layer determination section 30311 (see FIG. 4).

When the vector mvLX is the motion vector, the disparity vector clip section 1124 outputs the input vector mvLX directly to the predicted picture generation section 101 in association with the reference picture index refIdx and the vector index mv_LX_idx and stores the vector mvLX to the prediction parameter memory 108.

When the prediction mode predMode input from the predicted picture generation section 101 indicates the merge prediction mode, the prediction parameter integration section 1126 outputs the merge index merge_idx input from the coding parameter decision section 110 to the entropy encoding section 104.

When the prediction mode predMode input from the predicted picture generation section 101 indicates the inter-prediction mode, the prediction parameter integration section 1126 performs the following process.

The prediction parameter integration section 1126 determines whether the difference vector mvdLX input from the subtraction section 1123 is the difference vector related to the disparity vector or the difference vector related to the motion vector. Whether difference vector mvdLX is the difference vector related to the disparity vector or the difference vector related to the motion vector is determined based on the input reference picture index refIdx as in the reference layer determination section 30311 (see FIG. 4).

When the prediction parameter integration section 1126 determines that the input difference vector mvdLX is the difference vector related to the disparity vector, the prediction parameter integration section 1126 sets 1 as the value of the viewpoint arrangement flag camera_arrangement_1D_flag. The prediction parameter integration section 1126 calculates the above-described three kinds of codes, abs_mvd_greater0_flag [0], abs_mvd_minus2 [0], and mvd_sign_flag [0], based on the X component mvd_x indicated by the difference vector mvdLX.

For the Y component mvd_y, the prediction parameter integration section 1126 does not calculate these codes.

When the prediction parameter integration section 1126 determines that the input difference vector mvdLX is the difference vector related to the motion vector, the prediction parameter integration section 1126 sets 0 as the value of the viewpoint arrangement flag camera_arrangement_1D_flag.

The prediction parameter integration section 1126 calculates the above-described three kinds of codes, abs_mvd_greater0_flag [0], abs_mvd_minus2 [0], and mvd_sign_flag [0], based on the X component mvd_x indicated by the difference vector mvdLX. The prediction parameter integration section 1126 calculates the above-described three kinds of codes, abs_mvd_greater0_flag [1], abs_mvd_minus2 [1], and mvd_sign_flag [1], based on the Y component mvd_y indicated by the difference vector mvdLX.

The prediction parameter integration section 1126 integrates the viewpoint arrangement flag camera_arrangement_1D_flag with the decided value and the three kinds of codes calculated for each component, and the reference picture index refIdx and the vector index mvp_LX_idx input from the coding parameter decision section 110. The prediction parameter integration section 1126 outputs the integrated code to the entropy encoding section 104.

In this way, in the above-described example, the value of the Y component dvd_y is decided to a pre-decided value even when the Y component dvd_y of the difference vector dvdLX related to the disparity vector is not encoded. On the other hand, when the X component is a main value and the Y component is an ignorable value, the precision in disparity prediction does not deteriorate even in the above-described example. Accordingly, in the above-described example, the coding efficiency is improved without the deterioration in the quality of the decoded image.

MODIFICATION EXAMPLE E1

Next, an image encoding device 11*a* according to a modification example E1 will be described. The modification example E1 is a modification example corresponding to the above-described modification example D1. The same reference numerals are given to the same configuration and the above-description description will be quoted.

The image encoding device 11*a* according to the modification example E1 includes an AMVP prediction parameter derivation section 1122*a* instead of the AMVP prediction parameter derivation section 1122 (see FIG. 15). A subtraction section 1123*a* to be described below may be included instead of the subtraction section 1123 or may not be included. When the subtraction section 1123*a* is not included, the disparity vector clip section 1124 (see FIG. 15) may be omitted.

The AMVP prediction parameter derivation section 1122*a* has the same configuration as the AMVP prediction parameter derivation section 1122 (see FIG. 15). Here, when the calculated prediction vector mvpLX is the prediction vector related to the disparity vector, the AMVP prediction parameter derivation section 1122*a* restricts the Y component dvp_y of the prediction vector to a value within a pre-decided range, as in the disparity prediction vector clip section 30321*a* (see FIG. 5). Whether the vector related to the prediction vector mvpLX is the disparity vector or the motion vector is determined based on the reference picture index refIdx as in the reference layer determination section 30311 (see the modification example D1 and FIG. 4).

The AMVP prediction parameter derivation section 1122*a* reconstructs the prediction vector dvpLX from the X component dvp_x and the Y component dvp_y with the restricted value and outputs the reconstructed prediction vector dvpLX to the subtraction section 1123.

When the prediction vector mvpLX is the prediction vector related to the motion vector, the AMVP prediction parameter derivation section 1122*a* outputs the calculated prediction vector mvpLX directly to the subtraction section 1123.

The subtraction section 1123*a* calculates the difference vector mvdLX by subtracting the prediction vector mvpLX input from the AMVP prediction parameter derivation section 1122*a* from the vector mvLX input from the predicted picture generation section 101. The subtraction section 1123*a* outputs the calculated difference vector mvdLX to the entropy encoding section 104 irrespective of whether the vector mvLX is the disparity vector.

In this way, since the Y component dvp_y of the prediction vector related to the disparity vector is restricted to the value of the pre-decided range, deterioration in the accuracy in the disparity prediction can be suppressed. Thus, according to the modification example E1, the coding efficiency is improved.

MODIFICATION EXAMPLE E2

Next, an image encoding device 11*b* according to a modification example E2 will be described. The modification example E2 is a modification example corresponding to the above-described modification example D2. The same reference numerals are given to the same configuration and the above-description description will be quoted.

As in the modification example E1, the image encoding device 11*b* according to the modification example E2 includes an AMVP prediction parameter derivation section 1122*a* and the disparity vector clip section 1124*a* instead of the AMVP prediction parameter derivation section 1122 and the disparity vector clip section 1124 (see FIG. 15).

In the modification example E2, the above-described disparity vector restriction information disparity_restriction is input from the outside to the inter-prediction parameter encoding section 112 (see FIG. 15). When the vector mvLX is the disparity vector, the AMVP prediction parameter derivation section 1122*a*, the subtraction section 1123, and the disparity vector clip section 1124*a* perform the following processes according to the value of the disparity vector restriction information disparity_restriction.

When the value of the disparity vector restriction information disparity_restriction is zero or 2, the AMVP prediction parameter derivation section 1122*a* outputs the calculated prediction vector dvpLX directly to the subtraction section 1123 and the disparity vector clip section 1124*a*.

When the value of the disparity vector restriction information disparity_restriction is 1 or 3, the AMVP prediction parameter derivation section 1122*a* restricts the Y component dvp_y of the calculated prediction vector dvpLX to the value of the pre-decided range. The AMVP prediction parameter derivation section 1122a reconstruct the prediction vector dvpLX from the X component dvp_x of the prediction vector dvpLX and the Y component dvp_y for which the range of the value is restricted and outputs the reconstructed prediction vector dvpLX to the subtraction section 1123 and the disparity vector clip section 1124a.

When the value of the disparity vector restriction information disparity_restriction is zero or 1, the subtraction section 1123 outputs the calculated difference vector dvdLX (2-dimensional vector) directly to the prediction parameter integration section 1126 and the disparity vector clip section 1124a. When the value of the disparity vector restriction information disparity_restriction is 2 or 3, the subtraction section 1123 omits the Y component dvd_y of the calculated difference vector dvdLX and allows the X component dvd_x to remains to generate a 1-dimensional difference vector (scalar value) dvdLX. The subtraction section 1123 outputs the 1-dimensional difference vector dvdLX in which the X component dvd_x remains to the prediction parameter integration section 1126 and the disparity vector clip section 1124a.

The disparity vector clip section 1124a newly calculates the disparity vector dvLX by adding the prediction vector dvpLX input from the AMVP prediction parameter derivation section 1122a and the difference vector dvdLX input from the subtraction section 1123. Here, when the difference vector dvdLX input from the subtraction section 1123 is a 1-dimensional difference vector, a value (for example, zero) of a pre-decided range is added as the Y component dvd_y of the difference vector dvdLX. The disparity vector clip section 1124a outputs the newly calculated disparity vector dvLX to the predicted picture generation section 101 in association with the reference picture index refIdx and the vector index mvp_LX_idx and stores the newly calculated disparity vector dvLX in the prediction parameter memory 108.

Here, the reference picture index refIdx and the vector index mvp_LX_idx are input from the coding parameter decision section 110 to the disparity vector clip section 1124a.

However, unlike the disparity vector clip section 1124, the vector mvLX (the disparity vector dvLX) is not input from the coding parameter decision section 110 to the disparity vector clip section 1124a. Therefore, when the value of the disparity vector restriction information disparity_restriction is one of 1, 2, and 3, the range of the value of the Y component dv_y of the output disparity vector dvLX is restricted.

The disparity vector restriction information disparity_restriction is input to the prediction parameter integration section 1126. The prediction parameter integration section 1126 integrates the input codes other than the above-described codes and outputs the integrated code to the entropy encoding section 104. In this way, the disparity vector restriction information disparity_restriction is also an entropy coding target.

In the modification example E2, whether the vector mvLX is the disparity vector or the motion vector may not be determined in the subtraction section 1123 and the disparity vector clip section 1124a.

In the modification example E2, the disparity vector restriction information disparity_restriction may be included for each disparity or may be included for each sequence in the encoded stream Te.

In this way, in the modification example E2, whether the difference or a predicted value of the disparity (viewpoint) in the Y direction is used can be switched according to the arrangement of the viewpoints or the like at which an image is acquired or a scene of the photographed image. The suppression of the deterioration in the image quality of the scene as a whole and reduction in an information amount of the encoded stream Te can be compatible.

MODIFICATION EXAMPLE E3

Next, an image encoding device 11c according to a modification example E3 will be described. The modification example E3 is a modification example corresponding to the above-described modification example D3. The same reference numerals are given to the same configuration and the above-description description will be quoted.

The image encoding device 11c according to the modification example E3 includes an inter-prediction parameter encoding section 112c instead of the inter-prediction parameter encoding section 112 (see FIG. 15).

Figure 16:
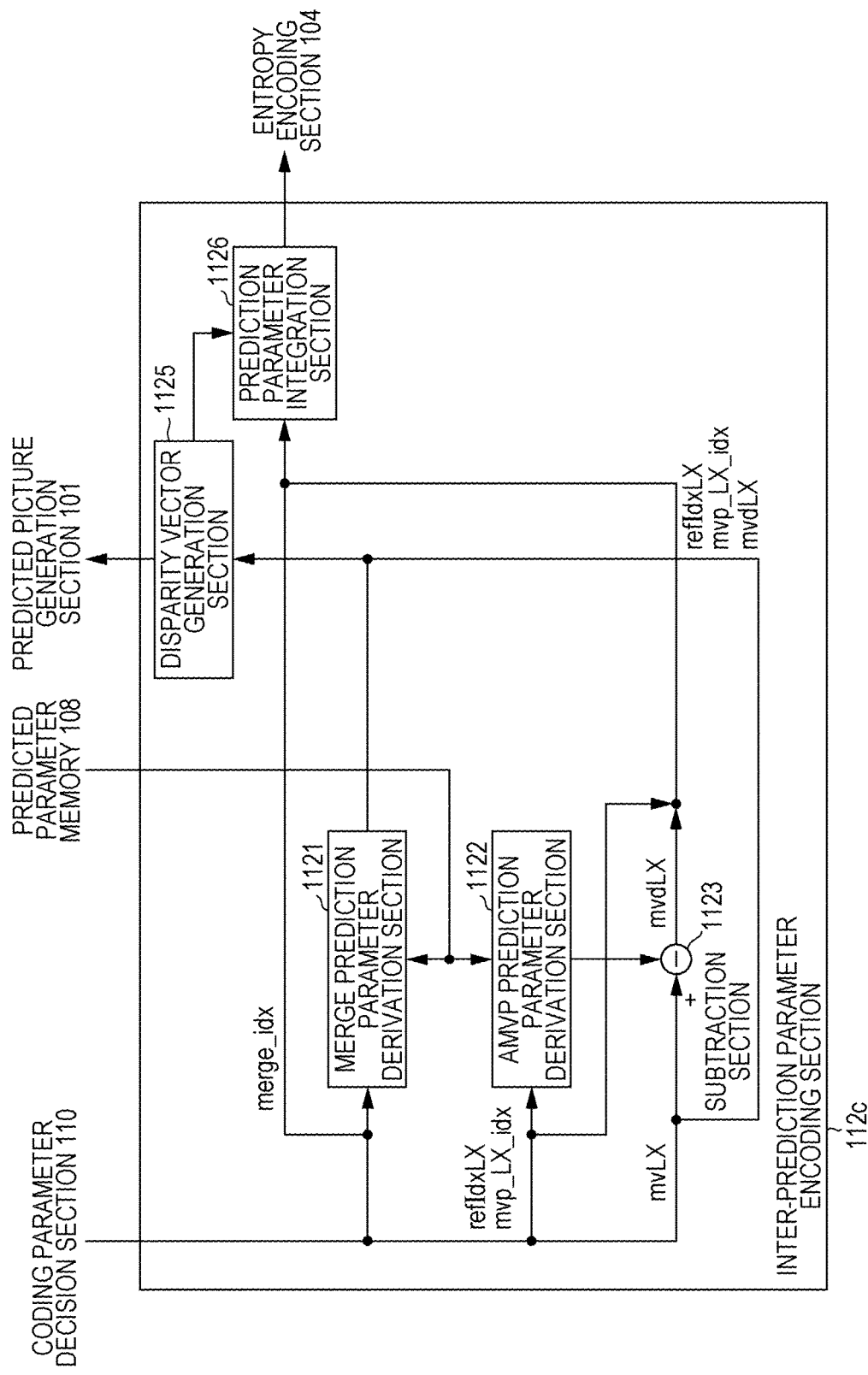
FIG. 16 is a schematic diagram illustrating the configuration of an inter-prediction parameter encoding section according to a modification example E3 of the embodiment.

FIG. 16 is a schematic diagram illustrating the configuration of the inter-prediction parameter encoding section 112c according to the modification example E3.

The inter-prediction parameter encoding section 112c includes a disparity vector generation section 1125 instead of the disparity vector clip section 1124 in the inter-prediction parameter encoding section 112.

In the modification example E3, the gradient coefficient inter_view_grad and the intercept coefficient inter_view_offset described above are input from the outside to the disparity vector generation section 1125.

When the vector mvLX is the disparity vector, the disparity vector dvLX, the reference picture index refIdx, and the vector index mvp_LX_idx are input from the merge prediction parameter derivation section 1121 or the coding parameter decision section to the disparity vector generation section 1125. The disparity vector generation section 1125 calculates the Y component dv_y based on the gradient coefficient inter_view_grad and the intercept coefficient inter_view_offset of the X component dv_x of the disparity vector dvLX. A process of calculating the Y component dv_y may be the same as that in the disparity vector setting section 30382 (see the modification example D3 and FIG. 7). Whether the vector mvLX is the disparity vector or the motion vector is determined based on the input reference picture index refIdx as in the reference layer determination section 30311 (see FIG. 4). The disparity vector generation section 1125 reconstructs the disparity vector mvLX from the X component dv_x and the calculated Y component dv_y. The disparity vector generation section 1125 may calculate the Y component dv_y based on the intercept coefficient inter_view_offset without using the X component dv_x of the disparity vector dvLX. That is, dv_y=inter_view_offset may be used. In this case, since the gradient coefficient inter_view_grad typically means 0, it is not necessary to encode this component.

The disparity vector generation section 1125 outputs the reconstructed disparity vector dvLX to the predicted picture generation section 101 in association with the reference picture index refIdx and the vector index mvp_LX_idx and stores the disparity vector dvLX in the prediction parameter memory 108.

When the vector mvLX is the motion vector, the disparity vector generation section 1125 outputs the input motion vector mvLX directly to the predicted picture generation section 101 in association with the reference picture index refIdx and the vector index mvp_LX_idx and stores the motion vector mvLX in the prediction parameter memory 108.

The disparity vector generation section 1125 outputs the gradient coefficient inter_view_grad and the intercept coefficient inter_view_offset to the prediction parameter integration section 1126. The prediction parameter integration section 1126 integrates the disparity vector restriction information disparity_restriction input from the disparity vector generation section 1125 and the above-described input other codes and outputs the integrated code to the entropy encoding section 104. In this way, the gradient coefficient inter_view_grad and the intercept coefficient inter_view_offset are also the entropy coding targets.

The gradient coefficient inter_view_grad and the intercept coefficient inter_view_offset may be included for each sequence or may be included for each picture in the encoded stream Te. In particular, such coefficients may be included in each picture to follow a minute change in units of pictures of a scene.

In this way, in the modification example E3, the disparity in the Y direction can be reproduced based on the disparity (parallax) in the X direction even when the disparity (parallax) in the Y direction is not completely a pre-decided value in a case in which the arrangement or the direction of the viewpoints at which an image is acquired is not precisely parallel in one direction. In the modification example E3, by switching a relation between the disparity in the X direction and the disparity in the Y direction according to a scene of the photographed image, the suppression of the deterioration in the image quality of the scene as a whole and reduction in an information amount of the encoded stream Te can be compatible.

MODIFICATION EXAMPLE E4

Next, an image encoding device 11d according to a modification example E4 will be described. The modification example E4 is a modification example corresponding to the above-described modification example D4. The same reference numerals are given to the same configuration and the above-description description will be quoted.

The image encoding device 11d according to a modification example E4 includes a disparity vector clip section 1124d instead of the disparity vector clip section 1124 (see FIG. 15).

The image encoding device 11d may include a subtraction section 1123a (see the modification example E1) instead of the subtraction section 1123 (see FIG. 15).

The disparity vector clip section 1124d performs the same process as the disparity vector clip section 1124. The vector mvLX, the reference picture index refIdx, and the vector index mvp_LX_idx are input from the merge prediction parameter derivation section 1121 or the coding parameter decision section 110 to the disparity vector clip section 1124d. When the vector mvLX is the disparity vector, in the disparity vector clip section 1124d, the disparity vector clip section 1124d restricts the value of the input disparity vector dvLX to a value within a pre-decided range, as in the vector clip section 30372. The disparity vector clip section 1124d outputs the disparity vector dvLX with the restricted value to the predicted picture generation section 101 in association with the reference picture index refIdx and the vector index mvp_LX_idx and stores the disparity vector dvLX in the prediction parameter memory 108.

The disparity vector clip section 1124d determines whether the vector mvLX is the disparity vector based on the reference picture index refIdx, as in the reference layer determination section 30311 (see the modification example D4 and FIG. 9). When the vector mvLX is the motion vector, the disparity vector clip section 1124d outputs the input motion vector mvLX to the predicted picture generation section 101 (see FIG. 14) in association with the reference picture index refIdx and the vector index mvp_LX_idx and stores the motion vector mvLX in the prediction parameter memory 108.

In the modification example E4, an internal memory 1091 (not illustrated) may be included between the reference picture memory 109 and the predicted picture generation section 101. The internal memory 1091 stores the prediction parameters corresponding to the reference region from the prediction parameter memory 108, and the predicted picture generation section 101 reads the reference picture block located at a position instructed by the disparity vector from the internal memory 1091. For example, by using a storage medium (cache memory) with a smaller storage capacity than the reference picture memory 109 and a fast access speed as the internal memory 1091, it is possible to perform the process at a high speed and achieve the economization.

In this way, in the modification example E4, it is possible to decrease a range in which the value of the disparity vector output to the predicted picture generation section 101 can be taken. This range corresponds to a reference region which is a range referred to when the predicted picture generation section 101 refers to a reference picture from the reference picture memory 109 in a certain decoding block. That is, in the modification example E4, by decreasing the reference region in the reference picture memory 109, a storage medium with a small capacity can be allowed to be used as the reference picture memory 109, and thus a process can be performed at a high speed.

MODIFICATION EXAMPLE E5

Next, an image encoding device 11e according to a modification example E5 will be described. The modification example E5 is a modification example corresponding to the above-described modification example D5. The same reference numerals are given to the same configuration and the above-description description will be quoted.

The image encoding device 11e according to the modification example E5 includes an AMVP prediction parameter derivation section 1122e instead of the AMVP prediction parameter derivation section 1122 (see FIG. 15). The subtraction section 1123a (see the modification example E1) to be described below may be included instead of the subtraction section 1123 or may not be included. When the subtraction section 1123a is not included, the disparity vector clip section 1124 (see FIG. 15) may be omitted.

The AMVP prediction parameter derivation section 1122e has the same configuration as the AMVP prediction parameter derivation section 1122 (see FIG. 15). here, when the vector mvLX input from the coding parameter decision section 110 is the inter-layer prediction (the disparity vector), the AMVP prediction parameter derivation section 1122 restricts the input disparity vector dvLX to a value within a pre-decided range, as in the disparity vector clip section 30338 (see FIG. 11). Whether the vector mvLX is the disparity vector or the motion vector is determined based on the reference picture index refIdx as in the reference layer determination section 30311 (see the modification example D1 and FIG. 4).

In this way, the AMVP prediction parameter derivation section 1122e restricts the reference region in which the prediction parameter is read from the prediction parameter memory 108. This is because the reference region corresponds to the range of the value of the disparity vector dvLX when the coding target block is a starting point.

That is, in the modification example E5, by decreasing the reference region in the prediction parameter memory 108, a storage medium with a small capacity can be allowed to be used as the prediction parameter memory 108, and thus a process can be performed at a high speed. In the modification example E5, an internal memory 1081 (not illustrated) may be included and the prediction parameter in the reference region may be stored from the prediction parameter memory 108. The AMVP prediction parameter derivation section 1122e reads the prediction parameter via the internal memory 1081. The internal memory 1081 may be a storage medium with a smaller storage capacity than the prediction parameter memory 108 and a fast access speed.

The image encoding device 11e according to the modification example E5 includes a merge prediction parameter derivation section 1121e instead of the merge prediction parameter derivation section 1121 (see FIG. 15).

The merge prediction parameter derivation section 1121e has the same configuration as the merge prediction parameter derivation section 1121 (see FIG. 15). Here, the merge prediction parameter derivation section 1121e restricts the disparity vector dvLX to a value within a pre-decided range in the disparity vector clip section 30338 (see FIG. 13) when the merge prediction parameter derivation section 1121e reads the prediction parameter of the layer image (for example, the base view) of the different layer from the target layer image using the disparity vector.

In this way, the merge prediction parameter derivation section 1121e speeds up the process of restricting the reference region in which the prediction parameter of the different layer image from the target layer image is further read from the prediction parameter memory 108. In the modification example E5, an internal memory 1082 (not illustrated) may be included and the prediction parameter in the reference region may be stored from the prediction parameter memory 108. The merge prediction parameter derivation section 1121e reads the prediction parameter via the internal memory 1082. The internal memory 1082 may be a storage medium with a smaller storage capacity than the prediction parameter memory 108 and a fast access speed.

In the above-described embodiment, the image transmission system 1 (see FIG. 1) may include one of the above-described image encoding devices 11a to 11e and one of the image decoding devices 31a to 31e corresponding to the image encoding devices 11a to 11e, instead of the image encoding device 11 and the image decoding device 31.

In the above-described embodiment, the image transmission system 1 may not include the image display device 41. In the above-described embodiment, an image display system may be configured such that one of the image decoding devices 31 to 31e include the image display device 41.

Thus, in the above-described embodiment, the disparity vector indicating a part of the disparity and other part of the disparity is generated based on the code indicating the part of the disparity between the first layer image and the second layer image different from the first layer image. The reference image of the region indicated by the generated disparity vector is read from the reference image storage unit storing the reference image and the predicted image is generated based on the read reference image.

Therefore, it is not necessary to encode the other part of the parallax, for example, the Y component. When the part of the parallax, for example, the X component, is a main part in the parallax, the precision in disparity prediction does not deteriorate in the parallax prediction despite the fact that the other part of the parallax is not encoded. Accordingly, the coding efficiency is improved while the deterioration in the quality of the generated image is suppressed.

In the above-described embodiment, the disparity vector indicating the disparity is generated based on the code indicating the disparity between the first layer image and the second layer image different from the first layer image, and the disparity vector is restricted to the value of the pre-decided range. The reference image of the region indicated by the generated disparity vector is read from the reference image storage section storing the reference image, and the predicted image is generated based on the read reference image.

Since the region in which the reference image is read is restricted while the deterioration in the quality of the generated image is suppressed, the process at the time of the reference of the reference image can be sped up. Further, since the coding amount of the predicted image is decreased, the coding efficiency is improved.

MODIFICATION EXAMPLE E6

Next, an image encoding device 11f (not illustrated) according to a modification example E6 will be described. The modification example E6 is a modification example corresponding to the above-described modification example D6. The same reference numerals are given to the same configuration and the above-description description will be quoted.

The image encoding device 11f according to the modification example E6 includes an entropy encoding section 104f instead of the entropy encoding section 104.

Figure 34:
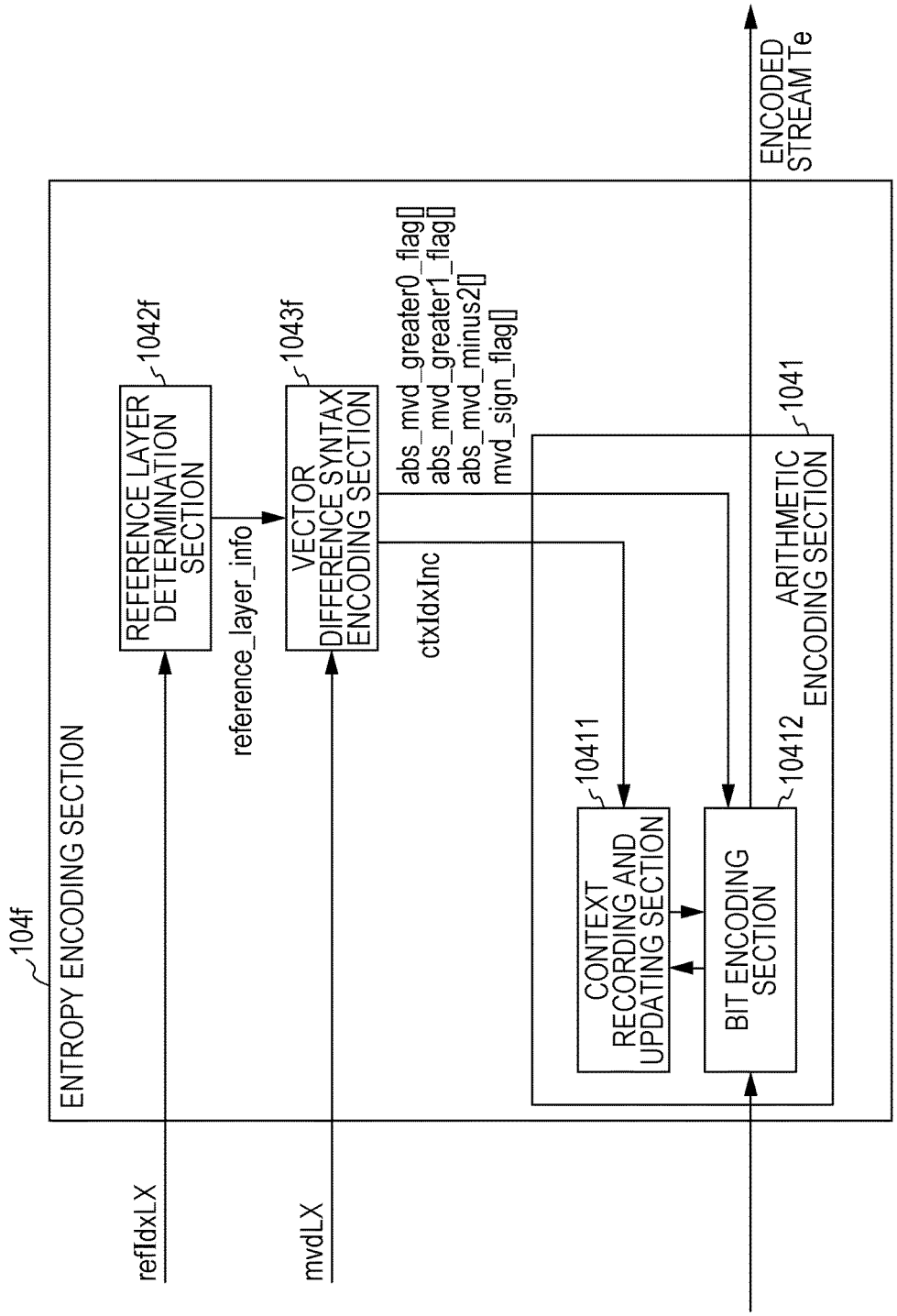
FIG. 34 is a block diagram illustrating the configuration of an entropy encoding section according to a modification example E6 of the embodiment.

FIG. 34 is a block diagram illustrating the configuration of the entropy encoding section 104f according to the modification example E6.

The entropy encoding section 104f is configured to include an arithmetic encoding section 1041, a reference layer determination section 1042f, and a vector difference syntax encoding section 1043f. The configurations of the reference layer determination section 1042f and the vector difference syntax encoding section 1043f may be the same as the configurations of the reference layer determination section 30371 and the vector difference syntax decoding section 3013f (see FIG. 25).

The arithmetic encoding section 1041 is configured to include a context recording and updating section 10411 and a bit encoding section 10412. The configuration of the context recording and updating section 10411 may be the same as the configuration of the context recording and updating section 30111 (see FIG. 25).

The bit encoding section 10412 encodes each Bin forming the difference vector mvdLX supplied from the inter-prediction parameter encoding section 112 with reference to the context variable CV recorded in the context recording and updating section 10411. The value of the encoded Bin is also supplied to the context recording and updating section 10411 and is referred to so that the context variable CV is updated.

The vector difference syntax encoding section 1043f derives the context index ctxIdx for encoding each Bin of the syntax elements, abs_mvd_greater0_flag [XY], abs_mvd_greater1_flag [XY], abs_mvd_minus2 [XY], forming the difference vector mvdLX from the difference vector mvdLX supplied from the inter-prediction parameter encoding section 112 and records the derived context index ctxIdx in the context recording and updating section 10411.

Accordingly, the bit encoding section 10412 encodes each syntax element using the stored context index ctxIdx. The vector difference syntax encoding section 1043*f* may use the derivation table information illustrated in one of FIGS. 27 to 31 when the context index ctxIdx is derived.

In the above-described embodiment, by deriving the context of the syntax element abs_mvd_greater0_flag [XY] indicating whether the absolute value of the difference vector exceeds 0 depending on whether the reference picture index refIdx and the target component are the X component or the Y component, the information amount of the syntax element of the coding target is reduced and the coding efficiency is thus improved.

MODIFICATION EXAMPLE E7

Next, an image encoding device 11*g* (not illustrated) according to a modification example E7 will be described. The modification example E7 is a modification example corresponding to the above-described modification example D7. The same reference numerals are given to the same configuration and the above-description description will be quoted.

The image encoding device 11*g* according to the modification example E7 includes an entropy encoding section 104*g* instead of the entropy encoding section 104.

Figure 35:
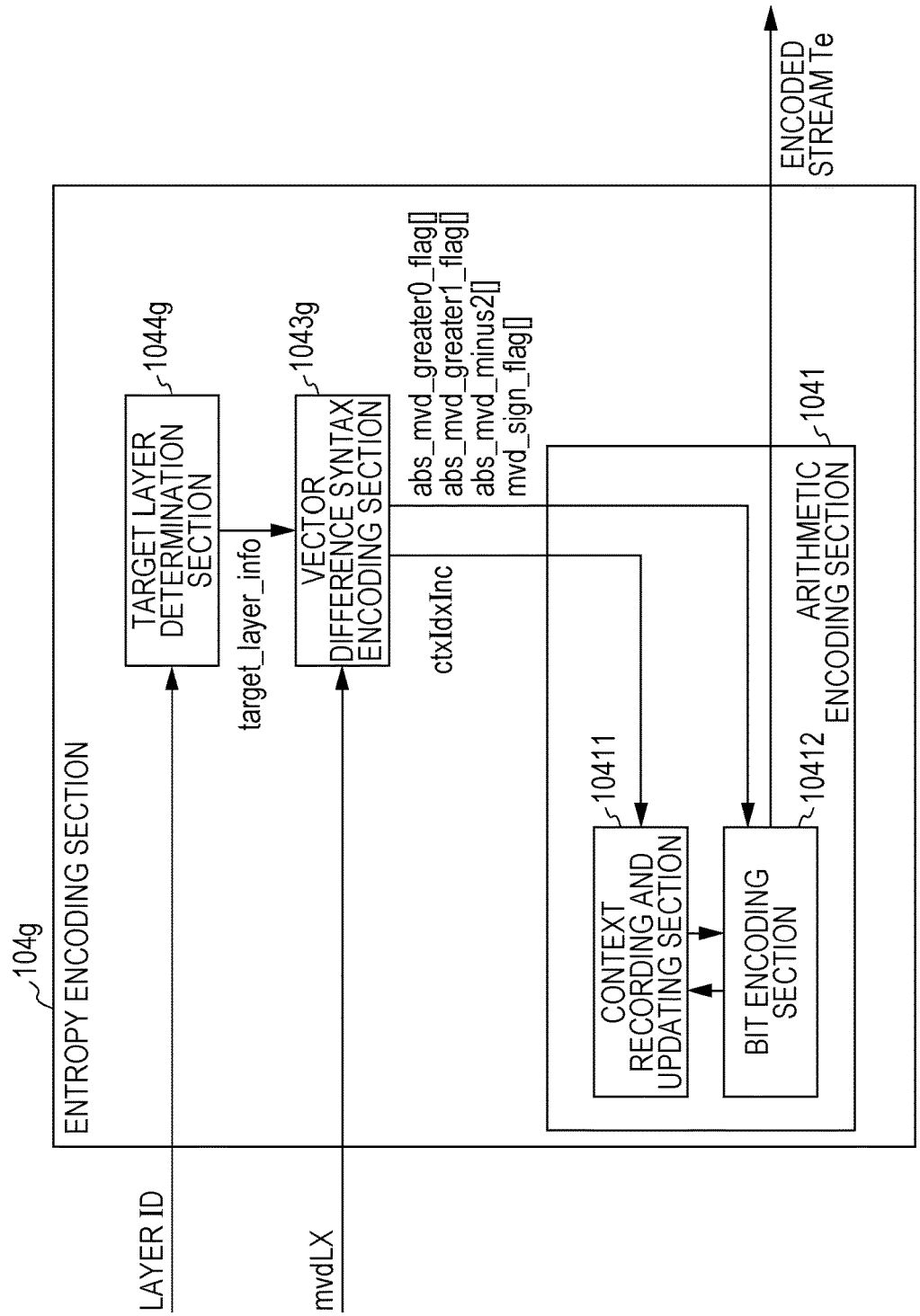
FIG. 35 is a block diagram illustrating the configuration of an entropy encoding section according to a modification example E7 of the embodiment.

FIG. 35 is a block diagram illustrating the configuration of the entropy encoding section 104*g* according to the modification example E7.

The entropy encoding section 104*g* is configured to include an arithmetic encoding section 1041, a vector difference syntax encoding section 1043*g*, and a target layer determination section 1044*g*.

The configurations of the arithmetic encoding section 1041, the vector difference syntax encoding section 1043*g*, and the target layer determination section 1044*g* may be the same as the configurations of the arithmetic encoding section 1041 (see FIG. 34), the vector difference syntax decoding section 3013*g* (see FIG. 32), and the target layer determination section 30171 (see FIG. 32), respectively.

Here, the vector difference syntax encoding section 1043*g* derives the context index ctxIdxInc for encoding each Bin of the syntax elements, abs_mvd_greater0_flag [XY], abs_mvd_greater1_flag [XY], abs_mvd_minus2 [XY], forming the difference vector mvdLX from the difference vector mvdLX supplied from the inter-prediction parameter encoding section 112. The vector difference syntax encoding section 1043*g* stores the derived context index ctxIdxInc in the context recording and updating section 10411. The bit encoding section 10412 encodes each syntax element forming the difference vector mvdLX using the context index ctxIdxInc stored in the context recording and updating section 10411. The bit encoding section 10412 outputs each of the encoded syntax elements as a part of the encoded stream Te.

In this way, in the modification example, by deriving the context of the flag abs_mvd_greater0_flag [XY] indicating whether the absolute value of the difference vector exceeds 0 depending on whether the reference picture index refIdx and the target component are the X component or the Y component, the information amount of the syntax element of the coding target is reduced and the coding efficiency is thus improved.

MODIFICATION EXAMPLE E8

Next, an image encoding device 11*h* (not illustrated) according to a modification example E8 will be described. The modification example E8 is a modification example corresponding to the above-described modification example D8. The same reference numerals are given to the same configuration and the above-description description will be quoted.

The image encoding device 11*h* according to the modification example E8 includes a merge prediction parameter derivation section 1121*h* and an AMVP prediction parameter derivation section 1122*h* instead of the merge prediction parameter derivation section 1121 and the AMVP prediction parameter derivation section 1122 (see FIG. 15).

Figure 43:
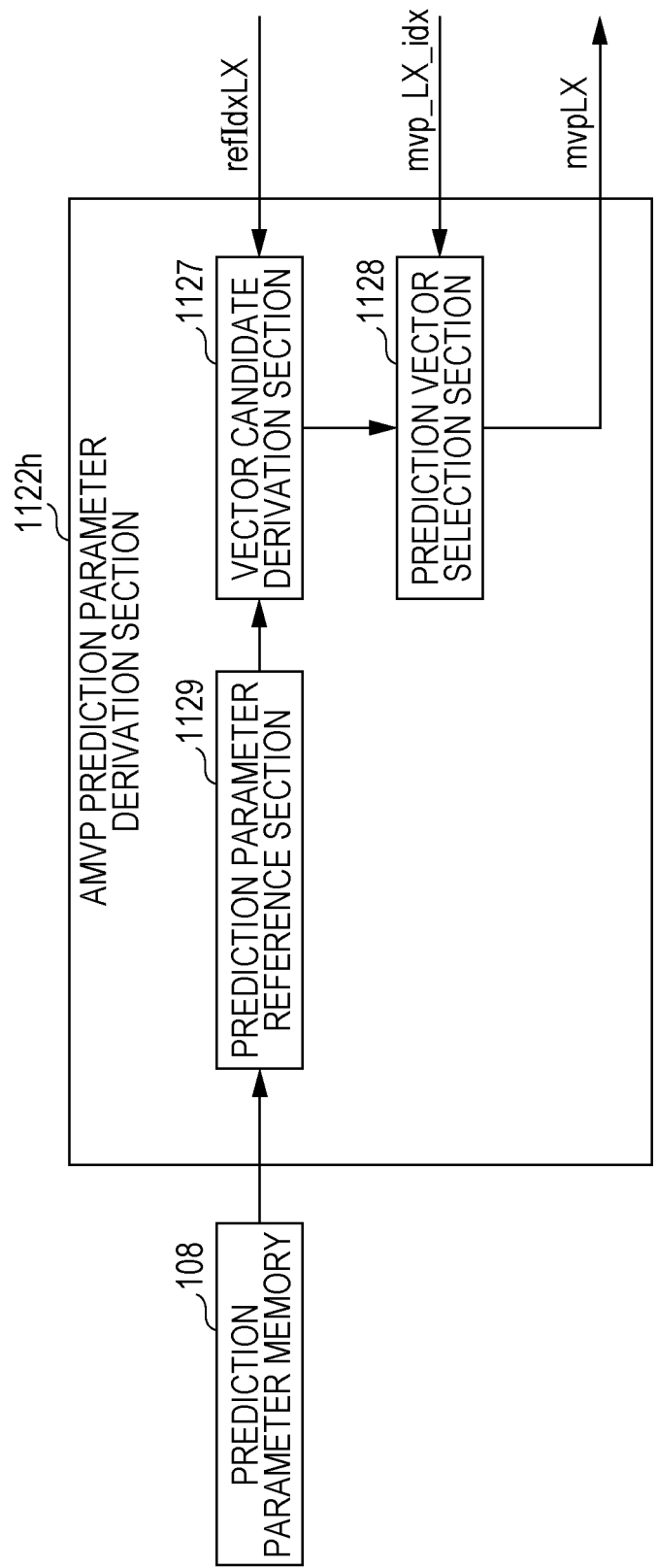
FIG. 43 is a block diagram illustrating the configuration of an AMVP prediction parameter derivation section according to a modification example E8 of the embodiment.

FIG. 43 is a block diagram illustrating the configuration of the AMVP prediction parameter derivation section 1122*h* according to the modification example E8.

The AMVP prediction parameter derivation section 1122*h* is configured to include a vector candidate derivation section 1127, a prediction vector selection section 1128, and a prediction parameter reference section 1129. The configuration of the vector candidate derivation section 1127 may be the same as the configuration of the vector candidate derivation section 3033, the prediction vector selection section 3034, and the prediction parameter reference section 3039 (see FIG. 36). The prediction parameter reference section 1129 refers the prediction parameter from the prediction parameter memory 108 as in the prediction parameter reference section 3039 referring to the prediction parameter from the prediction parameter memory 307 (see FIG. 36).

Figure 44:
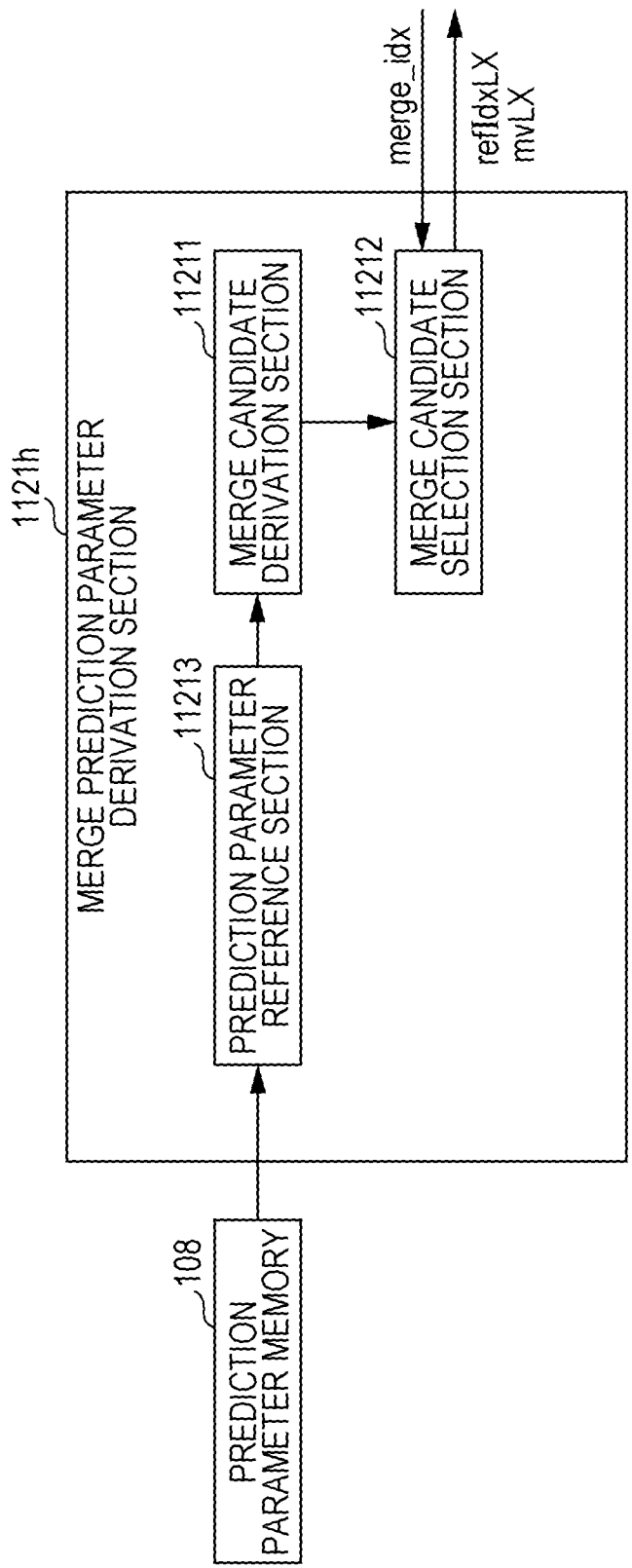
FIG. 44 is a block diagram illustrating the configuration of a merge prediction parameter derivation section according to the modification example E8 of the embodiment.

FIG. 44 is a block diagram illustrating the configuration of the merge prediction parameter derivation section 1121*h* according to the modification example E8.

The merge prediction parameter derivation section 1121*h* is configured to include a merge candidate derivation section 11211, a merge candidate selection section 11212, and a prediction parameter reference section 11213. The configurations of the merge candidate derivation section 11211, the merge candidate selection section 11212, and the prediction parameter reference section 11213 are the same as the configurations (see FIG. 39) of the merge candidate derivation section 30364, the merge candidate selection section 30365, and the prediction parameter reference section 3039, respectively. The prediction parameter reference section 11213 refers the prediction parameter from the prediction parameter memory 108 as in the prediction parameter reference section 3039 referring to the prediction parameter from the prediction parameter memory 307 (see FIG. 39).

In the modification example, in the inter-layer prediction by the prediction parameter reference sections 11213 and 1129, the prediction parameter is referred to from the prediction parameter memory for each block with a predetermined size. Thus, since the prediction parameter memory is not referred to in 4×4 units (or 4×8 units and 8×4 units), which are small units, the advantageous effect of reducing a memory amount of the prediction parameter memory is obtained.

The present invention can be realized as follows.

(1) According to an aspect of the present invention, there is provided an image decoding device including: a disparity vector generation section that generates disparity vectors indicating a part of a disparity between a first layer image and a second layer image different from the first layer image and other part of the disparity based on a code indicating the part of the disparity; a reference image storage section that stores a reference image: and a predicted image generation section that reads the reference image of a region indicated by the disparity vector generated by the disparity vector generation section from the reference image storage section and generates a predicted image based on the read reference image.

(2) According to another aspect of the present invention, in the above-described image decoding device, the part of the disparity may be a horizontal component of the disparity and the other part of the disparity may be a vertical component of the disparity. The disparity vector generation section may be configured to decide predicted values of the vertical component and the vertical component or a predicted residual of the vertical component as pre-decided values.

(3) According to still another aspect of the present invention, in the above-described image decoding device, the part of the disparity may be the horizontal component of the disparity and the other part of the disparity may be the vertical component of the disparity. The disparity vector generation section may be configured to calculate the vertical component of the disparity based on a code indicating a relation between the vertical component and the horizontal component.

(4) According to still another aspect of the present invention, there is provided an image decoding device including: a disparity vector generation section that generates a disparity vector indicating a disparity between a first layer image and a second layer image different from the first layer image based on a code indicating the disparity; a disparity vector restriction section that restricts the disparity vector to a value within a pre-decided range; a reference image storage section that stores the reference image; and a predicted image generation section that reads a reference image of a region indicated by the disparity vector generated by the disparity vector generation section from the reference image storage and generates a predicted image based on the read reference image.

(5) According to still another aspect of the present invention, in the above-described image decoding device, a range in which the disparity vector restriction section restricts the value of the disparity vector, a range of a vertical component may be less than a range of a horizontal component.

(6) According to still another aspect of the present invention, the above-described image decoding device may further include a prediction parameter storage section that stores the derived prediction parameter for each region of an image; and a prediction parameter derivation section that derives a motion vector or a prediction vector which is a predicted value of the disparity vector as at least a part of the prediction parameter with reference to a prediction parameter related to a region indicated by the disparity vector restricted by the disparity vector restriction section among the prediction parameters stored in the prediction parameter storage section.

(7) According to still another aspect of the present invention, there is provided an image encoding device including: a disparity vector generation section that generates disparity vectors indicating a part of a disparity between a first layer image and a second layer image different from the first layer image and different part of the disparity based on the part of the disparity; a reference image storage section that stores a reference image; and a predicted image generation section that reads the reference image of a region indicated by the disparity vector generated by the disparity vector generation section from the reference image storage section and generates a predicted image based on the read reference image.

(8) According to still another aspect of the present invention, in the above-described image encoding device, the part of the disparity may be the horizontal component of the disparity and the other part of the disparity may be the vertical component of the disparity. The disparity vector generation section may be configured to calculate predicted values of the vertical component and the vertical component or a predicted residual of the vertical component as pre-decided values.

(9) According to still another aspect of the present invention, in the above-described image encoding device, the part of the disparity may be the horizontal component of the disparity and the other part of the disparity may be the vertical component of the disparity. The disparity vector generation section may be configured to include an encoding section that calculate the vertical component of the disparity based on a code indicating a relation between the vertical component and the horizontal component and encodes the relation between the vertical component and the horizontal component.

(10) According to still another aspect of the present invention, there is provided an mage encoding device including: a disparity vector generation section that generates a disparity vector indicating a disparity between a first layer image and a second layer image different from the first layer image based on a code indicating the disparity; a disparity vector restriction section that restricts the disparity vector to a value within a pre-decided range; a reference image storage section that stores a reference image; and a predicted image generation section that reads the reference image of a region indicated by the disparity vector generated by the disparity vector generation section from the reference image storage section and generates a predicted image based on the read reference image.

(11) According to still another aspect of the present invention, in the above-described image encoding device, in a range in which the disparity vector restriction section restricts the value of the disparity vector, a range of a vertical component may be less than a range of a horizontal component.

(12) According to still another aspect of the present invention, the above-described image encoding device may further include a prediction parameter storage section that stores the derived prediction parameter for each region of an image; and a prediction parameter derivation section that derives a prediction vector which is a predicted value of the disparity vector as at least a part of the prediction parameter with reference to a prediction parameter related to a region indicated by the disparity vector restricted by the disparity vector restriction section among the prediction parameters stored in the prediction parameter storage section.

(13) According to still another aspect of the present invention, there is provided an image decoding device including: a vector difference decoding section that derives a context of an arithmetic code and decodes a vector difference from encoded data; a vector derivation section that derives a vector of a target block from a sum of a vector of a processed block and the vector difference; a reference image storage section that stores a reference image; a predicted image generation section that reads the reference image of a region indicated by the vector of the target block generated by the vector derivation section from the reference image storage section and generates a predicted image based on the read reference image; and a reference layer determination section that determines whether the vector of the target block or the vector difference is for prediction between different layers. The vector difference decoding section assigns the context based on whether the reference layer determination section determines whether the vector of the target block or the vector difference is for the prediction between different layers.

(14) According to still another aspect of the present invention, in the above-described image decoding device, when the reference layer determination section determines that the vector of the target block or the vector difference is for the prediction between the different layers, the vector difference decoding section may be configured to assign different contexts to a syntax element forming a vertical component of the vector difference and a syntax element forming a horizontal component of the vector difference.

(15) According to still another aspect of the present invention, in the above-described image decoding device, when the reference layer determination section determines that the vector of the target block or the vector difference is for the prediction between the different layers and determines that the vector of the target block or the vector difference is not for the prediction between the different layers, the vector difference decoding section may be configured to assign a different context to a syntax element forming at least one component of the vector difference.

(16) According to still another aspect of the present invention, in the above-described image decoding device, the syntax element may be information indicating whether an absolute value of the vector difference exceeds 0.

(17) According to still another aspect of the present invention, in the above-described image decoding device, the reference layer determination section may be configured to determine whether the vector of the target block or the vector difference is for the prediction between the different layers, using the fact of whether times at which the target image to which the target block belongs is related to the reference image to which the reference image belongs, view identifiers, or long-term reference images are mutually different.

(18) According to still another aspect of the present invention, in the above-described image decoding device, the reference layer determination section may be configured to determine whether the vector of the target block or the vector difference is for the prediction between the different layers, based on the fact that the target image to which the target image belongs is not an image related to a criterion layer or is not an image related to a criterion view.

(19) According to still another aspect of the present invention, there is provided an image encoding device including: a vector difference encoding section that derives a context of an arithmetic code and encodes a vector difference; a vector difference derivation section that derives the vector difference from a vector of a processed block and a vector of a target block; a reference image storage section that stores a reference image; a predicted image generation section that reads the reference image of a region indicated by the vector of the target block from the reference image storage section and generates a predicted image based on the read reference image; and a reference layer determination section that determines whether the vector or the vector difference is for prediction between different layers. The vector difference encoding section assigns the context based on whether the reference layer determination section determines whether the vector or the vector difference is for the prediction between the different layers.

(20) According to still another aspect of the present invention, there is provided an image decoding device including: a prediction parameter storage section that stores a derived prediction parameter for each a pre-decided region of an image; a prediction parameter derivation section that derives a prediction parameter or a prediction vector of a target prediction block; a reference image storage section that stores a reference image; and a predicted image generation section that reads the reference image of a region indicated by a vector derived by the prediction parameter derivation section from the reference image storage section and generates a predicted image based on the read reference image. The prediction parameter derivation section includes a prediction parameter reference section that refers the prediction parameter stored in the prediction parameter storage section. The prediction parameter derivation section includes an inter-layer reference address transformation section that transforms coordinates at which a prediction parameter of a reference block is referred to in a case in which a target image belonging to the target prediction block and a reference image belonging to the reference block which is a part of the reference image belong to different layers.

(21) According to still another aspect of the present invention, in the above-described image decoding device, the inter-layer reference address transformation section may be configured such that calculation of transforming the coordinates includes calculation of discretizing the coordinates in a larger unit.

(22) According to still another aspect of the present invention, there is provided an image encoding device including: a prediction parameter storage section that stores a derived prediction parameter for each a pre-decided region of an image; a prediction parameter derivation section that derives a prediction parameter or a prediction vector of a target prediction block; a reference image storage section that stores a reference image; and a predicted image generation section that reads the reference image of a region indicated by a vector derived by the prediction parameter derivation section from the reference image storage section and generates a predicted image based on the read reference image. The prediction parameter derivation section includes a prediction parameter reference section that refers to a prediction parameter stored in the prediction parameter storage section. The prediction parameter reference section an inter-layer reference address transformation section that transforms coordinates at which a prediction parameter of a reference block is referred to in a case in which a target image belonging to the target prediction block and a reference image belonging to the reference block which is a part of the reference image belong to different layers.

A computer may be allowed to realize some of the image encoding devices 11 to 11*h* and the image decoding devices 31 to 31*h* according to the above-described embodiment, for example, the entropy decoding section 301, the prediction parameter decoding section 302, the predicted picture generation section 101, the DCT and quantization section 103, the entropy encoding section 104, the inverse quantization and inverse DCT section 105, the coding parameter decision section 110, the prediction parameter encoding section 111, the entropy decoding section 301, the prediction parameter decoding section 302, the predicted picture generation section 308, and the inverse quantization and inverse DCT section 311. In this case, a program realizing the control function may be recorded on a computer-readable recording medium and the program recorded on the recording medium may be read to a computer system to be executed so that the functions are realized. The "computer system" mentioned here is a computer system included in one of the image encoding devices 11 to 11*h* and the image decoding devices 31 to 31*h* and includes an OS and hardware such as peripheral device. The "computer-readable recording medium" refers to a portable medium such as a flexible disk, a magneto-optical disc, a ROM, or a CD-ROM or a storage device such as a hard disk included in a computer system. The "computer-readable recording medium" may also include a medium retaining a program dynamically for a short time, such as a communication line when a program is transmitted via a network such as the Internet or a communication circuit line such as a telephone circuit and a medium retaining a program for a given time, such as a volatile memory included in a computer system serving as a server or a client in this case. The program may be a program used to realize some of the above-described functions or may be a program combined with a program already stored in a computer system to realize the above-described functions.

Some or all of the image encoding devices 11 to 11e and the image decoding devices 31 to 31e according to the above-described embodiment may be realized as an integrated circuit such as a large scale integration (LSI). Each of the functional blocks of the image encoding devices 11 to 11e and the image decoding devices 31 to 31e may be individually formed as a processor or some or all of the functional blocks may be integrated to be formed as a processor. A method for an integrated circuit is not limited to the LSI, but may be realized by a dedicated circuit or a general processor. When an integrated circuit technology substituting the LSI with an advance in semiconductor technologies appears, an integrated circuit may be used by the technology.

The embodiment of the present invention has been described above with reference to the drawings. Specific configurations are not limited to the above-described configurations and various design modifications can be changed within the scope of the present invention without departing from the gist of the present invention.

INDUSTRIAL APPLICABILITY

The present invention can be applied to devices that encode images of a plurality of viewpoints or devices that decode encoded images

DESCRIPTION OF REFERENCE NUMERALS

1 IMAGE TRANSMISSION SYSTEM
11, 11a to 11h IMAGE ENCODING DEVICE
101 PREDICTED PICTURE GENERATION SECTION
102 SUBTRACTION SECTION
103 DCT QUANTIZATION SECTION
104, 104f, 104g ENTROPY ENCODING SECTION
1041 ARITHMETIC ENCODING SECTION
10411 CONTEXT RECORDING AND UPDATING SECTION
10412 BIT ENCODING SECTION
1042f REFERENCE LAYER DETERMINATION SECTION
1043f, 1043g VECTOR DIFFERENCE SYNTAX ENCODING SECTION
1044g TARGET LAYER DETERMINATION SECTION
105 INVERSE QUANTIZATION AND INVERSE DCT SECTION
106 ADDITION SECTION
108 PREDICTION PARAMETER MEMORY
109 REFERENCE PICTURE MEMORY
110 CODING PARAMETER DETERMINATION SECTION
111 PREDICTION PARAMETER ENCODING SECTION
112, 112c INTER-PREDICTION PARAMETER ENCODING SECTION
1121, 1121e, 1122h MERGE PREDICTION PARAMETER DERIVATION SECTION
11213 PREDICTION PARAMETER REFERENCE SECTION
11211 MERGE CANDIDATE DERIVATION SECTION
11212 MERGE CANDIDATE SELECTION SECTION
1122, 1122h AMVP PREDICTION PARAMETER DERIVATION SECTION
1123, 1123a SUBTRACTION SECTION
1124, 1124a, 1124d DISPARITY VECTOR CLIP SECTION
1125 DISPARITY VECTOR GENERATION SECTION (DISPARITY VECTOR GENERATOR)
1126 PREDICTION PARAMETER INTEGRATION SECTION
1127 VECTOR CANDIDATE DERIVATION SECTION
1128 PREDICTION VECTOR SELECTION SECTION
1129 PREDICTION PARAMETER REFERENCE SECTION
113 INTRA-PREDICTION PARAMETER ENCODING SECTION
21 NETWORK
31, 31a to 31h IMAGE DECODING DEVICE
301, 301f, 301g ENTROPY DECODING SECTION
3011 ARITHMETIC ENCODING AND DECODING SECTION
30111 CONTEXT RECORDING UPDATING SECTION
30112 BIT DECODING SECTION
3012 REFERENCE INDEX DECODING SECTION
3013, 3013f, 3013g VECTOR DIFFERENCE SYNTAX DECODING SECTION
3014 LAYER ID DECODING SECTION
30171 TARGET LAYER DETERMINATION SECTION
302 PREDICTION PARAMETER DECODING SECTION
303, 303c, 303d INTER-PREDICTION PARAMETER DECODING SECTION
3031 INTER-PREDICTION PARAMETER EXTRACTION SECTION
30311 REFERENCE LAYER DETERMINATION SECTION
30312 VECTOR DIFFERENCE DECODING SECTION
3032, 3032a, 3032h AMVP PREDICTION PARAMETER DERIVATION SECTION
30321a PARALLAX PREDICTION VECTOR CLIP SECTION
3033 VECTOR CANDIDATE DERIVATION SECTION
30335, 30335e ENHANCEMENT VECTOR CANDIDATE DERIVATION SECTION
30336 DISPARITY VECTOR ACQUISITION SECTION
30337 INTER-LAYER VECTOR CANDIDATE DERIVATION SECTION
30338 DISPARITY VECTOR CLIP SECTION
30339 VECTOR CANDIDATE STORAGE SECTION
3034 PREDICTION VECTOR SELECTION SECTION
3035 ADDITION SECTION
3036, 3036e, 3036h MERGE PREDICTION PARAMETER DERIVATION SECTION
30360 ENHANCEMENT MERGE CANDIDATE DERIVATION SECTION
30361 DISPARITY VECTOR ACQUISITION SECTION
30363 INTER-LAYER MERGE CANDIDATE DERIVATION SECTION
30364 MERGE CANDIDATE DERIVATION SECTION
30365 MERGE CANDIDATE SELECTION SECTION

3037 DISPARITY VECTOR CLIP SECTION
30371 REFERENCE LAYER DETERMINATION SECTION
30372 VECTOR CLIP SECTION
3038 DISPARITY VECTOR GENERATION SECTION
30381 REFERENCE LAYER DETERMINATION SECTION
30382 DISPARITY VECTOR SETTING SECTION
3039 PREDICTION PARAMETER REFERENCE SECTION
30391 SPATIAL PREDICTION REFERENCE ADDRESS TRANSFORMATION SECTION
30392 TEMPORAL PREDICTION REFERENCE ADDRESS TRANSFORMATION SECTION
30393 INTER-LAYER REFERENCE ADDRESS TRANSFORMATION SECTION
304 INTRA-PREDICTION PARAMETER DECODING SECTION
306 REFERENCE PICTURE MEMORY
3061 INTERNAL MEMORY
307 PREDICTION PARAMETER MEMORY
3071 TARGET CTB PREDICTION PARAMETER MEMORY
3072 LEFT CTB COLUMN PREDICTION PARAMETER MEMORY
3073 UPPER CTB LINE PREDICTION PARAMETER MEMORY
3074 TEMPORAL PREDICTION PARAMETER MEMORY
3075 INTER-LAYER PREDICTION PARAMETER MEMORY
3076 INTERNAL MEMORY
308 PREDICTED PICTURE GENERATION SECTION
309 INTER-PREDICTED PICTURE GENERATION SECTION
3091 DISPARITY PREDICTED PICTURE GENERATION SECTION
310 INTRA-PREDICTED PICTURE GENERATION SECTION
311 INVERSE QUANTIZATION AND INVERSE DCT SECTION
312 ADDITION SECTION
41 IMAGE DISPLAY DEVICE

The invention claimed is:

1. An image decoding device, the device comprising:
prediction parameter derivation circuitry that derives a prediction parameter of a target block; and
predicted image generation circuitry that generates a prediction image based on the prediction parameter;
wherein the prediction parameter derivation circuitry that derives reference coordinates of an inter layer merge candidate by a first shift operation in a case of deriving a prediction parameter of the inter layer merge candidate,
the image decoding device further comprises temporal prediction parameter derivation circuitry that derives reference coordinates of a temporal prediction by a second shift operation in a case of deriving a prediction parameter of the temporal prediction, and
the shift value of the first shift operation is smaller than the shift value of the second shift operation.

2. An image encoding device, the device comprising:
prediction parameter derivation circuitry that derives a prediction parameter of a target block; and
predicted image generation circuitry that generates a prediction image based on the prediction parameter;
wherein the prediction parameter derivation circuitry that derives reference coordinates of an inter layer merge candidate by a first shift operation in a case of deriving a prediction parameter of the inter layer merge candidate,
the image encoding device further comprises temporal prediction parameter derivation circuitry that derives reference coordinates of a temporal prediction by a second shift operation in a case of deriving a prediction parameter of the temporal prediction, and
the shift value of the first shift operation is smaller than the shift value of the second shift operation.

3. A method of an image decoding device using circuitry, the method comprising:
deriving a prediction parameter of a target block; and
generating a prediction image based on the prediction parameter;
wherein deriving reference coordinates of an inter layer merge candidate by a first shift operation in a case of deriving a prediction parameter of the inter layer merge candidate,
the method further comprising the step of deriving reference coordinates of a temporal prediction by a second shift operation in a case of deriving a prediction parameter of the temporal prediction, and
the shift value of the first shift operation is smaller than the shift value of the second shift operation.

* * * * *